US012586072B1

(12) United States Patent
Goldman

(10) Patent No.: US 12,586,072 B1
(45) Date of Patent: Mar. 24, 2026

(54) SELF-CONTAINED BIOMETRIC DEVICE, SYSTEM, AND METHOD FOR SECURE DIGITAL TRANSACTIONS, IDENTITY VERIFICATION, AND MULTI-CURRENCY ASSET MANAGEMENT

(71) Applicant: Rachel L. Goldman, Naples, FL (US)

(72) Inventor: Rachel L. Goldman, Naples, FL (US)

(73) Assignee: Omnius Corp, Sarasota, FL (US)

( * ) Notice: Subject to any disclaimer, the term of this patent is extended or adjusted under 35 U.S.C. 154(b) by 0 days.

(21) Appl. No.: 19/250,606

(22) Filed: Jun. 26, 2025

Related U.S. Application Data

(60) Provisional application No. 63/798,105, filed on May 1, 2025.

(51) Int. Cl.
| | |
|---|---|
| *G06Q 20/40* | (2012.01) |
| *G06F 21/32* | (2013.01) |
| *H04L 9/32* | (2006.01) |

(52) U.S. Cl.
CPC ....... *G06Q 20/40145* (2013.01); *G06F 21/32* (2013.01); *H04L 9/3218* (2013.01)

(58) Field of Classification Search
None
See application file for complete search history.

(56) References Cited

U.S. PATENT DOCUMENTS

2018/0068312 A1    3/2018    Kim
2018/0211022 A1    7/2018    Wagner
(Continued)

FOREIGN PATENT DOCUMENTS

JP          7155859 B2    10/2022

OTHER PUBLICATIONS

CISA. (2023). Enhancing cyber resilience: Insights from the CISA Healthcare and Public Health Sector Risk and Vulnerability Assessment. Cybersecurity and Infrastructure Security Agency. Retrieved from https://www.cisa.gov/news-events/news/cisa-releases-key-risk-and-vulnerability-findings-healthcare-and-public-health-sector. 27 pages.

(Continued)

*Primary Examiner* — Matthew S Gart
*Assistant Examiner* — Amit Patel
(74) *Attorney, Agent, or Firm* — Blueshift IP; Robert Plotkin

(57) ABSTRACT

A self-contained biometric device, method, and system for secure digital transactions is provided. The device comprises a housing that may be a subdermal implant, dermally-applied biometric tattoo, ergonomic external wearable, or smart card. The housing maintains consistent secure functionality during offline and online operation modes and includes a biometric verification module that captures a biometric input of a user and performs user authentication entirely within the device. A hardware-isolated storage module physically isolated from external networks stores cryptographic keys, credentials, and biometric templates. The device permits access to the cryptographic keys and credentials only upon successful user authentication. A transaction processing module resident inside the hardware-isolated storage module executes digital asset transactions entirely within the device in offline mode. This self-contained architecture enables secure, autonomous operation without reliance on external networks or computation.

24 Claims, 11 Drawing Sheets

(56) References Cited

U.S. PATENT DOCUMENTS

| | | | | |
|---|---|---|---|---|
| 2019/0097818 A1* | 3/2019 | Lu | ......................... | H04L 9/3263 |
| 2019/0098004 A1 | 3/2019 | Mars | | |
| 2019/0262208 A1 | 8/2019 | Levesque | | |
| 2021/0083872 A1 | 3/2021 | Desmarais | | |
| 2022/0116214 A1 | 4/2022 | Jentzsch | | |
| 2023/0169510 A1* | 6/2023 | Koh | ................ | G06Q 20/40145 |
| | | | | 705/71 |
| 2023/0222197 A1* | 7/2023 | Derakhshani | ............. | G06T 7/60 |
| | | | | 713/186 |
| 2024/0211947 A1 | 6/2024 | Ergen | | |
| 2024/0289798 A1* | 8/2024 | Koshy | ................ | G06Q 20/3829 |

OTHER PUBLICATIONS

Dimitrova, M. Dec. 11. 2020). Vulnerabilities in Verifone and Ingenico PoS Devices Could Enable Hackers to Steal and Clone Credit Cards. How To, Technology and PC Security Forum | SensorsTechForum.com. https://sensorstechforum.com/verifone-ingenico-pos-devices-vulnerable. 2 pages.

FATF. (2020). Virtual assets red flag indicators of money laundering and terrorist financing. Financial Action Task Force. Retrieved from https://www.fatf-gafi.org/content/dam/fatf-gafi/guidance/RBA-VA-VASPs.pdf. 59 pages.

Stennikov, A., & Yunusov, T. (2020). POSWorld: Vulnerabilities within Ingenico Telium 2 and Verifone VX and MX series terminals. Black Hat Europe 2020. Retrieved from https://i.blackhat.com/eu-20/Thursday/eu-20-Stennikov-POSWorld-Should-You-Be-Afraid-Of-Hand-Ons-Payment-Devices-wp.pdf. 63 pages.

\* cited by examiner

SELF-CONTAINED BIOMETRIC DEVICE, SYSTEM, AND METHOD FOR SECURE DIGITAL TRANSACTIONS, IDENTITY VERIFICATION, AND MULTI-CURRENCY ASSET MANAGEMENT

CROSS-REFERENCE TO RELATED APPLICATIONS

This application claims priority to U.S. Prov. Pat. App. No. 63/798,105, filed on May 1, 2025, entitled, "Self-Contained Biometric Device and Method for Secure Digital Transactions, Identity Verification, and Multi-Currency Asset Management," which is hereby incorporated by reference in its entirety.

BACKGROUND

Current biometric identity verification, point-of-sale (POS) payment systems, healthcare identification, international travel identity management, multi-currency transactions, and incentive systems predominantly rely on external devices such as smartphones, smart cards, passports, or centralized verification infrastructures (Dimitrova, 2020). These distributed systems are riddled with weaknesses such as theft, data interception, identity fraud, unauthorized access, non-compliance with regulatory requirements, breach of privacy, and weak user incentives. Most of these risks result from reliance on consistent network connection, third-party mediators, and surveillance performed over the cloud or using automated methods (Stennikov & Yunusov, 2020; CISA, 2023). For example, studies have established that POS gadgets such as Verifone and Ingenico devices are susceptible to attacks, thus leaving their users vulnerable to having their data stolen (Dimitrova, 2020). Also, vulnerability arising from virtual assets with criminals using the virtual assets for money laundering and illicit acts has also been an issue of concern to the Financial Action Task Force (FATF) (FATF, 2020). In healthcare, centralized records and ID cards are still common, posing challenges to privacy and security (Stennikov & Yunusov, 2020).

Current POS systems are based on external hardware or cloud-based authentication, lacking robust security measures (Stennikov & Yunusov, 2020). Financial transaction systems have limitations in their ability to function without network connectivity (CISA, 2023). Similarly, international travel identity systems rely on physical documents or centralized databases that may not fully align with emerging standards such as the ISO 18013-5 mobile identification and W3C Decentralized Identifiers (FATF, 2020). Healthcare verification often relies on centralized records or physical ID cards, which can create challenges for secure and private access to health information (Stennikov & Yunusov, 2020).

Existing solutions in the market have various limitations in addressing security and privacy concerns. Many systems lack advanced security techniques for protecting sensitive data, and few offer comprehensive solutions that work across different application domains. The current technological landscape presents opportunities for innovation in how identity verification, financial transactions, and data security are handled across healthcare, travel, and other sectors where secure identification and transactions are critical.

SUMMARY

Embodiments of the present invention provide a self-contained biometric device that may perform secure digital transactions, identity verification, and multi-currency asset management without requiring continuous network connectivity or external devices. The device may be configured in various form factors, including subdermal implants, dermally-applied biometric tattoos, ergonomic external wearables (such as wristbands, rings, or patches), or smart cards. In some cases, the device may operate autonomously in both online and offline modes, executing biometric authentication, transaction processing, and identity verification entirely within the device's secure hardware environment.

The device may include a biometric verification module that captures and authenticates physiological characteristics such as fingerprints, iris patterns, facial features, voiceprints, or vascular patterns. In some embodiments, the device may store cryptographic keys, digital identity credentials, and biometric templates within a hardware-isolated storage module that may be physically separated from external networks. The device may permit access to stored credentials and keys only after successful biometric authentication, providing multiple layers of security for sensitive data.

Embodiments of the device may include a transaction processing module that executes digital asset transactions entirely within the device, supporting various types of digital currencies including central bank digital currencies (CBDCs), regulated stablecoins, and tokenized assets. The device may perform real-time currency conversions and maintain internal transaction ledgers that operate independently of network connectivity. In some cases, the device may provide sensory feedback through haptic vibrations, visual indicators, thermal changes, or audible alerts to notify users of transaction outcomes and authentication results.

Some embodiments may include machine learning-based inference engines that analyze transaction patterns and user behavior entirely within the device to generate personalized financial insights and detect anomalous activities. The device may support local communications through near-field communication (NFC), Bluetooth Low Energy (BLE), or other short-range protocols for secure data exchange with nearby trusted hardware without requiring external computation resources.

In one embodiment of the present invention, a self-contained biometric device for secure digital transactions may include a housing that comprises one of a subdermal implant housing, a dermally-applied biometric tattoo substrate, an ergonomic external wearable housing, or a smart card. The housing may maintain consistent secure functionality during both offline and online operation modes. The device may include a biometric verification module that captures a biometric input of a user and performs user authentication based on the biometric input entirely within the self-contained biometric device. A hardware-isolated storage module may be physically isolated from external networks for storing cryptographic keys, credentials, and biometric templates. The self-contained biometric device may permit access to the cryptographic keys and credentials only upon successful user authentication by the biometric verification module. A transaction processing module, resident inside the hardware-isolated storage module, may be configured to execute digital asset transactions entirely within the self-contained biometric device in the offline operation mode.

In another embodiment of the present invention, a method performed by a self-contained biometric device for secure digital transactions may include capturing, by a biometric verification module of the self-contained biometric device, entirely within the self-contained biometric device, a biometric input of a user.

The method may include performing physiologic liveness verification using one or more modes, such as vascular biometric logic, including detection of at least one of blood flow characteristics, skin impedance variation, thermal-pulse synchronization patterns, micro-movement detection, perspiration analysis, spectral reflectance properties, pupil dilation responses, facial micro-expressions, subcutaneous vein mapping, or bioelectrical signal patterns to determine that the biometric input originates from a live human subject. These multimodal liveness verification embodiments provide enhanced security by creating a layered defense against sophisticated spoofing attempts, as attackers would need to simultaneously defeat multiple independent verification mechanisms, significantly reducing the risk of unauthorized access through artificial or non-living biometric presentations.

The method may include storing cryptographic keys, credentials, and biometric templates in a hardware-isolated storage module of the self-contained biometric device, wherein the hardware-isolated storage module may be physically isolated from external networks. The method may include performing, by the biometric verification module, user authentication based on the biometric input and the determination that the biometric input originates from the live human subject, entirely within the self-contained biometric device. The method may include permitting access to the stored cryptographic keys and credentials only upon successful user authentication by the biometric verification module. The method may include executing, by a transaction processing module resident inside the hardware-isolated storage module, digital asset transactions entirely within the self-contained biometric device in an offline operation mode.

DETAILED DESCRIPTION

Figure 1:
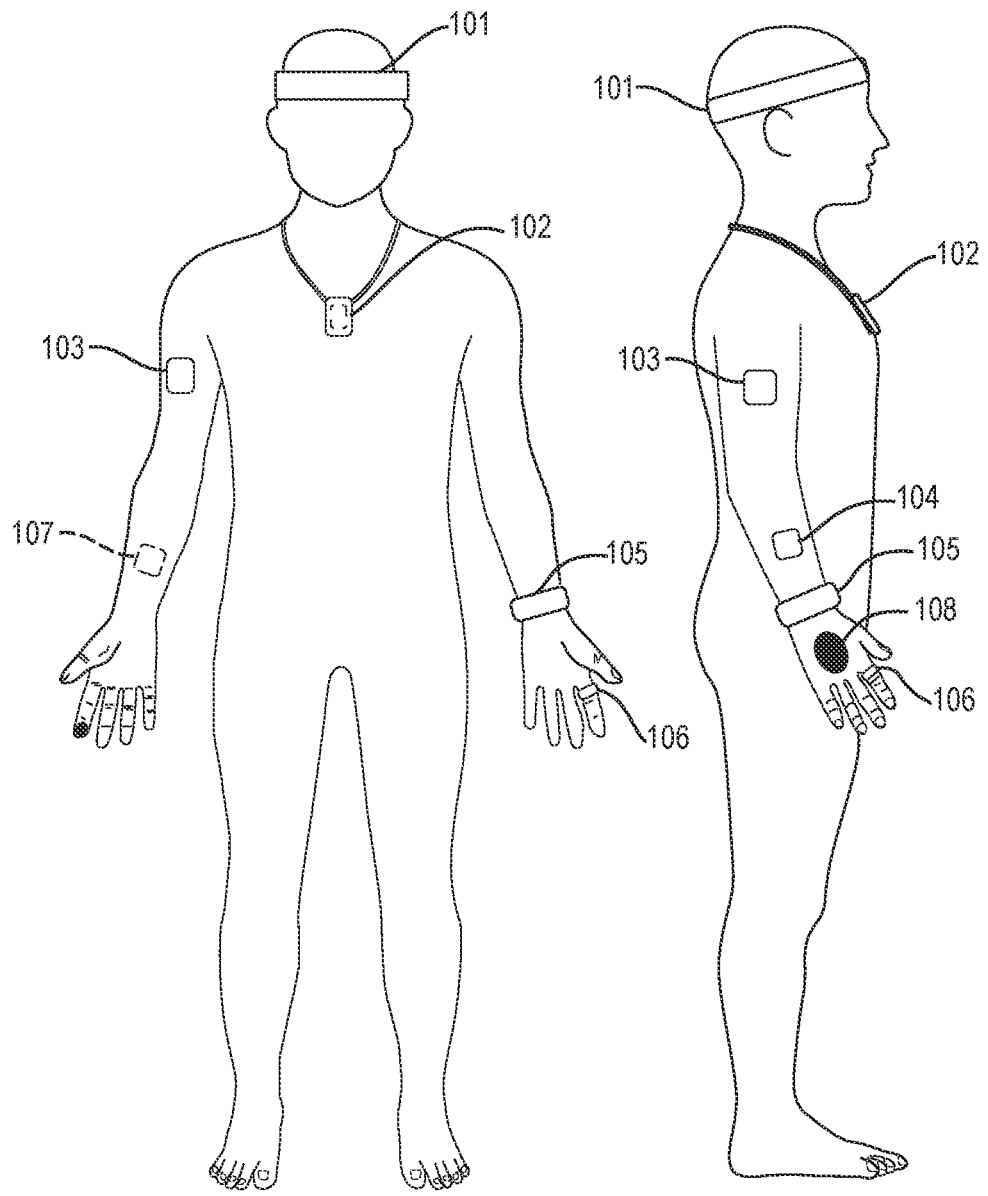
FIG. 1 illustrates anatomical placement options for embodiments of the present invention in various form factors.
Figure 2:
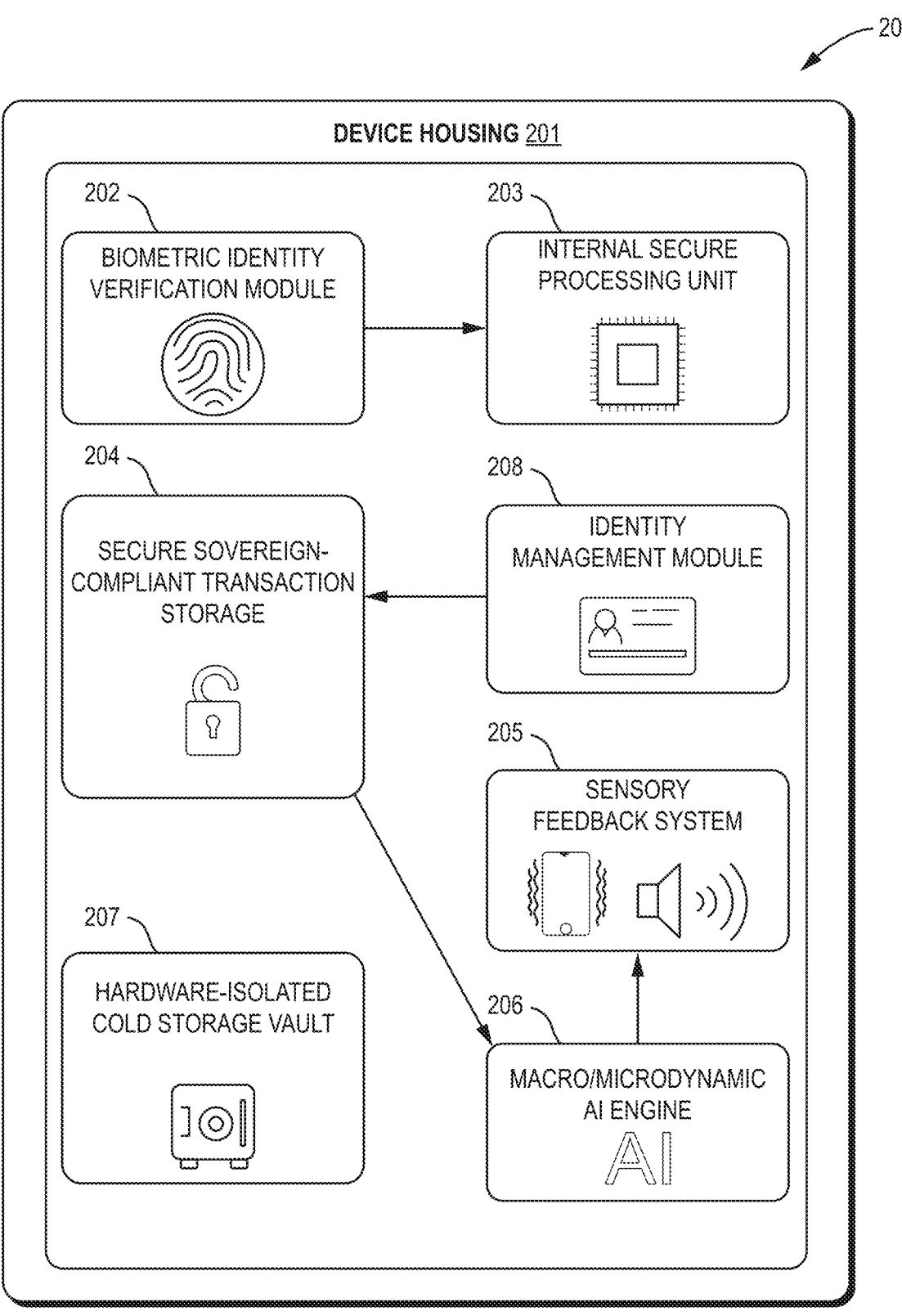
FIG. 2 illustrates internal modules of various embodiments of the present invention.
Figure 3A:
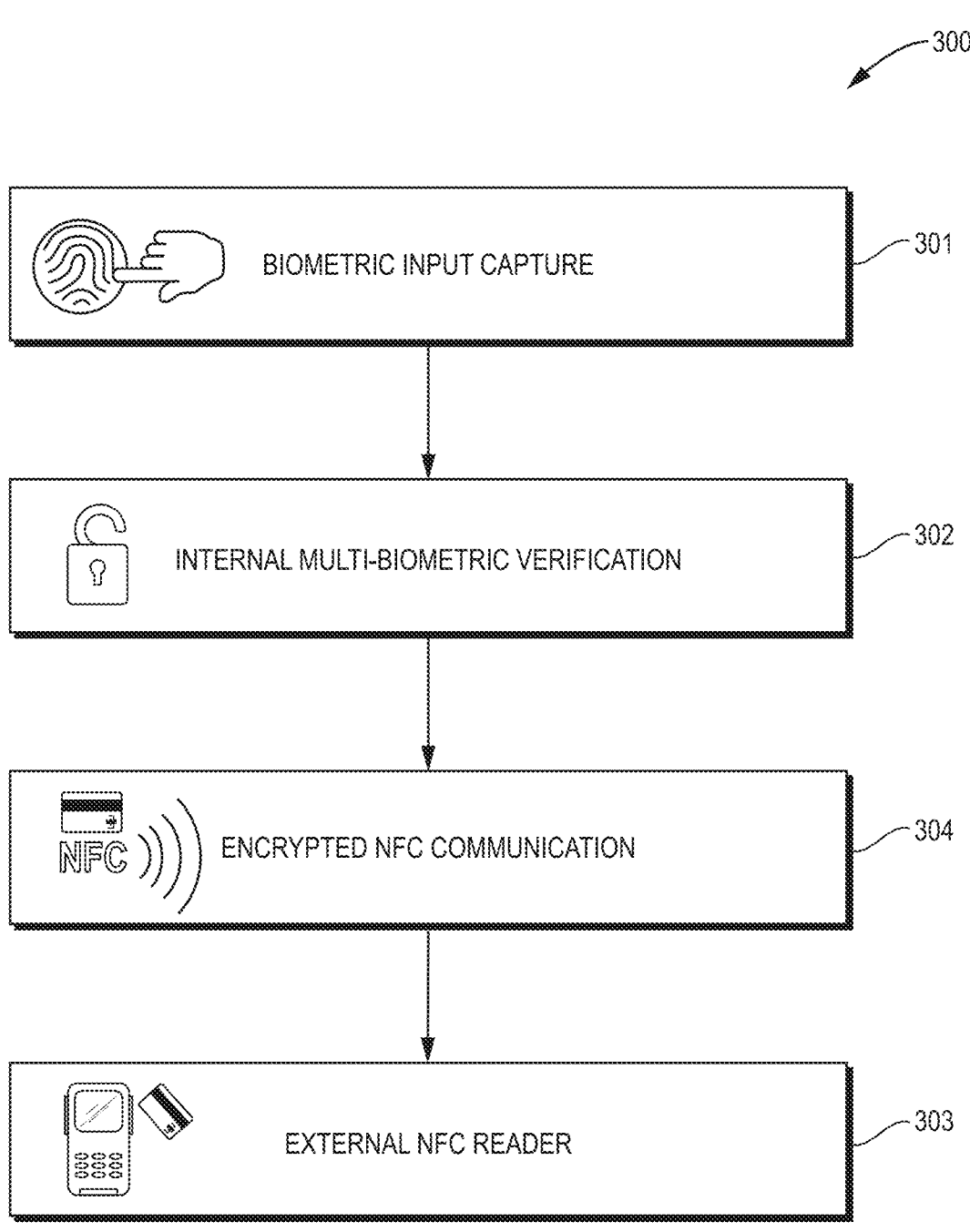
FIG. 3A illustrates a high-level flow of a biometric identity verification and secure wireless communication process according to one embodiment of the present invention.
Figure 3B:
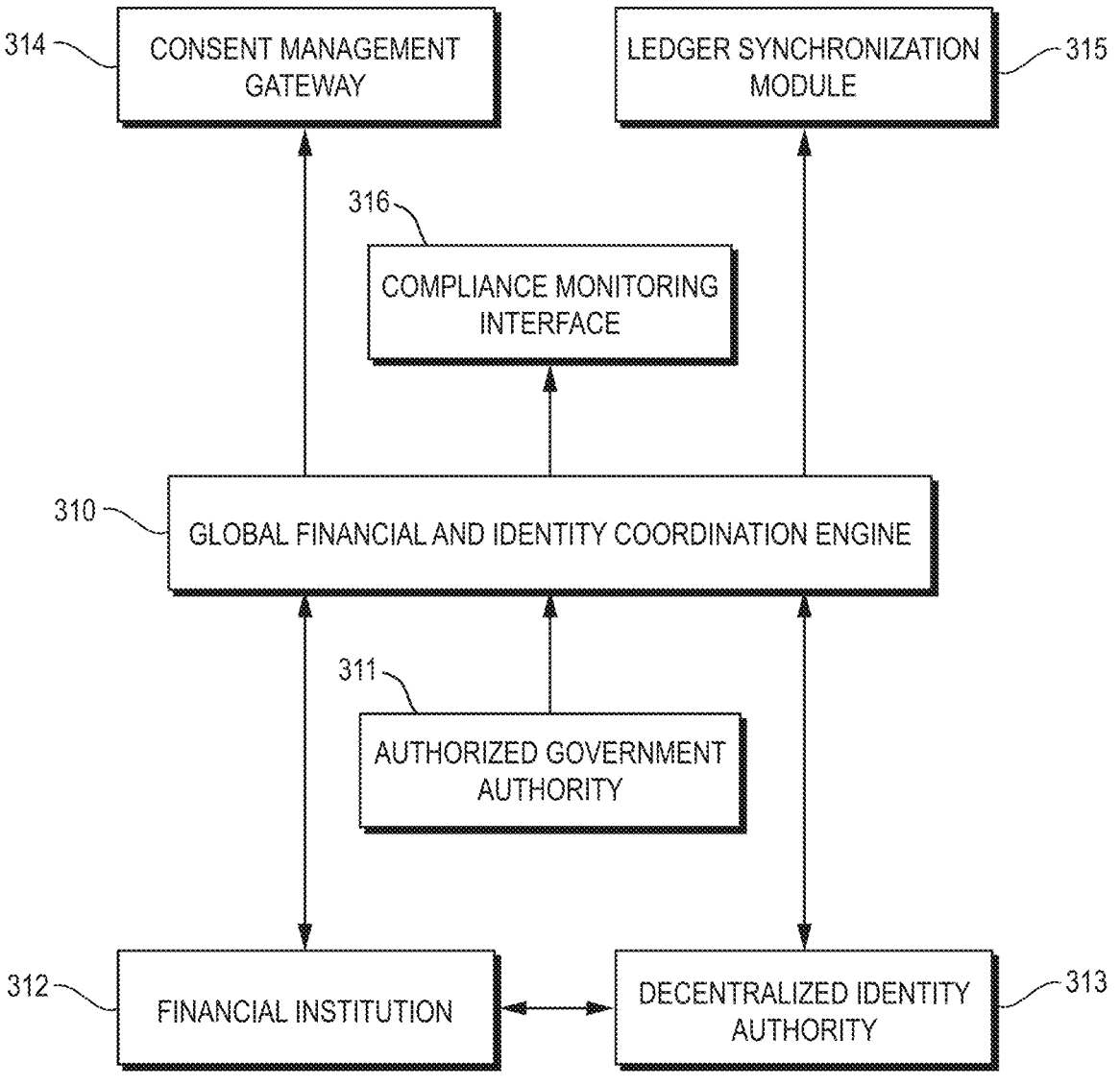
FIG. 3B presents a schematic overview of a global identity and financial coordination engine according to one embodiment of the present invention.
Figure 4:
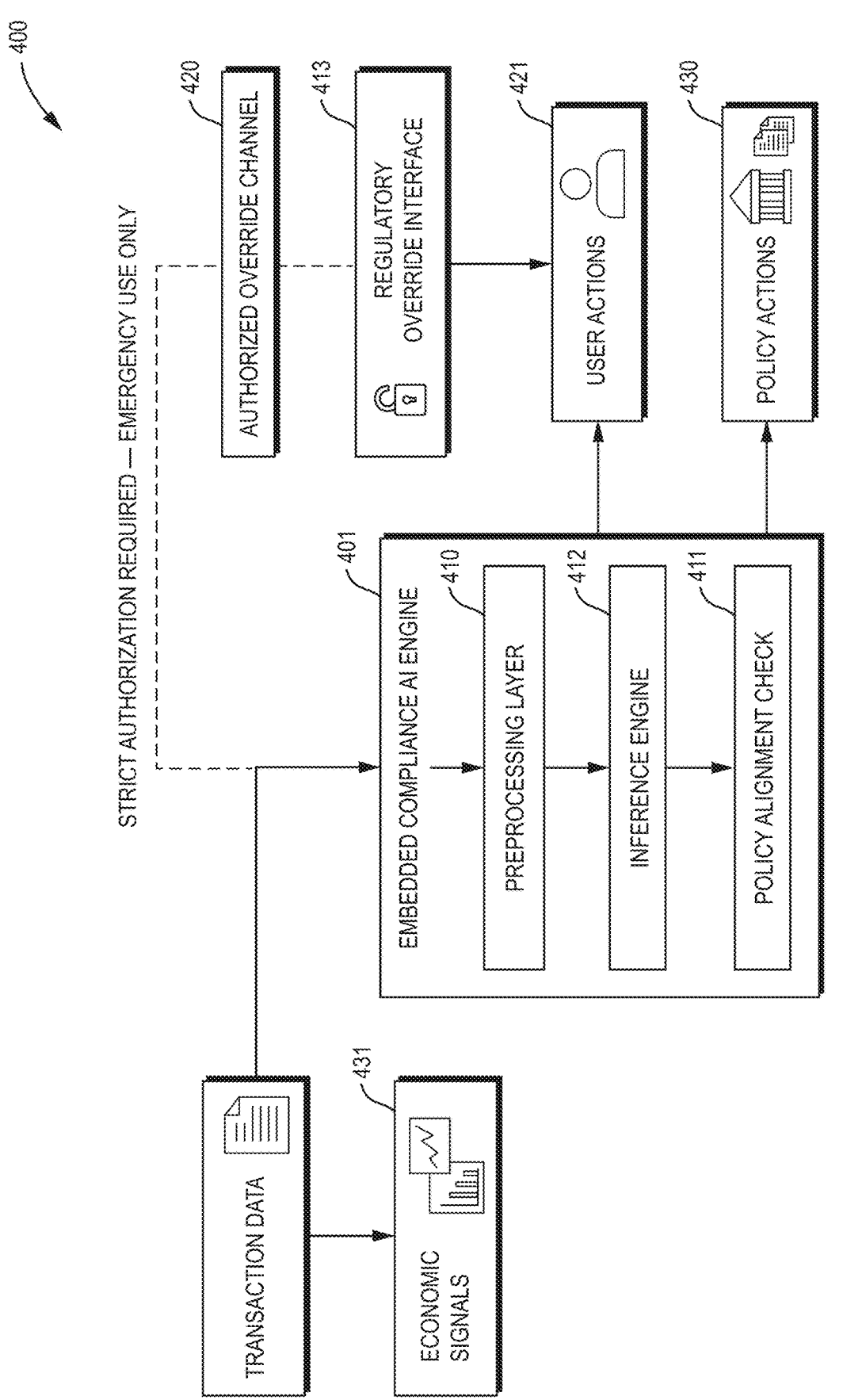
FIG. 4 depicts a functional diagram of an embedded compliance AI module implemented according to one embodiment of the present invention.
Figure 5:
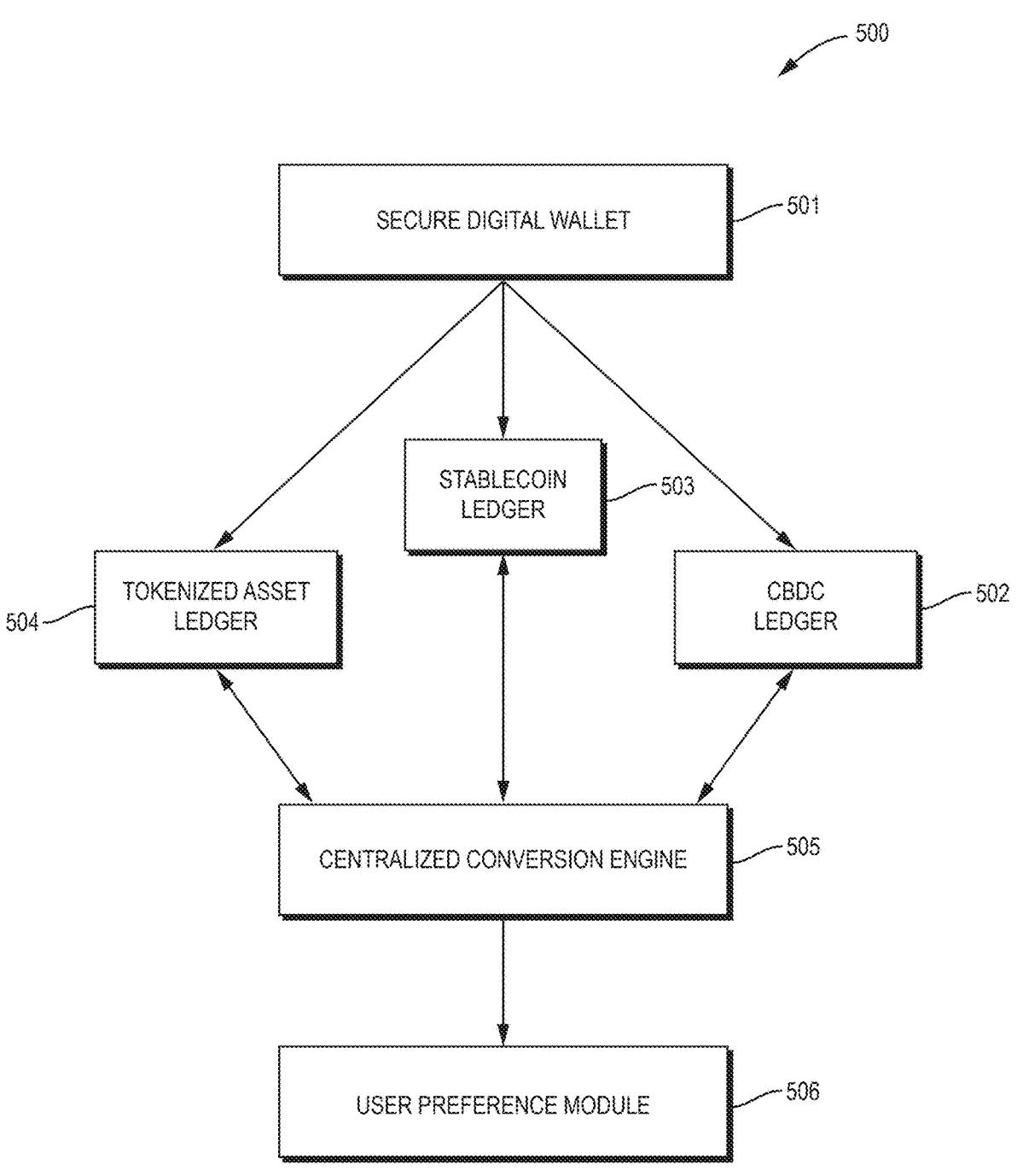
FIG. 5 illustrates a high-level multi-currency asset management flow implemented according to one embodiment of the present invention.

Embodiments of the present invention relate to self-contained, biometric-enabled financial management and sovereign-compliant digital identity devices. These devices may be configured in various form factors, including sub-dermal implants, dermally-applied biometric tattoos, ergonomic wearable devices (for example, wristbands, rings, skin patches, pendants, or head-mounted units), or smart cards. In one embodiment, the device may be implemented as a dermally-applied biometric tattoo using any biocompatible material capable of supporting biometric identity verification, encrypted financial management, sensory feedback, and sovereign-compliant digital identity functions. Such dermal embodiments may be temporary or semi-permanent, depending on material selection and user preference. Regardless of form factor, embodiments of the present invention may operate as a unified system delivering comprehensive, user-centric financial micromanagement empowered by integrated, personalized artificial intelligence (AI) tools.

In some embodiments, the device may securely manage an embedded sovereign-compliant transaction vault containing tamper-resistant fiscal modules optimized for executing financial transactions and performing real-time currency conversions across regional, national, or global monetary systems. Additionally, embodiments of the present invention may incorporate a secure, sovereign-compliant digital identity (ID) system designed for interoperability across jurisdictions, utilizing standardized identity credentials and protocols (such as ISO 18013-5 mobile identification standards and W3C Decentralized Identifiers). This consent-based identity framework may enable cross-border biometric identity verification without reliance on continuous external network connectivity, while also supporting optional secure integration with authorized third-party identity verification platforms.

A component of various embodiments may be the inbuilt Authorized Digital Incentive Module (ADIM), which may reveal programable monetary or non-monetary rewards to users once they accomplish predefined and explicitly verified tasks or behaviours, specifically those meant to inform behavioral health objectives. Incentives may be issued by user-consented entities, including, but not limited to, governmental authorities, employers, healthcare providers, behavioral health institutions, private organizations, or regulatory bodies. The ADIM may operate under conditions of explicit user consent and may not support unauthorized, continuous, or autonomous AI-driven surveillance. This design may ensure the preservation of user privacy, autonomy, and dignity while enabling secure, consent-based participation in behavior-linked incentive programs.

In some embodiments, the system may include an encrypted internal cold data storage module embedded within the device, designed for secure, consent-based collection, storage, and management of sensitive data such as biometric identifiers, financial transaction records, AI-driven fiscal analytics, and user-approved geolocation data. Access to stored data may be controlled through robust multi-factor biometric identity verification and cryptographic authentication protocols, and may be limited to explicitly authorized individuals (for example, the user, designated regulatory authorities, institutional compliance officials, or other user-consented personnel). All oversight or audit capabilities may be defined to exclude any unauthorized or automated AI-driven monitoring.

Embodiments of the present invention may be fully self-contained and engineered to operate automatically and reliably in both online and offline modes, independently of external smartphones or mobile computing devices. These embodiments may internally execute all core functions-including biometric identity verification, financial transaction authorization, AI-driven analytics, authorized digital asset incentive module distribution, and authorized regulatory oversight or data management-without requiring continuous external network connectivity or cloud support.

Additionally, some embodiments may incorporate an embedded AI-driven treasury management platform that adjusts user-specific financial strategies and asset allocations. The platform may do so by analyzing anonymized, real-time transaction data, decentralized liquidity signals, and macroeconomic and microeconomic indicators, which may be gathered through secure, periodic network interactions. This adaptable AI treasury engine may operate entirely within the device's internal hardware and may, if needed, interface with authorized institutional frameworks to support broader fiscal analytics and responsive economic policy actions. In various embodiments, all AI functions may be governed by predefined, transparent constraints and may activate in response to user-initiated or regulator-approved requests, which may help ensure there is no autonomous AI-driven surveillance or behavioral health monitoring.

In some embodiments, to address specialized conditions, the device may optionally include advanced interface and control modules such as a neural interface module and a conditional emergency override module. The optional neural interface module may remain dormant and isolated from all device operations unless explicitly activated by the user through informed consent (and any required regulatory authorization). This may ensure that the sensitive neural interface is never engaged without deliberate user initiation. Similarly, an optional emergency override module may be reserved for authorized interventions under clearly defined emergency circumstances. Activating the emergency override module may require verified multi-signature approval from designated authorities or detection of regulator-defined emergency trigger events. Each engagement of the emergency override module may be limited to genuine emergency conditions and may be transparently logged via a tamper-evident audit mechanism, thereby potentially preventing any routine or unauthorized external control over the device. Additionally, for users engaged in behavioral health programs, the override module may also provide safeguards to ensure that interventions related to mental or behavioral health emergencies may be administered in a manner that is transparent, consensual, and consistent with behavioral health regulations.

The following are non-limiting explanations of how certain terms are used herein. These explanations are provided by means of example and not limitation:

Physiological Signature: User-specific biometric input of a user securely captured, authenticated, and verified directly within the self-contained biometric device. The biometric verification module may internally detect and verify one or more physiological modalities, including but not limited to liveness vascular pattern analysis, iris recognition, facial geometry mapping, voiceprint authentication, and fingerprint recognition. Biometric verification and user authentication based on the biometric input occurs entirely within the device's secure hardware environment, independent of external biometric databases or external network authentication systems.

Multi-Currency Sub-Ledger: Secure, internally managed digital partitions within the embedded wallet infrastructure, enabling device-native, user-authenticated management, real-time AI-driven optimization, exchange, and reconciliation of various digital asset transactions. Supported asset types explicitly include central bank digital currencies (CBDCs), regulated stablecoins, tokenized financial instruments, and fiat-linked digital representations, all managed by the transaction processing module independently of continuous external network reliance, functioning in both offline operation mode and online operation mode.

Sensory Feedback Actuator: Device-integrated modules specifically designed to provide immediate user-perceptible notifications through reversible chemical signals, precise vibration sequences, controlled temperature changes, visible light patterns, or audible sound alerts. Each sensory signal distinctly corresponds to events such as transaction approvals or rejections, biometric identity verification results, authorized incentive awards, or critical macroeconomic or microeconomic alerts.

Global Financial and Identity Coordination Engine: A securely embedded machine learning-based inference engine integrated within the self-contained biometric device, autonomously processing anonymized financial transaction data and biometric identity verification data sourced directly from the device. This engine enables personalized fiscal management and secure, consent-based interactions with authorized national or international monetary systems (for example, central bank digital currency platforms). It operates exclusively under predefined, authorized governance frameworks, explicitly excluding automated or unauthorized AI-driven surveillance.

AI Treasury Management Platform: An embedded analytical engine operating entirely within the self-contained biometric device, autonomously recalibrating personalized asset allocations, financial strategies, and currency conversions based upon internally processed real-time transaction flow data, decentralized liquidity market signals, anonymized peer-to-peer financial interactions, and aggregated economic indicators. This platform supports dynamic user-level wealth optimization and optional institutional-level economic responsiveness, operating independently of continuous external networks and explicitly excluding automated AI-driven behavioral surveillance.

Encrypted Internal Data Storage Module: A hardware-isolated storage module within the self-contained biometric device, designed to securely capture, encrypt, and manage biometric templates, cryptographic keys, credentials, financial analytics, transaction records, and authorized geolocation data exclusively upon explicit user consent. Access to the stored data is tightly restricted through robust multi-factor biometric identity verification and cryptographic authentication protocols, permitting access solely to explicitly authorized individuals (such as the user, designated regulatory authorities, institutional compliance officials, or other user-consented entities). Unauthorized or automated AI-driven access to stored data is explicitly excluded.

Neural Interface Module: An optional device-integrated interface supporting potential neural integration with the user (for example, brain-computer interaction). This module remains completely dormant and isolated from all other device functions unless explicitly activated through informed user consent (and any required regulatory authorization). Once activated, it enables controlled, bidirectional communication between the user's neural signals and the device's electronics, remaining securely isolated from the device's financial, identity, and cryptographic subsystems. Explicit user initiation and strict subsystem isolation ensure no unintended or unauthorized neural-device interactions can occur.

Emergency Override Module: An optional secure override module within the self-contained biometric device that can be activated exclusively under strictly defined emergency conditions authorized by verified multi-signature protocols. Activation requires approval from multiple designated authorities (such as regulatory, institutional, or authorized private entities) or the detection of regulator-defined emergency trigger events. When activated under these conditions, the emergency override module permits limited, authorized intervention in device operations and generates a tamper-evident audit log of each override event, ensuring transparency, confinement to genuine emergency use, and prevention of unauthorized external control.

Authorized Digital Incentive Module (ADIM): An embedded subsystem within the self-contained biometric device configured to issue programmable digital incentives-financial or non-financial (e.g., digital currency, loyalty points, access acknowledgments) based on verified user task completions, behavioral achievements, biometric authentications, or other authorized activities. Incentives may be issued by user-consented entities, including but not limited to governmental bodies, employers, healthcare providers, behavioral health institutions, private organizations, or regulatory authorities. All incentive issuance operates under explicit user consent, without unauthorized surveillance or behavioral profiling, and may involve financial or non-financial digital assets stored within the device's hardware-isolated storage module.

Embodiments of the present invention provide a self-contained biometric device for secure digital transactions, identity verification, and multi-currency asset management that may be configurable as a subdermal implant housing, an ergonomic external wearable housing, a dermally-applied biometric tattoo substrate, or a smart card, operable seamlessly in both offline operation mode and online operation mode. In various embodiments, the device may integrate a biometric verification module that captures a biometric input of a user and performs user authentication, decentralized identity management, and a hardware-isolated storage module physically isolated from external networks for storing cryptographic keys, credentials, and biometric templates. Embodiments of the device may specifically include:

A biometric verification module ensuring secure authentication of the authorized user, which may capture multiple types of biometric inputs and perform multi-factor authentication using at least two different types of the biometric inputs.

A hardware-isolated storage module physically isolated from external networks for storing cryptographic keys, credentials, and biometric templates, which may support cryptocurrencies, tokenized assets, and fiat-linked digital representations.

A local communications interface configurable for short-range data exchange without reliance on external computation, which may include Near-Field Communication (NFC) for encrypted contactless transactions.

A standards-compliant digital identity system supporting interoperability with international identity standards (ISO 18013-5 and W3C Decentralized Identifiers), which may store identity credentials encoded in a format compatible with ICAO Doc 9303, enabling interoperability with ePassport verification systems.

A machine learning-based inference engine that analyzes transaction data entirely within the self-contained biometric device and may recalibrate user-specific financial strategies using transparent AI models, activated only in response to user-initiated or regulator-authorized requests, for financial management.

Sensory feedback modules providing intuitive user alerts via distinct tactile vibrations, visual indicators, controlled thermal cues, or acoustic signals to signify transaction outcomes, identity verification results, and security/status notifications.

A programmable digital incentive engine issuing financial or non-financial incentives solely upon explicit user consent (e.g., after completing predefined tasks or upon successful biometric verification).

An emergency override module that may be activated only under strictly predefined emergency conditions and only with multi-signature authorization from designated authorities, which may enable conditional access to the stored cryptographic keys by a designated secondary agent.

PCI DSS (Payment Card Industry Data Security Standard): The device may integrate the practices outlined by PCI DSS for payment processing. PCI DSS compliance may help ensure that the device securely handles payment card data during transactions, safeguarding against fraud and minimizing the risk of data breaches. This may be beneficial for payment integration, helping the device adhere to security requirements for digital payment systems.

eIDAS Regulation (Electronic Identification and Trust Services): In some embodiments, the device may comply with the eIDAS Regulation, which may be useful for interoperability across European Union jurisdictions. eIDAS addresses the legal aspect of electronic identification and trust services and may allow the device to complete cross-border identity verification and delivery of trusted digital services within EU. This means that the device may comply with EU digital regulatory requirements and enable secure identification and verification procedures.

All of these modules may be protected by multi-factor biometric authentication, and strong cryptography protocols. The transaction processing module, resident inside the hardware-isolated storage module, may be configured to execute digital asset transactions entirely within the self-contained biometric device in the offline operation mode. The device may be capable of autonomous conduct of transactions, incentive distributions, identity checks, and compliance in a completely offline mode on its own hardware, with optional synchronization on network reconnection. In various embodiments, all of the core functions from biometric identity checks to transaction processing, AI analytics, incentive provision and authorized regulatory oversight may be performed on-device, without dependency on outboard smartphones or persistent network connectivity.

Embodiments of the present invention provide a number of important benefits, starting from complete dual-mode autonomy. These embodiments may function in both online and offline modes without requiring additional external smartphones or cloud communications. This may ensure uninterrupted operation even in settings that lack a stable internet connection. Embodiments of the present invention may be implemented in various form factors including subdermal implants, external wearables, dermally-applied biometric tattoos, or smart cards. This flexibility may enable integration for diverse user needs and scenarios to provide adaptable solutions for different situations and preferences.

In addition to the flexible form factors, embodiments of the present invention may include on-device transparent AI analytics. All AI-powered financial studies and identity verification may be performed with internal computations, potentially eliminating the need for external cloud computing and reducing the possibility of intrusive behavioral monitoring. The device may further incorporate embedded sensory feedback, providing intuitive tactile, thermal, visual, or acoustic signals to enhance user awareness regarding transaction statuses and security events in real-time. Moreover, the interoperable identity management system may make embedded digital identity credentials compatible with international standards, such as ISO 18013-5 and W3C Decentralized Identifiers (DIDs), supporting inter-jurisdictional recognition of the user's identity.

Further, embodiments of the present invention may also comprise a secure authorized override mechanism that permits emergency override only through authorized multi-signature authorization under specifically stipulated emergency conditions. This may support regulatory needs while preserving user autonomy. These embodiments may also use privacy-preserving verification that confirms user attributes without disclosing sensitive personal data utilizing zero-knowledge proofs. Biometric-secured asset access may enhance security by implementing biometric-gated access to cold-stored digital assets and identity credentials to achieve robust tamper-resistance against unauthorized control (verified/certified sender, smart-enclave, firmware-rooted, silicon-rooted). Lastly, the system may be developed with regulatory compliance designed into it, which may involve integrated governance and audit modules that promote transparent compliance on data protection and financial regulations, enabling trust and legal harmonization across jurisdictions.

Embodiments of the self-contained biometric device may be configured in various form factors, including a subdermal implant housing, a dermally-applied biometric tattoo substrate, an ergonomic external wearable housing, or a smart card. Each of these embodiments may incorporate the same secure core components and may perform autonomous operations in both online and offline operation modes. These configurations may provide secure biometric identity management, multi-currency financial transaction capability, and decentralized identity credential storage, while preserving user privacy and regulatory compliance.

In some embodiments of the present invention, the housing may comprise a subdermal implant housing. The subdermal implant housing may be encapsulated within a biocompatible, tissue-safe material, suitable for placement within the dorsal forearm, wrist, hand, or finger. The subdermal implant housing may include the secure hardware architecture, power management system, and communication interface, and may provide biometric identity verification, transaction execution, sensory feedback, and decentralized identity management functionalities. User-perceptible notifications may be delivered via vibrational signals or thermal modulation perceivable beneath the skin. Wireless communication (for example, near-field communication (NFC) or Bluetooth Low Energy (BLE)) may support secure external interactions. The subdermal implant housing may be designed for operational durability under medical safety standards.

In some embodiments of the present invention, the housing may comprise the ergonomic external wearable housing, such as a wristband 105, ring, pendant, skin patch, or headband 101. The ergonomic external wearable housing may contain the same secure modules within a durable, user-friendly casing. The self-contained biometric device may facilitate biometric identity verification through the biometric verification module 202, transaction authorization via the transaction processing module, decentralized identity credential management, and authorized compliance operations. Feedback to the user may be provided through the sensory feedback system 205, which may generate tactile vibration sequences, visual light cues, controlled temperature changes, or chemical signals. The ergonomic external wearable housing may support periodic recharging through contact or wireless energy transfer and may align with applicable consumer electronic device standards.

In some embodiments of the present invention, the housing may comprise the dermally-applied biometric tattoo substrate. The dermally-applied biometric tattoo substrate may utilize a flexible, biocompatible substrate applied directly to the user's skin, embedding microelectronic components capable of performing biometric capture, transaction execution, decentralized identity management, sensory signaling, and secure communication functions. The dermally-applied biometric tattoo substrate may be designed for temporary or semi-permanent duration, depending on material and operational requirements. Sensory feedback may be conveyed through reversible chemical indicators, subtle tactile sensations, thermal modulation, or miniature light-emitting elements integrated into the skin-applied system. The dermally-applied biometric tattoo substrate may maintain secure core capabilities similar to the subdermal implant housing and the ergonomic external wearable housing embodiments, while featuring an ultra-thin form factor.

In some embodiments of the present invention, the housing may comprise a smart card. The smart card housing may include a thin, credit card-sized form factor that incorporates the secure hardware architecture, biometric verification module 202, and transaction processing capabilities. The smart card housing may be configured to harvest operating power from a local electromagnetic field and store the harvested power in an onboard power storage system to enable biometric capture and secure transaction operations. In some cases, the smart card housing may include a biometric sensor, such as a fingerprint reader, embedded within the card surface. The smart card housing may support the same secure core components as other embodiments, maintaining consistent functionality in both online and offline operation modes. The smart card housing may facilitate compatibility with existing payment infrastructure while providing enhanced security through biometric verification and hardware-isolated storage of credentials and cryptographic keys.

Regardless of form factor, each embodiment of the present invention may incorporate the following core functional modules:

Biometric Verification Module: Captures and verifies physiological biometric input of a user (such as vascular patterns, iris scans, facial structure, voiceprint, or fingerprints) securely within the self-contained biometric device. User authentication based on the biometric input may be performed entirely within the self-contained biometric device without reliance on external biometric databases, using hardware-isolated processing techniques.

Transaction Processing Module: Manages multi-currency digital assets within a hardware-isolated storage module physically isolated from external networks. Supports central bank digital currencies (CBDCs), regulated stablecoins, tokenized assets, and fiat-linked representations. Digital asset transactions may be executed entirely within the self-contained biometric device in offline operation mode without exposing stored cryptographic keys externally.

Hardware-Isolated Storage Module: Stores cryptographic keys, credentials, and biometric templates aligned with international interoperability standards (ISO 18013-5, W3C DIDs). The self-contained biometric device may permit access to the cryptographic keys and credentials only upon successful user authentication by the biometric verification module. Internal storage, credential proof generation, and verification processes may operate within secure isolated environments.

Sensory Feedback Module: Provides real-time event notifications to users via discreet multimodal outputs, including tactile vibrations, visible light patterns, reversible chemical indicators, thermal sensations, and acoustic tones. These feedback signals may correspond to authentication outcomes, transaction statuses, incentive awards, or compliance alerts.

Local Communications Interface: Facilitates encrypted wireless data exchange through secure near-field communication (NFC), Bluetooth Low Energy (BLE), or equivalent protocols. All communications may be short-range, user-controlled, and encrypted. The local communications interface may be configurable for short-range data exchange without reliance on external computation.

Machine Learning-Based Inference Engine: Analyzes transaction data entirely within the self-contained biometric device, including biometric events, financial activity patterns, and authorized behavioral metrics. Provides user-oriented financial insights, risk alerts, and compliance monitoring without external cloud reliance. The machine learning-based inference engine may analyze biometric input and interaction patterns over time to generate a drift metric reflecting deviations from baseline user behavior.

Embodiments of the present invention may include any one or more of the following modules:

Compliance AI Module: Monitors internal transaction activity and behavioral signals for compliance with user-configured rules and regulatory frameworks. Compliance events may be analyzed locally; no unauthorized profiling or surveillance occurs. Regulatory intervention triggers may require multi-party authorized approvals.

Authorized Digital Incentive Module (ADIM): Allows issuance of programmable incentives (financial or non-financial) upon user-verified task completions, biometric authentications, or authorized activity milestones. Incentives may be securely stored within the device's cold storage system and may be audited under authorized conditions. Incentives may include digital tokens, loyalty points, access-based acknowledgments, or symbolic recognitions, and are not limited to cryptocurrency, monetary or physical formats.

Secure Emergency Override Module: An optional module dormant during normal operations, activatable only under verified multi-signature authorization protocols involving multiple independent authorities. Activation conditions, override parameters, and tamper-evident audit trails may be designed to prevent unauthorized use. Internal override trigger algorithms and control pathways are intentionally omitted from this disclosure to protect the system's integrity.

Embodiments of the biometric financial device, in any of its form factors (subdermal implant, dermally-applied biometric tattoo, external wearable device, or smart card), may include an embedded AI engine configured to perform localized policy simulations based on real-time, anonymized data and explicitly user-authorized inputs. This on-device capability may enable proactive financial insights and optional institutional collaboration. In various embodiments, all analysis may be executed internally, without reliance on any centralized infrastructure or external cloud services.

Analysis categories that may be supported by the AI engine include any one or more of the following:

Anonymized transaction velocity indicators (e.g., overall spending and savings rates).

General inflation or deflation indicators (e.g., wage growth and price trends).

Aggregated cross-border digital asset movement patterns

Usage metrics for decentralized or tokenized assets (collected without individual user identification)

Based on these analytics, embodiments of the device may generate simulated policy adjustment recommendations for internal review, such as:

Adjusting certain monetary or asset-allocation parameters (for simulation purposes only, with no autonomous enforcement).

Notifying the user or authorized regulatory entities of aggregated financial risk indicators Suggesting asset reallocation strategies aligned with the user's explicitly defined risk preferences In some embodiments, these internally generated recommendations may be informational in nature and may not be acted upon autonomously by the device. The recommendations may provide secure, reviewable outputs for the user's consideration or for authorized regulatory review. Each recommendation may be securely logged within the device; if audit features are enabled, these logs may be accessed by authorized third parties. This approach may support sovereign oversight capabilities while maintaining the privacy and autonomy of the individual user.

Whether configured as a subdermal implant, a dermally-applied biometric tattoo, an external wearable device, or a smart card, embodiments of the present invention may securely process user identity verification and digital asset transactions through a comprehensive multi-step workflow, which may include one or more of the following:

The user may initiate a transaction by providing a biometric identifier (for example, a fingerprint, iris scan, or facial recognition). The device's internal system may locally match this biometric input against a securely stored template to confirm the user's identity.

In some embodiments, the device's embedded AI engine may internally verify the requested transaction against the user's available assets and predefined parameters (e.g., transaction value, destination, and contextual usage limits). This verification may occur entirely on-device, helping to ensure that sensitive financial or personal data is not exposed to any external system during the approval process.

Upon successful identity and asset verification, embodiments of the present invention may internally sign and execute the transaction using private cryptographic keys stored in a hardware-isolated secure module. The system may support a range of asset types, including central bank digital currencies (CBDCs), regulated stablecoins, and other programmable digital tokens. Each transaction may then be recorded on a tamper-resistant internal ledger. If network connectivity is available and secure, the device may optionally synchronize a cryptographically signed record of the transaction to an authorized external ledger or blockchain for redundancy and oversight.

In various embodiments, the user may obtain instant, discreet feedback from the device itself as to the outcome of the transaction. For instance, a particular vibration pattern or subtle light suggestion may confirm a transaction's success, while a different sensory signal may indicate a failure of the transaction (e.g. lack of funds or a biometric mismatch). Such feedback signals may be private to the user and may keep the user informed instantaneously on the result without any need for external display.

This secure transaction flow may be closely coupled with the device's abilities for digital identity management. In some embodiments, the architecture may conform with international standards in digital identity (such as ISO 18013-5 mobile identification and W3C Decentralized Identifiers) to achieve interoperability of identity verification between different jurisdictions and platforms. Embodiments of the present invention may have continuous functionality, on and offline, through the use of internal credential storage and cryptographically signed operations for asset handling and identity authentication. In design, embodiments of the present invention may be autonomous in conducting transactions yet thorough with explicit options for authorized regulatory override or secure assimilation in defined emergency conditions or under jurisdictional requirements.

Each embodiment of the present invention (subdermal implant, dermally-applied biometric tattoo, external wearable device, or smart card) may incorporate a configurable data synchronization module that may provide programmable, conditional control over when and how data is shared with external authorized systems (such as regulatory databases or institutional platforms). All core operations of the device-including biometric authentication, digital asset management, AI-driven analytics, and secure transaction authorization—may remain fully functional and uninterrupted when the device is offline. However, when a secure and trusted network connection becomes available, the synchronization module may initiate a controlled, encrypted data transfer according to predefined policies.

Synchronization parameters and policies may be predefined or dynamically adjusted, and may be based on factors such as any one or more of the following:

Jurisdictional regulatory reporting requirements

Institutional policy frameworks (for example, scheduled audit or compliance reporting intervals).

AI model recalibration cycles and updates

Risk management triggers and fraud detection thresholds

Energy usage and network bandwidth optimization considerations

The data eligible for synchronization may be deliberately limited to ensure privacy and compliance. In some cases, the data may include anonymized transaction logs, aggregated AI analytics data, or cryptographically secured summary attestations (e.g., zero-knowledge proof artifacts). All synchronized information may be curated to maintain user privacy while satisfying legitimate oversight requirements. Every synchronization event may enforce security measures, such as one or more of the following:

Obtaining positive user biometric consent for the data transfer (or invoking a duly authorized policy-based override in exceptional cases)

Using end-to-end encrypted communication channels (such as mutually authenticated TLS or secure near-field communication protocols) for any data exchange Applying cryptographic signing and verification to all transmitted data to guarantee integrity and authenticity The synchronization policies themselves may support secure remote updates and revocation. Authorized administrators (for example, a designated regulatory authority or compliance officer) may update the device's synchronization rules or disable external synchronization entirely, in accordance with evolving jurisdictional or organizational requirements.

In various embodiments, the synchronization functionality may be supplemental to the device's primary operations. The device's autonomy and core capabilities may not be compromised by any synchronization event, and all essential features of the device may remain operational regardless of network connectivity status. This design may ensure continuous service for the user under various conditions.

Regardless of the type of housing (subdermal implant, dermally-applied biometric tattoo, external wearable device, or smart card), upon completion or rejection of a user transaction or identity verification (or upon the generation of a significant authorized macroeconomic alert), the self-contained biometric device may provide a discreet on-body sensory notification directly to the user. The sensory feedback system 205 may operate under the user's control at all times. The sensory feedback system 205 may deliver immediate alerts to the user without reliance on any external screens or companion devices, potentially ensuring that each notification remains private and user-centric.

Embodiments of the self-contained biometric device may utilize one or more integrated sensory feedback modalities to convey information to the user. These feedback types may include, but are not limited to, gentle vibration signals, light pressure sensations, and/or mild temperature changes, such as a slight, momentary warming or cooling of the device area. Additionally, in some cases, the self-contained biometric device may use safe and reversible chemical-based indicators applied to the skin, producing temporary, non-therapeutic sensory signals at the surface. The self-contained biometric device may emit brief visible light flashes or subtle auditory tones, providing notifications for the user.

Each feedback type may be optional and may be configured by the user to correspond to specific event outcomes. For example, the user may assign a particular vibration pattern to indicate a successful transaction and a different pattern to signal a failed authentication attempt. The user may be able to enable or disable any category of feedback, tailoring the notifications to personal preferences and comfort.

In various embodiments of the present invention, all sensory signaling methods and materials may be designed to be biocompatible, non-toxic, and strictly limited to surface-level effects. Each signal may be safe, reversible, and non-therapeutic, potentially ensuring it causes no lasting changes or harm to the body. This design may provide immediate user awareness and reassurance while complying with health and safety regulations for wearable and implantable technology.

Under normal operation, these sensory notifications may be private to the user and may serve solely as personal alerts. When the self-contained biometric device is operating within an authorized regulatory or international interoperability framework (explicitly approved by relevant authorities), the same sensory feedback system 205 may be utilized in a manner that supports compliance and user awareness in broader, global operations. In all cases, individual privacy and user sovereignty may be maintained. No external entity may trigger or alter the self-contained biometric device's feedback signals without the user's explicit consent and authorization.

Embodiments of the biometric financial and identity management device—whether configured as a subdermal implant, ergonomic external wearable, dermally-applied biometric tattoo, or smart card—may include an optional global integration module designed to interface with emerging global digital currency and international identity frameworks. This integration capability may remain dormant by default and may become active only upon explicit user opt-in, subject to applicable jurisdictional authorization requirements. Activation may be fully voluntary and under user control, helping to ensure that participation in broader monetary networks may never occur automatically or without user consent.

When activated under authorized conditions, embodiments of the device may support any one or more of the following global functions:

Standards Compatibility: Interoperability with authorized global digital currency standards (for example, standardized central bank digital currencies or international settlement networks) may be supported only when such standards are officially adopted and user activation is confirmed. Until activation, all global currency features may remain disabled.

Macroeconomic/Microeconomic Indicators: Embodiments of the device may perform internal, anonymized aggregation of transaction data to generate real-time macroeconomic indicators beneficial to the user, such as personal spending trends or generalized economic signals. This information may remain confined to the device unless the user chooses to authorize its external sharing.

Cross-Border Transactions: Embodiments of the device may securely record and manage cross-border digital transactions. If explicitly authorized by applicable regulatory authorities (and with user consent), the device may participate in cross-jurisdictional compliance reporting through authenticated cryptographic records. Otherwise, cross-border transaction capabilities may remain dormant.

Global Identity Verification: Embodiments of the device may support generalized identity verification for international travel, commerce, or cross-border services. Identity verification across jurisdictions may be enabled only under dual conditions: user activation and jurisdictional authorization.

Adaptive Financial Management: The embedded AI engine 206 in embodiments of the device may offer private, on-device recommendations that adapt to global economic trends (for example, suggesting changes in currency holdings or spending patterns). These adaptive suggestions may be provided solely for user review and may not be autonomously enforced.

User Sovereignty: All global integration functions may be optional and user-controlled. Unless explicitly activated under appropriate legal and regulatory frameworks, the global integration module may remain dormant, helping to ensure user data sovereignty and operational privacy at all times.

The device enrollment and setup process in embodiments of the present invention may be engineered to be secure, modular, user-centric, and fully compliant with commercial and governmental interoperability standards. This process may help ensure that the self-contained biometric device—whether configured as a subdermal implant, ergonomic wearable, dermal biometric tattoo, or smart card—is securely connected to the user's financial and identity systems, while supporting autonomy and privacy. The secure enrollment procedure may include the following modular steps:

1. Device Provisioning: The self-contained biometric device may be provisioned in a user's preferred form factor, for example: A subdermal implant (within the remits of applicable medical devise regulations and approvals). An ergonomic wearable device (a set of wristbands or rings, patches or pendants or headbands). A dermally-applied biometric tattoo (compliant with health and safety standards for skin-applied devices) In all embodiments, biocompatibility, user safety, and operational integrity may be considered.

2. Initial Registration: During secure initial registration, the self-contained biometric device may be cryptographically paired with the user's approved digital currency wallets and identity verification services using secure, authorized communication channels. In some embodiments, this registration may be facilitated through mini-hub stations or secure onboarding tablets that provide a controlled environment for the initial setup process. No unencrypted personal data may be transmitted during enrollment. Global network connections (if applicable) may remain inactive until explicitly activated by the user post-enrollment.

3. User Configuration Options: The user may be presented with configuration options governing financial management, transaction behavior, and device functionality. Options may include settings for automatic currency conversion, growth-focused financial optimization, manual transaction approvals, or default risk preferences. All configuration choices may be securely stored internally on the self-contained biometric device and may remain fully modifiable by the user. In some cases, these configuration options may be presented through a secure interface on mini-hub stations or field tablets, particularly in environments with limited infrastructure.

4. Identity Credentials Management: The self-contained biometric device may provide secure interfaces for the user to input, update, revoke, or replace stored personal identity credentials (for example, biometric profiles or decentralized digital IDs). All identity data may be encrypted within the device's hardware-isolated storage module. Identity data may be disclosed externally only through explicit, user-authorized credential proofs during verified transactions.

a. User Consent Focus: Throughout device enrollment and operation, all processes may be controlled by the user. Advanced features such as cross-border identity verification or global monetary integration may remain inactive until explicitly enabled. No unwanted features or third-party integrations may be forced upon the user during setup. When using mini-hub stations or NGO field tablets for enrollment, the same user consent principles may apply, with clear authorization steps required before any data exchange occurs.

b. Compliance with Interoperability Standards: The enrollment system may be designed to integrate securely with existing financial systems (e.g., banking and payment networks) and identity frameworks (e.g., ISO 18013-5 mobile IDs, W3C Decentralized Identifiers), without requiring modification of those systems. This interoperability may extend to enrollment processes conducted through mini-hub stations or tablets, which may maintain the same security standards and protocols as other enrollment methods.

Figure 6:
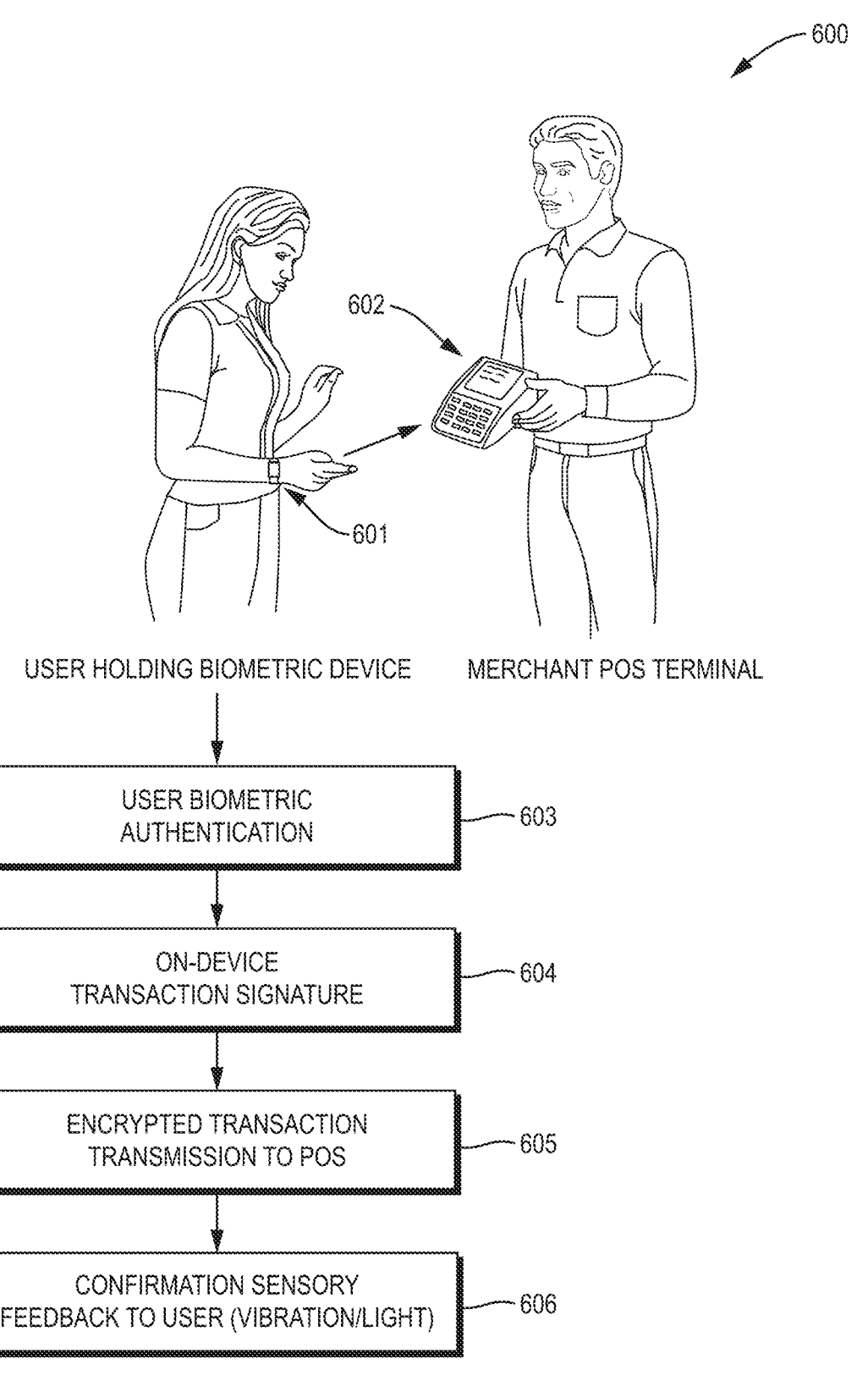
FIG. 6 illustrates a general process flow for a secure point-of-sale (POS) transaction using a device implemented according to one embodiment of the present invention.
Figure 7:
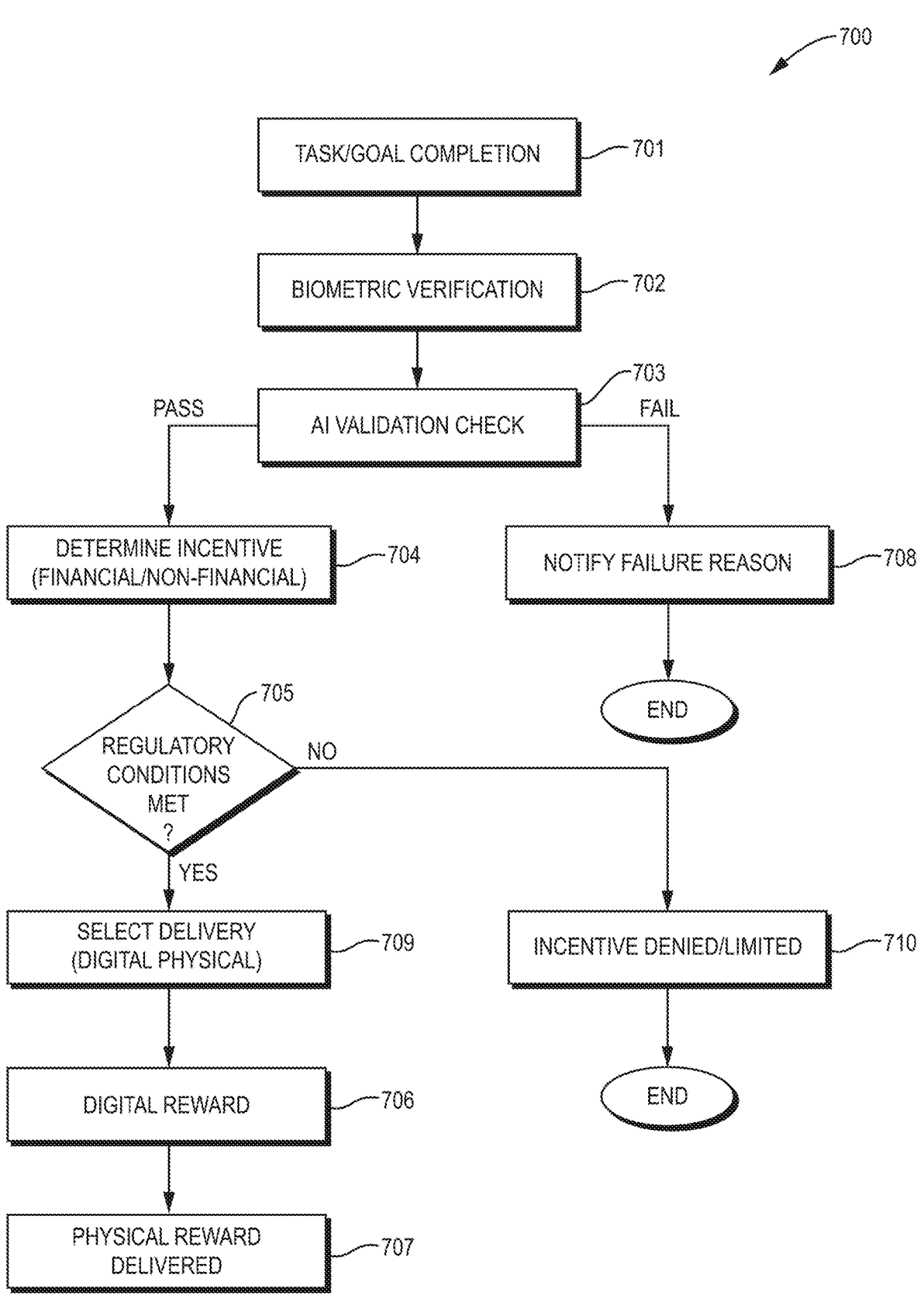
FIG. 7 describes a behavioral incentive subsystem implemented according to one embodiment of the present invention.
Figure 8:
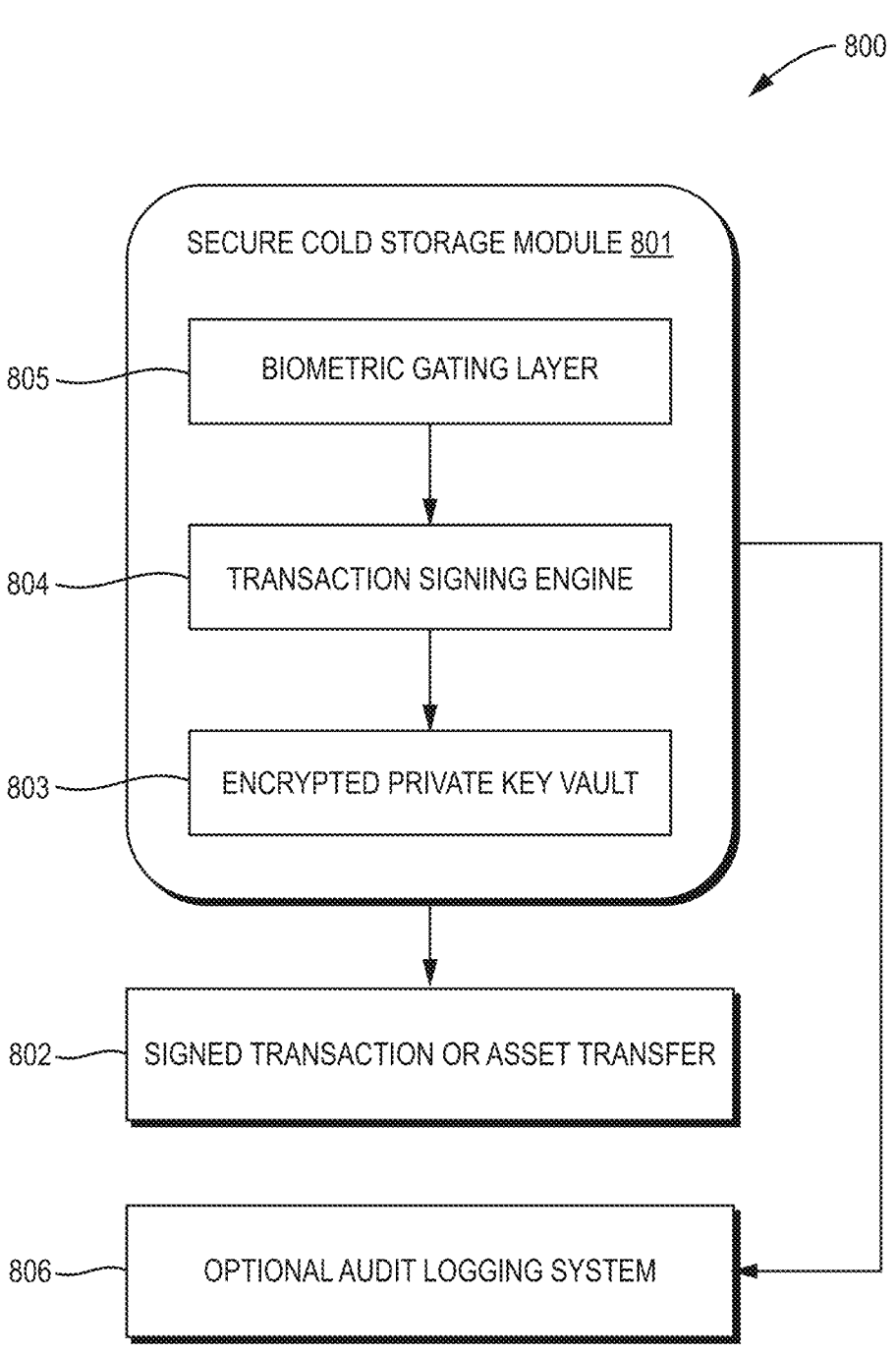
FIG. 8 illustrates a high-level architecture of a secure cold storage and digital asset issuance system within a device implemented according to one embodiment of the present invention.

Referring to FIG. 6, embodiments of the self-contained biometric device (whether configured as an ergonomic wearable, a subdermal implant, a dermally-applied biometric tattoo, or a smart card) may support a secure, standardized point-of-sale (POS) transaction flow that may be fully compatible with existing commercial payment infrastructure. Each transaction may be carried out through a series of controlled steps to help ensure security, user consent, and interoperability:

Initiation: The user may deliberately bring the biometric device 601 into close proximity with a merchant terminal 602 equipped with a standard near-field communication (NFC) interface. This physical action may be entirely user-controlled; no transaction may commence without the user's intentional presence and explicit initiation.

Secure Handshake: The biometric device 601 may automatically initiate an encrypted communication handshake with the merchant terminal 602 via the NFC link. This exchange may establish a secure channel without exposing any sensitive internal data or cryptographic keys. The handshake may use established payment encryption standards to maximize compatibility and security.

Biometric Authentication: Before any payment details are transmitted, the biometric device 601 may internally verify the user's identity using the biometric verification module 202. For example, the biometric verification module 202 may match a stored fingerprint, iris pattern, or other physiological signature. This verification step may occur entirely within the device's secure hardware enclave-no biometric data may be sent to the merchant terminal 602. The transaction may proceed only upon a successful match, helping to ensure that only the authorized user can approve and execute the payment.

Account Selection: Upon successful authentication, the biometric device 601 may automatically select an appropriate payment account or digital currency from its secure wallet for the transaction. For instance, the biometric device 601 may default to the local fiat currency or choose an optimal currency based on predefined user preferences (such as utilizing a particular stablecoin or loyalty reward balance). This selection process may be performed internally and transparently, aligning with the merchant's accepted payment types without requiring any manual input from the user at the moment of sale.

Authorization Signal: After account selection, the biometric device 601 may generate a payment authorization response. A confirmation signal (e.g., a cryptographically signed approval code or token) may then be transmitted to the merchant terminal 602 to formally authorize the transaction. The authorization may be formatted according to standard payment network protocols, allowing the merchant's existing systems to process the transaction as seamlessly as a traditional credit card or mobile payment.

Ledger Update: Immediately following authorization, the biometric device 601 may update its internal transaction ledger. The selected wallet balance may be debited by the transaction amount, and a secure record of the transaction may be stored within the device's memory. If the biometric device 601 is online or upon the next secure synchronization with a broader financial network (for example, a blockchain system defi or a bank's ledger cefi), the biometric device 601 may transmit a confirmation of the transaction to update external records-all without exposing any private keys or detailed wallet credentials. These ledger updates may occur automatically and may remain invisible to both the user and merchant, potentially ensuring a seamless experience.

User Notification: Almost instantaneously, the biometric device 601 may provide the user with a private sensory notification indicating the transaction result (approval or rejection). For example, the biometric device 601 might emit a gentle vibration, a subtle audible tone, or a brief light indicator to confirm a successful payment. This immediate feedback may give the user assurance of the outcome without having to rely solely on the merchant's receipt or display, and it may maintain privacy by conveying the status in a discreet manner.

Throughout the POS transaction flow, the process may be fast, secure, and firmly under the user's control. Embodiments of the biometric device 601 may utilize standard communication technologies (such as NFC and/or BLE) and existing payment authorization formats) to remain interoperable with POS systems worldwide. At the same time, sensitive user data—like biometric identifiers and private cryptographic keys—may never leave the biometric device 601. No payment may proceed without the user's biometric confirmation and deliberate action, thereby supporting user consent and security at every step.

Embodiments of the present invention may include a Secure Override Module as a specialized dormant capability embedded within each device embodiment (wearable, implant, or tattoo), intended for use only under exceptional circumstances and with proper high-level authorization. In typical operation, this module may remain completely inactive and isolated from the device's normal functions, preserving user privacy and ensuring the device operates without external interference. Only upon receipt of a securely authenticated command from designated governmental authorities—such as in a declared national emergency or cybersecurity threat—may this module be activated under strict controls.

Upon an authorized activation of the override, the module may execute certain predefined actions in accordance with government directives, limited to the scope of the emergency. For example, the Secure Override Module may perform any one or more of the following functions:

Re-verify Identity: Initiate an immediate biometric re-authentication sequence to reaffirm that the device is being used by its rightful owner, adding an extra layer of security during the override event.

Restrict or Modify Functions: Temporarily adjust, limit, or disable specific device functionalities or access to certain digital assets as instructed by the authorized override command (for instance, freezing a particular payment capability or restricting use of the device's wallet for the duration of the emergency condition).

In some embodiments, any override action may be executed under stringent multi-party governance to prevent misuse. In particular, the system may include: Multi-Signature Authorization: No single official or entity may unilaterally trigger the override; multiple designated authorities may jointly authenticate and approve the override activation.

Credential Verification: Each participating authority may undergo secure credential verification (using approved government identity authentication methods) before the device accepts any override command.

Tamper-Evident Audit Logging: Every override command and action may be recorded in a secure, tamper-evident audit log within the device. This log may provide a transparent record for post-incident review and ensures accountability for all parties involved in the override.

In various embodiments, to maintain user trust, the override capability may not be activated autonomously by the device and may be architected so that it may not be engaged without the proper external authorization outlined above. Under normal circumstances, the existence of the override module may not affect the user's control over the device or their data. If an emergency override is ever activated, the device may also provide an indication to the user (such as a distinct vibration pattern or visual alert) that an override mode is in effect, ensuring the user is aware of the change in operational status even as the situation is handled in a secure and controlled manner.

Embodiments of the present invention may include an Incentive Module as an optional incentive subsystem integrated into the device's architecture, regardless of the device form factor (wearable, implant, tattoo, or smart card). The Incentive Module may be designed to securely grant programmable incentives to users for certain behaviors or verified biometric events. Activation of this module may be entirely at the user's discretion-users may opt in to participate and may opt out at any time, potentially ensuring user consent and control over its operation. When enabled, the incentive module may grant various types of rewards directly to the user in recognition of approved actions. These incentives may be financial (for example, deposits of digital currency, tokens, or loyalty points into the user's on-device wallet) and/or non-financial (such as access privileges, achievement badges, or other recognition granted through the device's associated applications).

Typical incentive-triggering events may be evaluated securely within the device. By way of example, the module may deliver incentives for any one or more of the following:

Security and Compliance Actions: Completion of user-specified security tasks or compliance checks (e.g., regularly performing device backups or security audits).

Verified Biometric Actions: Consistent and successful biometric authentications or identity verifications over time, reflecting the user's continued secure use of the device.

Wellness and Behavior Milestones: Achievement of certain health, wellness, or behavior goals monitored by the device's sensors (for instance, maintaining a prescribed activity level or other biometric wellness targets configured by the user).

In some embodiments, the module may evaluate whether the predefined criteria for a reward have been met entirely on the device itself, using secure algorithms and data stored in the device's protected memory. Once a qualifying event is confirmed, the corresponding reward may be dispensed directly to the user's secure wallet partition or linked account on the device. This direct on-device issuance may help ensure the integrity of the reward delivery and may prevent external manipulation. The user may also be promptly notified of the reward through a discreet sensory cue or alert from the device, providing immediate feedback while maintaining privacy (for example, a gentle vibration or notification light indicating a new reward has been added).

In various embodiments, to support fairness, privacy, and regulatory compliance, reward distributions may be conducted in accordance with applicable legal and ethical standards. The system's reward logic may be designed to avoid biased or discriminatory criteria, and it may operate without collecting or transmitting personal data to external servers. Users may be provided with clear yet general guidelines about what types of actions or achievements are eligible for rewards. However, the exact evaluation algorithms, specific thresholds, and detailed parameters that trigger rewards may be kept confidential and adjustable only by the system's secure firmware. This approach may help prevent users or malicious actors from manipulating the reward system and may protect the proprietary logic that underpins the reward mechanism.

The modular, self-contained design of embodiments of the present invention may allow autonomous operation with reliable multi-factor biometric verification both off and online. Such a design may make deployment possible in various sectors and may reduce the need for constant external network connectivity. Embodiments of the present invention may be suitable for industries with secure financial transactions, identity confirmation, decentralized asset management, and real-time data processing. The following sections describe key deployment contexts where embodiments of the present invention may be particularly applicable.

In financial systems applications, embodiments of the present invention may provide secure storage, transfer and multi-currency operations and cross border interoperability of digital currencies. This capacity may be suitable for national and international financial systems as it may allow holding secure transactions and may help reduce the level of fraud.

In healthcare deployment contexts, embodiments of the present invention may facilitate secure biometric patient verification and access to medical records while helping protect against privacy-deficient identity verification and unauthorized treatment. This may enhance patient confidentiality and may increase the efficacy of healthcare systems.

In behavioral health and incentive program contexts, embodiments of the present invention may serve biometrically verified wellness and behavior alteration efforts, which may safely dispense corporate digital appreciation. These rewards may be tied to the completion of actualized personal health or performance milestones in a consumer's implementation plan while maintaining user privacy and consent.

For travel and border security applications, embodiments of the present invention may provide reliable biometric-based authentication of identity in travel and border security businesses for international travel. These embodiments may securely store and present the validated credentials to border control systems, potentially improving security and streamlining travel.

In e-commerce and retail deployment contexts, embodiments of the present invention may deliver contactless biometric authentication and payment authorization for point-of-sale terminals. This capability may enhance the security of transactions, potentially lowering the risks of a $43 billion dollar year credit card fraud loss, which is forecasted to increase over the next decade. Thus, embodiments of the present invention may offer a solution to building a safer and more efficient shopping platform for both consumers and retailers.

For government and public sector use cases, embodiments of the present invention may support the unified identification of biometric citizens for secure access to public services. These embodiments may also enable aggregated anonymized economic and identity data analytics and may be utilized in suitable conditions to advance public service delivery and policy-making.

In the blockchain and decentralized finance (DeFi) industries and deployment contexts, embodiments of the present invention may enable biometrically protected transaction approval. These embodiments may connect safely with blockchain systems and decentralized systems for asset management, which may safeguard the private keys and user credentials and may help maintain the integrity of transactions.

In critical infrastructure protection applications, embodiments of the present invention may facilitate sustained use of the biometric identity enforcement that regulates access to sensitive facilities and systems. This may enhance security perimeters, as only credible persons may access critical infrastructure.

Regarding consistent operational profile and scalability, embodiments of the present invention may maintain a consistent operational profile across all use cases, whether routine or specialized. These embodiments may scale through optional advanced capabilities while preserving user control, privacy, and data sovereignty. This may help ensure that, regardless of the deployment context, embodiments of the present invention may function in a secure and adaptable manner, potentially empowering users while safeguarding their personal data.

Embodiments of the biometric financial and identity device may employ a multilayered security architecture with modular components to protect data and operations in all scenarios. This system security architecture design may ensure continuous data integrity, user privacy, data sovereignty, transaction authenticity, and regulatory compliance whether the device is operating offline (peer-to-peer) defi, or connected to centralized networks.

The cold storage encryption security feature of embodiments of the present invention may ensure that all private cryptographic keys for the user's digital assets and identity credentials are generated and stored in encrypted form inside an isolated, device-resident storage vault. This internal cold-storage module may be kept offline from any external interface and may not be directly accessed via external networks. Sensitive keys may never leave the device's secure enclave and may be only used internally (for signing transactions or authentication) when the user passes the proper biometric checks. By containing keys entirely on-device and away from internet exposure, embodiments of the system may protect against remote theft or unauthorized extraction of cryptographic credentials.

The dual-layer communication security feature in various embodiments may protect data exchange using two layers of encryption whenever the device communicates with external systems or with other devices. This dual-layer scheme may use a combination of symmetric cryptography (for efficient, secure data transfer) and asymmetric cryptography (for secure key exchange and endpoint authentication). The communication protocols may meet or exceed modern international security standards, keeping data in transit confidential and safe from tampering or interception by unauthorized parties.

A notable aspect of the security design in embodiments of the present invention is the autonomous offline operation security feature that may allow the device to perform core functions without continuous network connectivity. All critical processes—such as identity enforcement verification, transaction authorization, and activity logging—may occur locally on the device's hardware. The device may not depend on any external server to make decisions, meaning the device may remain fully functional even in offline or remote environments. When network access becomes available or is needed (for example, to sync a batch of transactions or update compliance data), the device may connect through secure protocols, but only under user control or predefined conditions. This offline-capable architecture may reduce exposure to central network-based attacks and may prevent any compromise of security in the absence of an internet connection.

The biometric access control security feature in some embodiments may ensure that every sensitive operation on the device is gated by real-time physiological identity enforcement verification to ensure that only the authorized user can initiate the operation. The device may use the owner's unique physiological signature (such as a fingerprint, iris scan, voiceprint, or vascular pattern) to verify identity before permitting actions like transaction approval, credential sharing, or data updates. Because a live biometric check may be required for each critical action, an attacker may not execute transactions or access stored data just by stealing the device or knowing a password. This tight coupling of device functionality with the user's biometrics may guarantee that the device's financial and identity capabilities are non-transferrable and securely tied to the legitimate owner.

The anomaly detection engine security feature in various embodiments may include an integrated engine that continuously monitors the device's usage patterns and system state to quickly identify suspicious behavior. The anomaly detection engine may analyze factors such as transaction frequency and amount, login or access attempts, biometric scan discrepancies, and communication requests in real time. If the engine detects a deviation or anomaly that suggests fraud or a security breach (for example, a burst of high-value transactions that is out of character, or repeated failed biometric scans), the anomaly detection engine may automatically trigger protective responses. These responses may include temporarily locking certain functions, alerting the user or administrators, and recording the event for audit. By reacting to anomalies as they occur, embodiments of the system may help preempt unauthorized access or fraudulent transactions before they escalate, adding a proactive security layer beyond standard encryption and authentication measures.

The hardware integrity safeguards security feature in some embodiments may incorporate multiple hardware-level defenses to resist tampering and physical compromise. The device casing may be tamper-resistant and may include seals or sensors that detect attempts to open or alter the hardware. Internally, the electronics may run integrity checks—for instance, verifying that firmware hasn't been modified and that critical circuits are functioning as intended. If a serious tampering attempt or fault is detected, the device may invoke self-protection protocols such as secure data erasure of sensitive storage or complete shutdown of certain components. These hardware safeguards may mean that any attempt to physically breach the device may fail to yield useful data and may even trigger an automatic wipe of secret information. This resilience against physical attacks may protect the device from being reverse-engineered or used maliciously if stolen.

The subsystem firewall isolation security feature in embodiments of the present invention may segregate each major function into isolated zones guarded by internal firewalls and gated interfaces. For example, the financial ledger module, the identity credential store, and the device's administrative control interface may all be compartmentalized. Even though these subsystems reside on the same device, these subsystems may communicate with each other only through well-defined, secure pathways. A built-in internal firewall and gateway mechanism may block any direct, unauthorized data flow between modules. This means that even if one component of the device (for example, the payment module) were somehow compromised, an attacker may not easily access or influence other components (like identity data or system settings). Lateral movement within the device may be prevented by this strict partitioning, containing potential breaches and preserving the integrity of unaffected subsystems.

The optional regulatory compliance module security feature in some embodiments may include an embedded compliance engine that interfaces with external oversight systems to ensure the device's operations adhere to relevant regulations. When activated (for instance, by a financial institution or enterprise deployment), this module may automatically enforce rules such as anti-money-laundering (AML) checks, Know-Your-Customer (KYC) requirements, and tax reporting obligations during the device's transactions and identity exchanges. The regulatory compliance module may keep the device's identity management and transaction policies synchronized with prevailing legal frameworks without exposing raw personal data. For example, the module may generate tamper-evident audit logs or flagged reports if certain transaction thresholds are exceeded, and the module may facilitate consent-based data sharing when lawfully required (such as confirming a user's identity to a government system with the user's permission). All compliance interactions may be handled through secure, segregated channels, and the module may remain dormant on the device unless a trusted authority or the user explicitly enables the module. This design means users may maintain privacy by default; only under authorized conditions may the compliance module engage to provide necessary regulatory interoperability.

The optional global coordination layer security feature in various embodiments, for specialized deployments at the macroeconomic or cross-jurisdictional level, may support a higher-level software service (operating on a server or cloud infrastructure separate from individual devices) that can network multiple devices for large-scale financial and identity management. When utilized by authorized entities such as central banks, international consortia, or government coalitions, the coordination layer may aggregate anonymized data and metrics from distributed devices to enable top-down analysis and control. For example, the global coordination layer may compile transaction volumes or currency usage statistics across regions in real time, allowing officials to glean economic insights or detect systemic anomalies. Likewise, the global coordination layer may coordinate identity verification across borders by cross-checking device authentication events against international databases or watchlists (all under strict governance). Using these capabilities, governing bodies might implement broad actions like adjusting monetary policy parameters, issuing or restricting certain digital currencies, or initiating system-wide security updates during emergencies-all in a controlled and auditable manner. Importantly, this global coordination feature may be modular and separate from the device's core operations: if not needed, the global coordination layer may have no effect on the device's normal functionality. Individual users and businesses may use the device independently, and the global layer may engage only in deployments where central authorized oversight is intended. This separation may ensure the invention's everyday use remains focused on personal and local security, with macro-level oversight only coming into play as an add-on in scenarios that require the macro-level oversight.

Together, these layered security features in embodiments of the present invention may guarantee that a user's financial assets, identity credentials, transaction records, and even the device's feedback signals are all shielded from unauthorized access or tampering. At the same time, the architecture may maintain seamless operation and interoperability from local offline use up to national or global networked deployments. The system's security may be robust without sacrificing functionality: a user may confidently use the device in a standalone manner or as part of a larger network, and in each case the same strong protections and safeguards may apply.

Beyond security, embodiments of the present invention may provide distinct operational advantages across multiple sectors and user groups thanks to this secure, modular foundation. For example:

In the government and public sector context, authorized government agencies may utilize embodiments of the self-contained biometric device for secure citizen identification and more efficient public services. A citizen's self-contained biometric device may function as a digital ID card, allowing quick authentication for government portals or in-person services (for example, retrieving records or accessing facilities) with full biometric verification. By collecting anonymized transaction statistics and identity verification events (with proper consent) from self-contained biometric devices in the field, officials may gain real-time economic insights that inform policy or detect fraud at a macro level. Embodiments of the self-contained biometric device may also be integrated into nationwide programs to support coordinated policy implementation—for instance, distributing government-issued digital benefits or enforcing travel restrictions in emergencies via the self-contained biometric devices—all under strict authorization. Importantly, these large-scale functions may be implemented through the system's optional modules and oversight interfaces, so these functions may not interfere with or degrade the self-contained biometric device's core secure operations for individual users.

In corporate and private sector applications, businesses may deploy embodiments of the self-contained biometric device to enhance security and transparency in corporate transactions and identity management. For example, employees might use their self-contained biometric devices as corporate ID badges to access offices or log in to work systems, as well as to securely approve company expenses or transactions. Every transaction or access event may be cryptographically signed and recorded, providing live, tamper-proof audit trails for the company's finance and IT departments. In multinational corporations, the self-contained biometric device's compliance features may automatically adjust to different regional regulations—for instance, applying the correct tax rules or data privacy settings depending on the user's location—simplifying cross-border compliance. Overall, embodiments of the self-contained biometric device may offer enterprises real-time financial reporting (since transactions are instantly logged) and improved identity assurance, which together may reduce fraud, streamline operations, and ensure accountability across the organization's global footprint.

For individual consumer users, embodiments of the self-contained biometric device may function as a personal financial manager and a universal digital key for daily life. The self-contained biometric device may empower users with dynamic budgeting and spending control: the self-contained biometric device's AI engine 206 may analyze spending habits and give instant feedback or warnings (via a vibration or notification) if a user exceeds a self-imposed budget. The same self-contained biometric device may facilitate hassle—free payments anywhere—a user may travel internationally and make purchases without carrying cash or cards, as the self-contained biometric device may handle currency conversion and local compliance automatically in the background. In addition to financial functions, the self-contained biometric device may act as a secure portable identity; a user may verify themselves to access building amenities, age-restricted purchases, or online services by simply using the self-contained biometric device's physiological biometric verification, eliminating the need to carry multiple IDs or remember passwords. For every transaction or authentication, the self-contained biometric device may provide a discreet sensory confirmation (such as a gentle vibration or light signal) through the sensory feedback system 205, so the user immediately knows the outcome (approved, denied, etc.) in real time. This instant feedback loop may build trust and awareness, allowing users to confidently rely on the self-contained biometric device for both payments and identification while maintaining full control and privacy.

In financial institution applications, banks and payment providers may leverage embodiments of the self-contained biometric device to achieve faster and more secure transaction settlement. Instead of routing transactions through multiple intermediaries and networks, two parties using these self-contained biometric devices may finalize a payment directly, with the bank's systems receiving a cryptographically verified record of the exchange in seconds. The self-contained biometric device's multi-currency wallet capability means that cross-currency transactions (e.g. a customer paying in one currency to a merchant expecting another) may be handled seamlessly on-device, using current exchange rates and predefined rules, then logged for the bank's ledger. By eliminating external intermediaries, embodiments of the self-contained biometric device may reduce processing fees and points of failure. Settlement risk may be lowered because transaction authenticity may be guaranteed by the self-contained biometric devices' security protocols and biometric safeguards. Banks may still enforce oversight—for instance, setting rules via the compliance module about transaction limits or flagged entities—but without having to insert additional authentication steps that inconvenience users. The result may be near-instant, regulatorily-compliant settlement of digital assets or payments, improving efficiency for financial institutions and their customers alike.

In healthcare system applications, healthcare providers may employ embodiments of the self-contained biometric device to strengthen patient identity management and data security. A patient arriving at a clinic may simply use their self-contained biometric device to check in biometrically, which may grant doctors and nurses immediate, authorized access to that patient's medical records (retrieved in decrypted form from a secure server or the self-contained biometric device itself, depending on the setup). Because identity verification may be performed via the patient's biometrics and cryptographic device credentials, the risk of misidentification may be dramatically reduced—this may be especially important in emergency settings or when patients cannot communicate. The self-contained biometric device may also control access to treatments; for example, a smart medication dispenser might require the patient to authenticate with their self-contained biometric device before releasing a dose, ensuring the right person receives the correct medicine. Similarly, medical equipment may be configured to activate only for the intended patient or an authorized clinician carrying the self-contained biometric device. All access and actions may be logged, creating an audit trail that helps healthcare facilities comply with privacy regulations and safety protocols. Overall, embodiments of the self-contained biometric device may enhance trust in patient identity verification, protect sensitive health data through encryption and consent-based sharing, and improve the delivery of care by linking medical actions with robust security checks.

In travel and border security applications, border control and immigration agencies may rely on embodiments of the self-contained biometric device to expedite traveler processing while heightening security. Travelers equipped with the self-contained biometric device may have their passport information, visas, travel history, and even vaccination certificates stored securely and digitally. At a border checkpoint, the traveler may simply present their self-contained biometric device (or the self-contained biometric device may be detected via NFC/Bluetooth) and perform a biometric scan on the self-contained biometric device; the self-contained biometric device may then transmit a verified proof of identity and the necessary travel credentials to the border control system. This may streamline the identity verification process—a border officer may no longer have to manually check multiple documents or worry about forgeries, as the self-contained biometric device's cryptographic protocols and anti-tamper features may ensure the data is authentic and unaltered. The verification may function offline between the officer's scanner and the self-contained biometric device (for remote land crossings or in case network connectivity is down), or the verification may integrate with international databases for additional checks if online. In all cases, the traveler's sensitive personal data may remain encrypted and may be only shared in a controlled manner for verification. The net effect may be faster throughput at checkpoints, improved detection of identity fraud or inadmissible persons, and a more streamlined experience for legitimate travelers who benefit from automated yet secure processing.

In global monetary authority applications, central banks or international financial organizations may deploy embodiments of the self-contained biometric device as part of a controlled infrastructure for managing digital currency issuance and cross-border economic coordination. Using the optional global coordination layer, these authorities may aggregate anonymized financial data from the network of self-contained biometric devices to gauge economic activity (such as spending trends, currency circulation, or payment network stress) in real time across regions. This live insight may inform high-level decisions—for example, adjusting interest rates, releasing additional currency into the system, or tuning other macroeconomic levers in a targeted way. Additionally, the system's unified sovereign-compliant digital identity framework may facilitate international regulatory cooperation: a person or entity identified on one country's network may be reliably recognized on another's (with proper legal agreements), simplifying compliance checks for cross-border taxation, anti-fraud enforcement, or sanctions. Any interventions at this global scale may be executed under strict governance rules through the modular infrastructure, without requiring changes to individual self-contained biometric devices. In practice, this means a central authority might send a secured policy update or parameter change that self-contained biometric devices receive and honor (such as a new transaction limit for a specific digital currency in a crisis situation), but individual users' privacy and control may be maintained, since the system may be designed to require explicit authorization and keep personal data protected. This capability showcases how embodiments of the self-contained biometric device may scale up to meet macroeconomic and multinational policy needs as an opt-in feature, all while the core device network remains rooted in the same secure, decentralized principles that protect single users.

Each of these examples illustrates the broad applicability of embodiments of the self-contained biometric device and the robust technical framework that underpins these embodiments across different industries. By combining strong on-device security with modular extensions for compliance and coordination, embodiments of the self-contained biometric device may be confidently deployed in diverse scenarios without compromising data privacy, data sovereignty, identity integrity, or transaction authenticity. In essence, the described security architecture and adaptable feature set may ensure the self-contained biometric device meets strict regulatory and operational demands worldwide, all while maintaining a clear, concrete technical approach that distinguishes these embodiments from prior art solutions.

Figure 9:
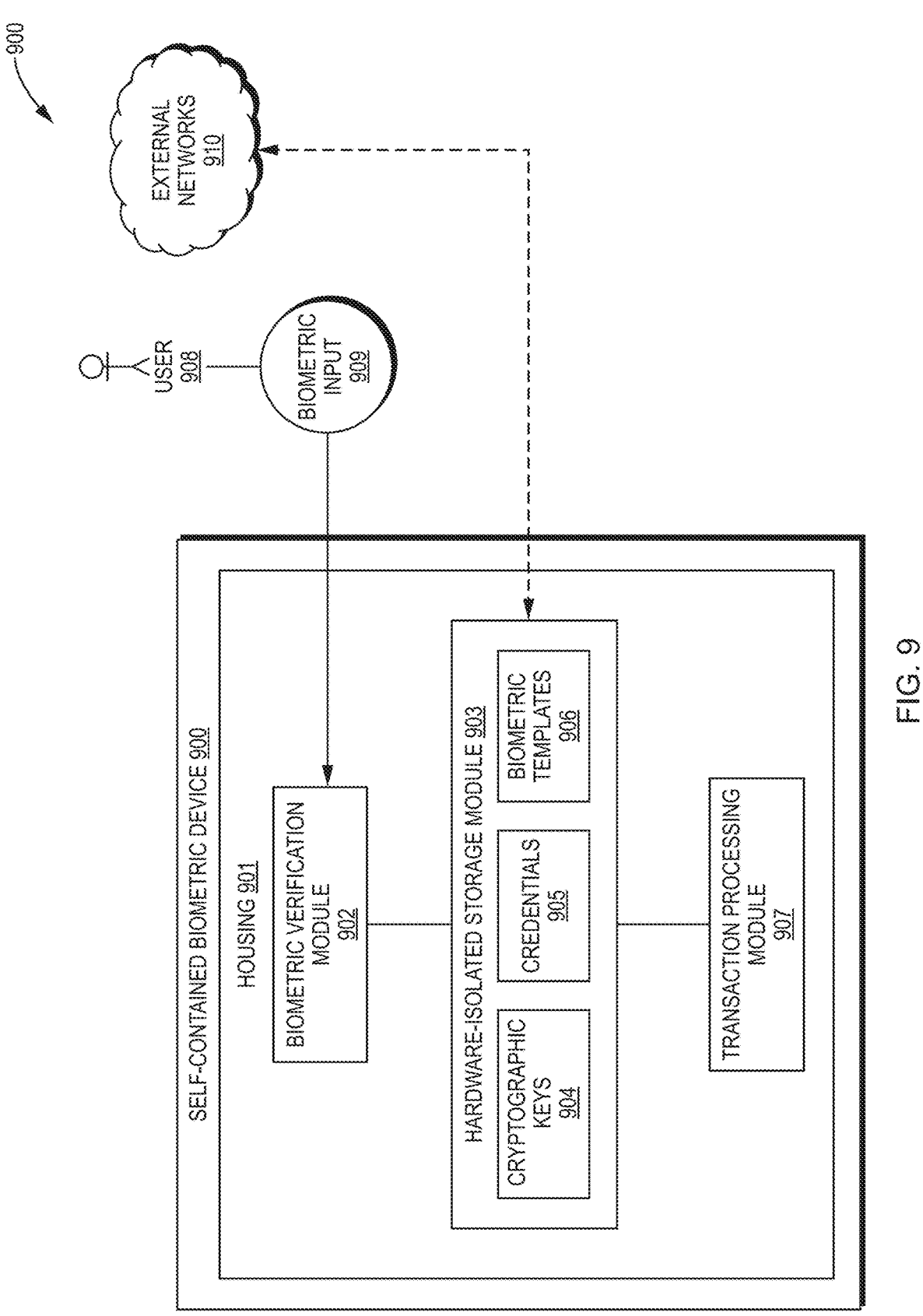
FIG. 9 illustrates a block diagram of a self-contained biometric device according to one embodiment of the present invention.

Referring to FIG. 9, an embodiment of the present invention provides a self-contained biometric device 900 for secure digital transactions. The self-contained biometric device 900 may include a housing 901 that may comprise one of several form factor options: a subdermal implant housing, a dermally-applied biometric tattoo substrate, an ergonomic external wearable housing, or a smart card. Any particular implementation of the device 900 may be constructed using one such form factor. The housing 901 may maintain consistent secure functionality during both an offline operation mode and an online operation mode, enabling the self-contained biometric device 900 to operate autonomously regardless of network connectivity status.

Within the housing 901, the self-contained biometric device 900 may include a biometric verification module 902 that may capture a biometric input 909 of a user 908. The biometric verification module 902 may perform user authentication based on the biometric input 909 entirely within the self-contained biometric device 900, without requiring or using external verification systems or network connectivity. The biometric input 909 may include, for example, one or more physiological characteristics such as fingerprints, iris patterns, facial features, voiceprints, or vascular patterns that may uniquely identify the user 908. In some embodiments, the self-contained biometric device 900 may lack any persistent remote key escrow, which may help ensure that cryptographic keys remain exclusively within the device's secure boundary and are not stored or backed up on external systems.

The self-contained biometric device 900 may further include a hardware-isolated storage module 903 that may be physically isolated from external networks 910, as indicated by the dashed line connection in FIG. 9. The hardware-isolated storage module 903 may store any one or more of cryptographic keys 904, credentials 905, or biometric templates 906 in a secure environment that may prevent direct external access. For example, the hardware-isolated storage module 903 may store the cryptographic keys 904, the credentials 905, and the biometric templates 906. The physical isolation from external networks 910 may help ensure that sensitive data stored within the hardware-isolated storage module 903 remains protected from remote attacks or unauthorized access attempts. In various embodiments, the self-contained biometric device 900 may lack any remote biometric verification capabilities, which may help ensure that all biometric processing occurs exclusively within the device 900 itself, potentially eliminating vulnerabilities associated with transmitting biometric data to external verification systems.

In various embodiments, the self-contained biometric device 900 may permit access to the cryptographic keys 904 and credentials 905 only upon successful user authentication by the biometric verification module 902. This authentication-gated access may help ensure that stored sensitive information remains secure and may only be accessed by the authorized user 908 after proper biometric verification.

The self-contained biometric device 900 may also include a transaction processing module 907 that may, for example, be resident inside the hardware-isolated storage module 903. The transaction processing module 907 may be configured to execute digital asset transactions entirely within the self-contained biometric device 900 in the offline operation mode. This capability may enable the self-contained biometric device 900 to process financial transactions without requiring continuous (or any) network connectivity, using the securely stored cryptographic keys 904 and credentials 905 to authorize and sign transactions locally within the device 900. In some embodiments, the self-contained biometric device 900 may lack any remote risk-scoring dependency for transaction authorization, potentially allowing autonomous transaction decisions based solely on local verification and authentication processes without requiring external approval or risk assessment services.

The transaction processing module 907 may access the cryptographic keys 904 stored in the hardware-isolated storage module 903 to cryptographically sign digital asset transactions, while the biometric verification module 902 may help ensure that only the authenticated user 908 can initiate such transactions. The credentials 905 may include digital identity certificates or financial authorization tokens that may enable the transaction processing module 907 to execute various types of digital asset transfers, currency conversions, or payment authorizations.

Embodiments of the self-contained biometric device 900 may maintain consistent secure functionality across both offline and online operation modes through a unified secure architecture that operates independently of network connectivity status. The housing 901 may achieve this consistency by implementing a hardware-isolated secure element that performs all core functions-such as biometric verification, transaction processing, and cryptographic operations-entirely within the device's secure boundary.

In the offline operation mode, the self-contained biometric device 900 may operate autonomously without any network connectivity to external networks 910. During offline operation, the biometric verification module 902 may capture and authenticate the biometric input 909 using locally stored biometric templates 906 within the hardware-isolated storage module 903. The transaction processing module 907 may execute digital asset transactions by accessing the cryptographic keys 904 and credentials 905 stored in the hardware-isolated storage module 903, signing transactions locally and maintaining an internal transaction ledger. The self-contained biometric device 900 may perform currency conversions using pre-loaded exchange rate data and may provide immediate sensory feedback to the user 908 through integrated feedback mechanisms. All transaction records may be stored in the hardware-isolated storage module 903 with cryptographic integrity protection, creating a tamper-evident audit trail that may be synchronized when connectivity becomes available.

In some embodiments, the self-contained biometric device 900 may implement a delta-based header synchronization approach where, upon reconnection to external networks 910, the self-contained biometric device 900 may request only the minimal header deltas needed to bridge any cache gaps. In various embodiments, the self-contained biometric device 900 may employ a temperature-compensated, battery-backed real-time clock to maintain a monotonic time base during offline operation, ensuring transaction timestamps remain reliable even during extended periods without network connectivity. The self-contained biometric device 900 may also include policy-driven safeguards that define parameters such as replay-window intervals and header-gap values, allowing for flexible configuration of offline operation behaviors without requiring modifications to the core firmware.

In the online operation mode, the self-contained biometric device 900 may maintain the same core security architecture while additionally enabling secure communication with external networks 910. During online operation, the biometric verification module 902 may continue to perform authentication entirely within the device using the same locally stored biometric templates 906, without transmitting raw biometric data externally. The transaction processing module 907 may execute transactions using the same internal cryptographic processes, but may additionally synchronize transaction records with external ledgers or blockchain networks through encrypted communication channels. The device may update exchange rates, receive policy updates, or participate in broader financial networks while maintaining the physical isolation of the hardware-isolated storage module 903 from direct external access.

The housing 901 may maintain consistent secure functionality across both modes by implementing a modular secure architecture where the core security functions remain unchanged regardless of connectivity status. The hardware-isolated storage module 903 may remain physically isolated from external networks 910 in both modes, with all external communications occurring through secure, encrypted channels that do not compromise the isolation of sensitive data. The biometric verification module 902 may use identical authentication algorithms and security thresholds in both modes, ensuring consistent user experience and security posture.

Across all housing types, the consistent secure functionality may be achieved through a unified secure element architecture that implements identical cryptographic algorithms, biometric matching processes, and transaction authorization procedures. The hardware-isolated storage module 903 may maintain the same physical isolation characteristics regardless of housing type, with cryptographic keys 904, credentials 905, and biometric templates 906 protected by the same tamper-resistant mechanisms. The transaction processing module 907 may execute the same transaction signing and ledger management functions across all embodiments, ensuring that security properties and user experience remain consistent regardless of form factor or connectivity status.

The self-contained biometric device 900 may implement adaptive power management strategies that adjust operational parameters based on available energy sources while maintaining security functionality. In offline mode, the device may optimize power consumption by duty-cycling non-essential functions while preserving the ability to perform biometric verification and transaction processing when required. In online mode, the device may allocate additional power to communication functions while maintaining the same core security operations, ensuring that network connectivity does not compromise the fundamental security architecture or operational capabilities of the device. The self-contained biometric device 900 may include a charging circuit and power buffer specifically designed and sized to support a complete biometric verification cycle and transaction signature within a single NFC field exposure. This enables the device to harvest sufficient energy during a brief contact with an NFC reader to power the entire authentication and transaction process, allowing for secure operations even with minimal power availability and without requiring a persistent power source.

In embodiments of the self-contained biometric device 900, a monolithic Secure Element (SE) may unify cryptographic, biometric, transaction, and power-management functions into a single tamper-resistant silicon block. The SE may, for example, be based on an Arm Cortex processor core with Trust Zone technology, which may be augmented by dedicated accelerators for various cryptographic operations including AES, SHA, and elliptic-curve operations. In some embodiments, the SE may include an SRAM PUF with high stability using helper data, which may be fused alongside a root key. The SE may host ECC-protected RAM and ECC-checked NOR flash on-chip, along with a boot ROM that may validate an encrypted firmware capsule using digest and signature verification before loading the application image.

The SE may, for example, run multiple immutable firmware modules at fixed memory addresses. A PUF-Key Vault module may derive and ladder the device's root keys, with zeroization capability upon tamper detection. All private keys—including ECC roots, signing keys, and biometric template hashes—may be fused into the SE's non-volatile memory and PUF-derived key ladder. These keys may reside in silicon only and may never be exported to external components or main RAM. On each power-up, the SE may reconstruct the keys via the SRAM PUF and helper data, use them for cryptographic operations entirely within the SE, and then zero-ize any transient key material immediately afterward.

A Biometric Matcher module may provide a CNN-lite engine producing embeddings with appropriate Hamming distance thresholds for finger-vein, ECG, iris, and voice biometric processing. A Transaction Engine module may handle secp256k1 ECDSA signing, maintain an append-only ledger, provide a sufficient nonce space, and support sub-wallet functionality. A DF-MLM Inference Core module may perform integer latent-matrix risk scoring with ROM-hashed weights. An Attestation & BIST module may measure coil impedance, flash-ECC, PUF drift, and RTC skew, and may emit a CBOR health certificate signed by the PUF root key.

All modules may interface through a Hardware Abstraction Layer that presents a deterministic device tree with SPI/I2C registers, sensors, and actuators at an appropriate base address. The SE's memory map and opcode set may remain identical across form factors. Power and RF variances may be absorbed via a Start-Up Calibration Block (SCB) written at first boot, which may contain housing ID, antenna Q factor, nominal battery voltage, and clock calibrant. The SCB may XOR-mask all runtime thresholds and coefficients via a secure hash without affecting crypto paths. This architecture may deliver a single, unified security and execution environment across implants, tattoos, and wearables, potentially enabling deterministic behavior, streamlined certification, and seamless cross-housing interoperability.

Embodiments of the self-contained biometric device 900 in subdermal implant, dermal tattoo, and solar-assisted wearable configurations may share a byte-identical secure architecture that may guarantee uniform functionality despite their different physical forms. At power-on, an on-chip ROM may validate an encrypted firmware capsule using digest and signature verification against a fused public key, decrypt the capsule using appropriate encryption with a die-unique nonce, and load the firmware into the hardware-isolated Secure Element whose silicon, register map and firmware hash may never vary between housings.

The fixed modules within the SE may include a PUF-bound key vault with fuse bank plus SRAM PUF that may be error-corrected and may zeroize on tamper detection. A CNN-lite biometric matcher may produce embeddings with predetermined biometric similarity thresholds that define acceptable match parameters. In some embodiments, these thresholds may be implemented as Hamming distance thresholds established during system development, such as compile-time Hamming thresholds, runtime-configurable thresholds, or adaptive thresholds that adjust based on environmental factors. A transaction engine may maintain an append-only ledger and sufficient nonce counter space. A deep-factor latent-matrix inference core may use integer weights hashed into the image for on-device risk scoring. An attestation/BIST routine may measure coil impedance, flash-ECC syndrome, PUF drift and RTC skew, then sign a CBOR health certificate with the PUF-derived root key.

The SE's pins may always map to the same SPI/I2C buses and the HAL may expose an identical device tree at the register block. Every cryptographic operation, biometric matching parameters (such as similarity thresholds, confidence scores, or verification tolerances) and ledger update may execute deterministically across tattoo, implant and wearband configurations, potentially enabling a single FIPS 140-3 or equivalent certification to cover the entire family of form factors.

All mechanical and electronic adaptations may be confined to the connector layer and power subsystem, without intruding into the SE's logical address space or instruction set. The subdermal implant housing may mount the SE on an alumina rigid-flex PCB inside a titanium capsule, coupling to tissue via a multi-turn Litz coil with appropriate inductance and Q factor, powered inductively at a suitable frequency with low idle power consumption and higher authentication power consumption. The subdermal implant may include PPG and NIR finger-vein sensors under a sapphire window.

The dermal tattoo housing may use a polyimide substrate of appropriate thickness with serpentine copper traces, a printed silver-ink loop antenna with suitable inductance and Q factor, a micro-battery with sufficient capacity providing low idle power consumption and higher authentication power consumption. The dermal tattoo may include a graphene ECG grid plus μLED array beneath a medical-grade silicone over-coat.

The wearable housing may embed the same SE on an FR-4 board sealed to appropriate IP rating, couple via a near-field loop with suitable inductance and Q factor, and may draw power from a Li-ion battery augmented by a photovoltaic array providing low idle power consumption, moderate authentication power consumption, and additional power at typical illumination levels.

In each housing configuration, trace geometry, antenna tuning and power-conditioning constants may be loaded at first secure boot into a Start-Up Calibration Block containing housing ID, antenna Q factor, nominal voltage, and RTC calibrant. These parameters may be used to XOR-mask runtime thresholds, nonce counters and DF-MLM coefficients using a secure hash function, so voltage sag or coil-Q drift may not propagate into crypto or timing margins.

During mesh or satellite synchronization, the on-device Synchronizer may emit a single payload containing DID document, Merkle root, housing Proof using a secure hash of the SCB, BIST certificate, and appropriate signature. External validators may verify this payload against the same fused boot key. The firmware digest, HAL API and root certificate may remain invariant, so all nodes may appear identical regardless of whether they are implanted, tattooed or worn. By isolating all physical differences in mechanical carrier, RF front-end and power handling while keeping the cryptographic core, firmware and boot chain immutable, embodiments of the self-contained biometric device 900 may achieve uniform secure functionality across all housing types without requiring separate testing or additional experimentation.

For the subdermal implant housing embodiment, consistent secure functionality may be maintained through a hermetically sealed biocompatible metal capsule with a biocompatible coating that may house the secure element and associated circuitry mounted on a rigid-flex PCB with sealed feed-throughs. In some embodiments, the biocompatible metal capsule may be formed from a medical-grade titanium alloy with a wall thickness sufficient to provide structural integrity while remaining compact, and may be sealed using precision welding techniques under inert gas conditions to ensure biocompatibility and structural integrity. The specific materials, dimensions, and manufacturing techniques may vary based on implementation requirements, biocompatibility considerations, and size constraints of the particular application.

The rigid-flex PCB may include a multi-layer substrate structure of appropriate thickness, which may be bonded to flexible dielectric layers with conductive traces to provide mechanical flexibility while maintaining electrical connectivity. In offline mode, the subdermal implant housing 901 may operate using energy harvested from a conductive coil assembly, such as a multi-strand wire coil (for example, a Litz-wire coil) tuned for an appropriate frequency band (for example, the 13.56 MHz band) through inductive coupling or stored in an internal energy storage component, performing biometric verification through tissue-penetrating sensors including an optically transparent window (for example, a sapphire window) housing multiple wavelength light-emitting components and a multi-element photodetector array for capturing vascular patterns and physiological pulse signals.

The Litz-wire coil may include a multi-turn configuration, such as approximately 10 turns of wire with a gauge measurement of approximately 35 AWG, which may create an inductance of approximately 2.1 μH and a quality factor (Q) of approximately 25. This configuration may be capable of delivering power, such as approximately 2 mW, through tissue of various thicknesses, such as approximately 5 mm, with a coupling coefficient that may be approximately 0.2. These numerical values are provided as examples only and may vary based on specific implementation requirements and power transfer needs. The subdermal implant housing 901 may execute transactions entirely within the sealed environment using the hardware-isolated storage module 903 that may implement cryptographic algorithms and security protocols consistent with other form factors. The multi-turn configuration and specific wire gauge may enable efficient power transfer through biological tissue while maintaining a compact form factor suitable for subdermal implantation. The inductance and quality factor values may contribute to optimizing the wireless power reception capabilities of the subdermal implant housing 901.

The hardware-isolated storage module 903 may include a low-power microcontroller (for example, an STM32L4R9 operating in low-power modes of approximately 300 nA in standby mode and 100 μA at 64 MHz when active) coupled with a secure cryptographic element (for example, an NXP A700X with power consumption of approximately 50 nA in sleep mode and 200 μA when active, communicating via a serial peripheral interface at 10 MHz). The subdermal implant housing may provide sensory feedback through controlled thermal modulation or subtle vibration patterns perceivable beneath the skin.

In online mode, the subdermal implant housing may communicate through near-field communication protocols while maintaining the same internal security architecture, with the sealed capsule preventing any physical access to the hardware-isolated storage module 903 regardless of connectivity status. The subdermal implant housing may include a Start-Up Calibration Block that may store housing-specific parameters including antenna characteristics and power conditioning constants that may be loaded at first boot, helping to ensure that voltage variations or coil characteristic changes do not affect cryptographic operations or timing margins while maintaining consistent security operations across all form factors.

The power consumption of the subdermal implant housing 901 may vary based on operational requirements. In some embodiments, the power consumption may peak at various levels, such as approximately 5 mW, 10 mW, or 15 mW, while remaining within thermal-rise limits defined in applicable safety policies. The standby power consumption may range from approximately 100 nA to 500 nA at operating voltages between 1.8V and 3.3V (corresponding to power consumption between approximately 0.18 μW and 1.65 μW), which may enable extended operation periods between charging cycles. These power consumption characteristics may be adjusted based on specific implementation requirements, component selections, and operational modes of the subdermal implant housing 901. In various embodiments, the power management system may dynamically adjust consumption based on available energy sources and processing demands to optimize battery life while maintaining essential functionality.

For the dermally-applied biometric tattoo substrate embodiment, consistent secure functionality may be maintained through a flexible, biocompatible substrate that integrates microelectronic components capable of autonomous operation. In offline operation mode, the dermally-applied biometric tattoo substrate may capture biometric data through printed sensor arrays, such as screen-printed ECG pads and micro-LED/photodiode dots that collect electrocardiogram morphologies and vein reflections. In some embodiments, the dermally-applied biometric tattoo substrate may utilize a flexible substrate, for example, a polyimide substrate. The sensor arrays may be fabricated using various printing techniques, such as screen-printing with conductive materials, for example, silver or carbon inks, to create electrode patterns with feature sizes that enable high-resolution biometric signal capture while maintaining flexibility.

The dermally-applied biometric tattoo substrate may execute transactions using power from integrated power sources, which may include flexible thin-film batteries or energy harvesting elements. In some embodiments, the power sources may include a flexible thin-film Li-ion cell with appropriate voltage and capacity specifications, or energy harvesting components such as thermoelectric harvesters that may generate power from temperature differentials between skin and ambient environments. The thin-film batteries may be constructed with various electrode materials, for example, lithium manganese oxide cathodes and lithium titanate anodes separated by a polymer electrolyte, all encapsulated within a moisture-resistant barrier layer. In some embodiments, the energy harvesting elements may include printed thermoelectric junctions using appropriate thermoelectric compounds that generate voltage differentials from temperature gradients.

The flexible substrate may provide sensory feedback through various mechanisms, such as reversible chemical indicators, micro-LED arrays, or controlled thermal changes at the skin surface. In some embodiments, the reversible chemical indicators may utilize thermochromic or electrochromic materials that change color in response to electrical signals, with transition temperatures selected to ensure visibility without causing discomfort. Micro-LED arrays may be implemented using various light-emitting technologies, for example, organic light-emitting diodes (OLEDs) with thicknesses that maintain flexibility, arranged in patterns that consume minimal power while providing visible feedback. Thermal feedback elements may utilize resistive heating elements capable of producing localized temperature changes that remain within safe limits while being perceptible to the user.

In online operation mode, the dermally-applied biometric tattoo substrate may enable wireless communication through printed antenna elements while maintaining the same secure processing architecture. In some embodiments, the printed antennas may include an NFC loop with multiple turns of conductive ink on an appropriate surface area with suitable inductance and matching network components. The printed antennas may be fabricated using conductive inks, for example, silver nanoparticle inks with conductivity values sufficient for effective near-field communication at appropriate frequencies. The matching network may include printed capacitors using high-k dielectric materials positioned between conductive traces, with capacitance values selected to optimize power transfer efficiency.

The thin-film construction, which may utilize high-temperature resistant polyimide film (for example, DuPont Kapton polyimide with thickness of approximately 50 μm) with conductive serpentine interconnects on elastomer traces allowing for flexibility, may provide physical protection for the embedded secure components. The serpentine interconnects may be designed with geometric patterns that distribute strain during stretching, with bend radii between approximately 10 μm and 500 μm, or between approximately 25 μm and 300 μm, or between approximately 50 μm and 200 μm, and trace widths between approximately 1 μm and 50 μm, or between approximately 3 μm and 30 μm, or between approximately 5 μm and 25 μm. These interconnects may be encapsulated in an elastomeric polymer layer (such as silicone elastomer) with hardness properties (for example, Shore A hardness between approximately 10 and 60, or between approximately 15 and 50, or between approximately 20 and 40), providing mechanical protection while maintaining flexibility. The hardware-isolated storage module 903 may be implemented as a thinned silicon die with thickness between approximately 10 μm and 150 μm, or between approximately 15 μm and 100 μm, or between approximately 25 μm and 75 μm, allowing the hardware-isolated storage module 903 to flex with the substrate without mechanical failure.

The dermally-applied biometric tattoo substrate may adhere to the skin via medical-grade adhesive that provides sufficient adhesion strength while allowing for multiple reapplications. For example, the adhesive may be a medical-grade adhesive similar to 3M 1527, which may provide approximately 50 g/cm peel force, enabling secure attachment to the skin surface while allowing for removal without damage, and may be reusable for multiple applications, such as up to approximately 30 times. The adhesive layer may be patterned to create microchannels that allow skin perspiration to escape, reducing irritation during extended wear. These microchannels may have widths in various ranges, such as between approximately 50 µm and 200 µm, and may cover a portion of the total adhesive area, such as between approximately 5% and 15%, to balance adhesion strength with breathability. The adhesive formulation may include hypoallergenic acrylate polymers with biocompatibility certified according to established medical standards for skin contact applications, such as ISO 10993 standards, which help ensure the material meets safety requirements for prolonged skin contact.

In both offline and online operation modes, the dermally-applied biometric tattoo substrate may maintain the same hardware-isolated secure element architecture, implementing identical cryptographic algorithms, biometric matching processes, and transaction authorization procedures as other form factors of embodiments of the present invention. The secure element may be implemented as an application-specific integrated circuit (ASIC) with dedicated cryptographic accelerators for encryption operations, such as AES-256, and elliptic curve operations, consuming minimal power during different operational states, such as between approximately 10 µW and 50 µW in standby mode to conserve energy when not actively processing, and between approximately 0.5 mW and 2 mW during active processing when performing security operations. The biometric verification module may utilize template matching algorithms optimized for low-power operation, with feature extraction and comparison operations requiring minimal energy per authentication attempt, such as between approximately 0.1 mJ and 0.5 mJ, enabling efficient biometric verification while maintaining battery life. The transaction processing module may implement a lightweight blockchain client capable of generating and signing transactions while consuming a small amount of energy per transaction, such as between approximately 0.2 mJ and 1.0 mJ, allowing for secure transaction processing with minimal power requirements.

For the ergonomic external wearable housing embodiment, consistent secure functionality may be maintained through a durable, water-resistant outer shell that protects the internal secure architecture. In some embodiments, the ergonomic external wearable housing may be constructed from a PC/ABS composite material with an IP68 rating, which provides protection against dust ingress and water immersion to maintain device integrity in various environmental conditions. The housing dimensions may range from approximately 30 mm to 50 mm in diameter and 8 mm to 15 mm in thickness, with wall thickness ranging from 2 mm to 4 mm, depending on the specific form factor implementation. These dimensional ranges may enable comfortable wearability while providing sufficient internal volume for accommodating the secure components, including the biometric verification module 902, hardware-isolated storage module 903, and transaction processing module 907. For example, a housing with a 40 mm diameter, 10 mm thickness, and 3 mm wall thickness may provide an optimal balance between wearability and component protection for wrist-worn implementations, while smaller dimensions such as 30 mm diameter may be more suitable for ring form factors where space constraints are more significant.

In offline operation mode, the ergonomic external wearable housing may operate using rechargeable batteries, such as a 3.7 V, 50 mAh Li-ion pouch cell that provides sufficient energy density for extended operation in a compact form factor, or energy harvesting systems including monocrystalline silicon solar panels that may generate approximately 5 mW at 100 lux ambient light, enabling supplementary power generation in typical indoor lighting conditions. The power management system may include a specialized power management integrated circuit (PMIC) that regulates voltage and current distribution to various components within the ergonomic external wearable housing. In some cases, the PMIC may implement dynamic voltage scaling techniques to adjust power delivery based on processing requirements, further optimizing energy consumption by reducing power during periods of lower computational demand.

The ergonomic external wearable housing may perform biometric verification through integrated sensors such as capacitive fingerprint sensors with resolution exceeding 500 dpi, which enables capture of minute ridge details for accurate fingerprint matching, paired with near-infrared LEDs for vascular pattern recognition that can penetrate the skin surface to image blood vessel patterns. These sensors may be positioned beneath a protective layer of hardened glass, such as Gorilla Glass with thickness ranging from 0.5 mm to 1.0 mm, providing both protection against scratches and impacts while maintaining optimal optical properties for biometric sensing. The sensor array may include multiple sensing elements arranged in a grid pattern to capture high-resolution biometric data across an area of approximately 10 mm×10 mm to 15 mm×15 mm, dimensions that balance sufficient capture area for reliable biometric matching with the size constraints of a wearable device.

The transaction processing module 907 may execute digital asset transactions entirely within the hardware-isolated storage module 903, which may remain physically isolated from external networks 910 regardless of connectivity status. The hardware-isolated storage module 903 may be implemented using specialized secure microcontrollers with integrated cryptographic accelerators that support various encryption algorithms including AES-256 for symmetric encryption of stored data, SHA-256 for cryptographic hashing operations, and elliptic curve cryptography for digital signatures with smaller key sizes than traditional public key cryptography. In some embodiments, the hardware-isolated storage module 903 may incorporate physically unclonable function (PUF) technology that derives unique cryptographic keys based on inherent physical characteristics of the semiconductor material, enhancing security against cloning or tampering attempts by creating device-specific keys that cannot be duplicated.

The ergonomic external wearable housing may provide sensory feedback through multiple modalities, for example, precision haptic vibration motors, RGB LED indicators, or small e-ink or OLED display elements that may communicate transaction status and authentication results to the user 908. The haptic feedback system may utilize linear resonant actuators (LRAs) or eccentric rotating mass (ERM) motors capable of generating distinct vibration patterns with frequencies ranging from 100 Hz to 300 Hz, which fall within the optimal sensitivity range of human touch receptors, and amplitudes of 0.5 g to 2.0 g to create perceptible but discreet notifications. Visual indicators may include RGB LEDs with brightness levels of 100 mcd to 500 mcd for visibility across various lighting conditions, or OLED displays with resolutions ranging from 64×32 pixels to 128×64 pixels, depending on the specific implementation requirements, providing sufficient resolution for displaying simple status information and transaction details.

In online operation mode, the ergonomic external wearable housing may support various communication protocols including near-field communication (NFC), Bluetooth Low Energy (BLE), or Wi-Fi while maintaining the same internal security boundaries as in offline operation mode. The NFC subsystem may operate at 13.56 MHz with data rates of 106 kbps to 424 kbps, enabling standardized communication with payment terminals and other NFC devices, and read ranges of approximately 1 cm to 4 cm that require deliberate proximity for security. The BLE implementation may support Bluetooth 5.0 or later specifications, with data rates up to 2 Mbps for efficient data transfer and operating ranges of approximately 10 meters for convenient connectivity with nearby devices. In some embodiments, the communication interfaces may be implemented using dedicated secure elements that isolate the communication stack from the core security architecture, providing an additional layer of protection against potential attack vectors through wireless interfaces by creating a hardware boundary between external communications and sensitive internal operations.

The ergonomic external wearable housing may implement adaptive power management strategies that may allocate energy resources efficiently for different operational states. In some embodiments, these strategies may allocate higher power during authentication events, such as peak bursts that may range from 50 mW to 150 mW for durations of 10 ms to 20 ms (for example, approximately 100 mW for 15 ms, which may provide approximately 1.5 mJ per authentication) while maintaining energy-efficient sleep states when inactive, which may consume between 0.5 µA and 5 µA (for example, approximately 1 µA). This power management approach may be implemented through a combination of hardware and firmware techniques, including clock gating, power gating, and dynamic frequency scaling. The system may transition between multiple power states, including deep sleep (which may consume ≤1 µA), light sleep (which may consume between 10-50 pA), idle (which may consume between 100-500 µA), and active (which may consume between 1-100 mW), with transition times ranging from microseconds to milliseconds depending on the specific state change.

In some cases, the ergonomic external wearable housing may include a hold-up capacitor that may maintain voltage above critical thresholds during brief power interruptions, such as battery replacement. The hold-up capacitor may have a capacitance value between 10 µF and 50 µF (for example, a 20 µF hold-up capacitor) that may maintain voltage above operational thresholds such as 1.5 V to 2.0 V (for example, above 1.7 V) for periods ranging from 30 ms to 90 ms (for example, approximately 60 ms) during power transitions, preventing secure element brownout and maintaining data integrity. The hold-up capacitor may be implemented using tantalum or ceramic capacitor technologies with low equivalent series resistance (ESR) values ranging from 0.05Ω to 2.0Ω ((for example, ESR values of 0.1 (to 1.0Ω) to minimize voltage drop during discharge. The power management circuit may include voltage supervisors that monitor supply levels and trigger orderly shutdown procedures when voltage levels approach critical thresholds, ensuring that sensitive data and system state information are properly preserved before power is completely lost.

The hardware-isolated storage module 903 may remain physically isolated from external networks 910 in both offline and online operation modes, with all external communications occurring through secure, encrypted channels that do not compromise the isolation of sensitive data including cryptographic keys 904, credentials 905, and biometric templates 906. This isolation may be implemented through a combination of physical separation, electrical isolation, and cryptographic boundaries. In some embodiments, the hardware-isolated storage module 903 may be implemented as a separate die within a system-in-package (SiP) configuration, with dedicated power domains and carefully controlled signal interfaces that prevent unauthorized access to sensitive information. The cryptographic boundaries may be enforced through secure boot processes, runtime integrity verification, and encrypted communication protocols that protect data both at rest and in transit.

For the smart card housing embodiment, consistent secure functionality may be maintained through a thin, credit card-sized form factor that incorporates the secure hardware architecture, biometric verification module 202, and transaction processing capabilities. The smart card housing may be configured to harvest operating power from a local electromagnetic field and store the harvested power in an onboard power storage system to enable biometric capture and secure transaction operations. In some embodiments, the onboard power storage system may include a supercapacitor or thin-film battery with capacity sufficient to complete a full biometric verification and transaction signing cycle within a single NFC field exposure. The power harvesting circuit may include a tuned antenna and rectifier optimized for the 13.56 MHz frequency band, which may enable efficient energy capture from standard point-of-sale devices. The 13.56 MHz frequency band represents an example of a commonly used frequency in payment terminals that provides sufficient power transfer capabilities while maintaining compatibility with existing infrastructure.

In some cases, the smart card housing may include a biometric sensor, such as a fingerprint reader, embedded within the card surface. The fingerprint reader may be implemented as a capacitive sensor array with resolution exceeding 500 dots per inch to capture minutiae details necessary for accurate verification. This resolution level represents an example that may provide sufficient detail to distinguish unique fingerprint characteristics while balancing power and processing requirements. The sensor may be positioned on the card surface in a location that facilitates natural thumb or finger placement during card usage, such as along one edge or in a corner of the card. In some embodiments, the fingerprint sensor may be covered with a durable, transparent protective layer that maintains sensor sensitivity while providing resistance to wear and environmental factors.

In offline operation mode, the smart card housing may perform biometric verification through the embedded sensors and execute digital asset transactions entirely within the card's hardware-isolated storage module 903, which may remain physically isolated from external networks 910 regardless of connectivity status. The hardware-isolated storage module 903 within the smart card may implement a secure element architecture similar to those used in EMV payment cards, but enhanced with dedicated biometric processing capabilities and expanded secure storage. EMV (Europay, Mastercard, and Visa) represents an example of a widely adopted security standard for payment cards that provides a foundation for secure transaction processing. The architecture may include a physically unclonable function (PUF) for generating device-specific cryptographic keys that cannot be extracted or duplicated, even if the card is physically compromised.

The smart card housing may provide sensory feedback through integrated LED indicators, e-ink display elements, or tactile feedback mechanisms that may communicate transaction status and authentication results to the user 908. In some embodiments, the smart card may incorporate a flexible e-ink display capable of showing transaction amounts, currency types, or authentication status using minimal power. E-ink technology represents an example of a low-power display technology that maintains visibility without continuous power consumption, enabling extended operation between charging cycles. Alternatively, the card may include micro-LEDs embedded beneath a translucent layer of the card body, positioned to be visible to the user 908 during card usage. These LEDs may display different colors or patterns to indicate successful authentication, transaction approval, or error conditions.

In online operation mode, the smart card housing may communicate through standard payment infrastructure protocols such as EMV, ISO/IEC 7816, or other industry-standard interfaces while maintaining the same internal security architecture. The smart card housing may include a dual-interface capability, supporting both contact-based connections through physical terminals and contactless communication via NFC. The contactless interface may comply with ISO/IEC 14443 Type A or Type B standards, which define radio frequency identification protocols for proximity cards. These standards may enable compatibility with existing payment infrastructure while maintaining the enhanced security features of the self-contained biometric device 900.

The smart card substrate may provide physical protection for the embedded secure components, potentially incorporating tamper-evident features that may detect and respond to physical intrusion attempts. These tamper-evident features may include mesh layers embedded within the card body that break when the card is physically compromised, triggering immediate erasure of sensitive cryptographic keys 904 and credentials 905. The card body may be constructed from multiple layers of polycarbonate or polyvinyl chloride acetate (PVCA) materials, which provide durability and resistance to environmental factors. The secure components may be sandwiched between these protective layers to prevent physical access without destroying the functionality of the self-contained biometric device 900.

The smart card housing may implement adaptive power management strategies that may allocate energy resources based on operation requirements, potentially enabling complete authentication and transaction cycles within a single NFC field exposure. The power management system may include a microcontroller that monitors available energy and prioritizes critical functions during low-power conditions. For example, during a transaction, the system may first ensure sufficient power for biometric verification, then for transaction signing, and finally for sensory feedback, with each stage only proceeding if adequate power is available. This prioritization approach may help ensure that critical security operations are completed even under suboptimal power harvesting conditions, such as when the NFC field strength varies due to positioning or reader characteristics.

In both offline and online operation modes, the smart card housing may maintain the same hardware-isolated secure element architecture, implementing identical cryptographic algorithms, biometric matching processes, and transaction authorization procedures as other form factors of embodiments of the present invention. The smart card housing may utilize the same secure boot process, with verification of firmware integrity through cryptographic signatures before execution. The biometric verification module 902 within the smart card housing may employ the same matching algorithms and security thresholds as those used in other form factors, ensuring consistent security properties regardless of the physical implementation. This architectural consistency across form factors may enable users to transition between different embodiments of the self-contained biometric device 900 without requiring re-enrollment of biometric templates 906 or reconfiguration of security settings.

Embodiments of the self-contained biometric device 900 may be configured in various housing types, each providing the same secure functionality while adapting to different physical requirements and use cases. The housing 901 may comprise one of several distinct form factors, including a subdermal implant housing, a dermally-applied biometric tattoo substrate, an ergonomic external wearable housing, or a smart card, with each embodiment maintaining consistent secure functionality during both offline and online operation modes.

In embodiments where the housing 901 comprises the subdermal implant housing, the self-contained biometric device 900 may be designed for placement beneath the skin surface. The subdermal implant housing may include a biocompatible encapsulation layer that surrounds and protects the internal electronic components from bodily fluids and tissue reactions. The subdermal implant housing may incorporate a wireless power receiving coil that enables energy transfer through the skin without requiring physical connections or ports that could create infection risks. The subdermal implant housing may feature a hermetically sealed compartment for electronic components that prevents moisture ingress and maintains sterile conditions around the sensitive circuitry. The subdermal implant housing may be sized and shaped for implantation in various body locations, including a dorsal forearm, a wrist area, a hand region, or a finger, with dimensions optimized for each specific placement site to minimize tissue displacement and maximize user comfort.

In embodiments where the housing 901 comprises the dermally-applied biometric tattoo substrate, the self-contained biometric device 900 may be configured as a skin-applied system. The dermally-applied biometric tattoo substrate may include a flexible, biocompatible polymer layer that conforms to skin contours and accommodates natural body movement without compromising device functionality. The dermally-applied biometric tattoo substrate may incorporate embedded microelectronic components that are integrated directly into the flexible substrate material, enabling the device to maintain full operational capability while remaining thin and conformable. The dermally-applied biometric tattoo substrate may feature an adhesive layer for securing the substrate to a user's skin, providing stable attachment while allowing for removal when desired. The dermally-applied biometric tattoo substrate may be configured to be removable and reusable, allowing users to relocate or temporarily remove the device without permanent commitment to a specific placement. The dermally-applied biometric tattoo substrate may be configured to provide sensory feedback via reversible chemical indicators that create temporary visual changes on the skin surface, subtle tactile sensations that the user may feel through skin contact, thermal modulation that creates localized warming or cooling sensations, or miniature light-emitting elements that provide visual notifications directly from the skin-applied device.

In embodiments where the housing 901 comprises the ergonomic external wearable housing, the self-contained biometric device 900 may be designed as a conventional wearable device. The ergonomic external wearable housing may include a water-resistant outer shell that protects internal components from environmental moisture and contaminants while maintaining access to user interaction surfaces. The ergonomic external wearable housing may incorporate adjustable attachment mechanisms that allow the device to be securely fitted to various body sizes and shapes while remaining comfortable during extended wear periods. The ergonomic external wearable housing may feature integrated sensory feedback elements that provide immediate user notifications through multiple output modalities without requiring external displays or companion devices. The ergonomic external wearable housing may be configured as various form factors, including a wristband that encircles the wrist area, a ring that fits around a finger, a pendant that hangs from the neck or clothing, a skin patch that adheres to a flat body surface, or a head-mounted unit (such as glasses, headbands, earpieces, headsets, helmets, caps, or visors) that may be worn on or near the head region. The ergonomic external wearable housing may be configured to provide sensory feedback via tactile vibration sequences that create distinct patterns the user may feel against the skin, visual light cues that provide immediate visual confirmation of device status, controlled temperature changes that create localized warming or cooling sensations, or chemical signals that may produce temporary olfactory or tactile indicators.

In embodiments where the housing 901 comprises a smart card, the self-contained biometric device 900 may be configured to harvest operating power from a local electromagnetic field and store this harvested power in an onboard power storage system. This power harvesting capability enables the smart card to perform biometric capture and secure transaction operations without requiring an internal battery or external power source. The smart card may draw energy from nearby NFC readers or payment terminals when placed in proximity to these devices, storing sufficient power to complete authentication and transaction processes. This allows the smart card to maintain the same secure functionality as other housing embodiments while conforming to standard card dimensions and compatibility with existing payment infrastructure.

Each housing embodiment may maintain the same core functionality while adapting the physical interface and power management systems to suit the specific deployment environment. The biometric verification module 902 may maintain consistent secure functionality across all housing types, capturing and processing biometric input 909 from the user 908 using sensors appropriate to each form factor. The hardware-isolated storage module 903 may provide the same level of security and isolation in each embodiment, storing cryptographic keys 904, credentials 905, and biometric templates 906 with identical protection mechanisms regardless of the physical housing configuration. The transaction processing module 907 may execute the same cryptographic operations and transaction management functions across all housing types, ensuring consistent security properties and user experience regardless of form factor selection.

The biometric verification module 902 may perform user authentication based on the biometric input 909 entirely within the self-contained biometric device 900 using various techniques. In some embodiments, the biometric verification module 902 may include a matching engine that compares the captured biometric input 909 to an encrypted biometric template stored in the hardware-isolated storage module 903. The matching engine may perform comparison operations entirely within the self-contained biometric device 900, using algorithms that analyze the captured biometric data against the stored template to determine whether a match exists. In some cases, the matching engine may utilize various comparison techniques depending on the type of biometric input 909, such as minutiae matching for fingerprints, pattern recognition for iris scans, or waveform analysis for voiceprints. The matching engine may generate a confidence score or similarity metric that indicates the degree of correspondence between the captured biometric input 909 and the stored encrypted biometric template.

In some embodiments, the biometric verification module 902 may perform every step of biometric authentication inside a hardware-isolated secure element mounted in each form factor-subdermal implant, dermal tattoo, solar-assisted wearable, and smart card. Raw biometric signals may never leave the secure element, and no host processor or external server may be involved in capture, feature extraction, matching, or decision-making. The sensor interface may terminate inside the secure element, with raw signal frames conveyed over an AES-256-encrypted SPI bus that may be physically inaccessible to any host processor. Within the secure element, a hardened digital-signal-processing front-end may remove motion artifacts, compensate for tissue scattering or skin-tone variations, and normalize gain. Feature extraction may then operate on the cleansed signal: vein imagery may be converted to a binary skeleton by a max-curvature line-tracking algorithm; fingerprint imagery may be reduced to a Bloom-encoded minutiae map; electrocardiogram data may be transformed into a frequency-domain vector supplemented by timed fiducials.

In various embodiments, the biometric verification module 902 may employ a multimodal match engine that scores each modality using different metrics such as graph-edit distance, normalized Hamming distance, or cosine similarity, and fuses the scores using a logistic classifier.

The biometric verification module 902 may utilize an analog-to-digital converter, such as a 12-bit converter, at sample rates and frame sizes that may be policy-defined. For example, one embodiment may use approximately 1 kS/s and frames of at least 150×150 pixels, though these numerical values are provided merely as examples and may vary in different implementations. Each compressed template may be 2 kB or smaller, allowing a 128 KB AES-GCM vault to store at least 64 template rotations before roll-off, though these numerical values are provided merely as examples and may vary based on specific implementation requirements.

In some embodiments, the digital signal processing micro-code may be hash-chained (for example, using SHA-384 or other suitable cryptographic hash functions) to the ROM public key, helping to ensure the feature-extraction pipeline cannot be compromised by malware. The biometric verification module 902 may implement various spoof resilience techniques that may meet different security standards, such as ISO/IEC 30107-3 Presentation Attack Detection level 2 standards, or other comparable security specifications. Alternative implementations may utilize different cryptographic algorithms, security protocols, or verification methodologies while maintaining similar security properties. The specific hash function, security standard compliance level, and implementation approach may vary across different embodiments of the self-contained biometric device 900, depending on the particular security requirements, computational resources, and deployment contexts.

In some embodiments, the biometric verification module 902 may implement a cancelable-template salt (device-UID⊕SHA-256 of raw features) that may prevent cross-matching across different devices. The biometric verification module 902 may generate a signed authentication verdict that embeds a device unique identifier, timestamp, and counter value. Downstream modules may refuse this verdict after a policy-defined dwell interval, potentially eliminating replay attacks without requiring hard-coded thresholds. The biometric verification module 902 may perform concurrent liveness checks to confirm physiological pulse or impedance cues and inertial context from an on-die motion sensor. Upon successful authentication, the secure element may sign the decision-success or failure plus a nonce-using an ECDSA P-256 key pair that may be distinct from any asset keys used for transactions.

The authentication token may be the only data passed to wallet, AI, and ledger modules. In some embodiments, the authentication token may be formatted as a structured data object containing multiple fields such as a device identifier, timestamp information, a counter value for security purposes, and a cryptographic signature or hash. For example, the authentication token may be implemented as a signed 128-bit "AuthToken" formatted as <UID|timestamp||counter|HMAC>, where UID represents the device's PUF-derived identifier, the counter is monotonic for anti-replay protection, and the final field is an HMAC-SHA-256 tag calculated over the preceding values. In various embodiments, configurable parameters rather than fixed constants may govern security-related intervals and allowable variations, enabling security rules to be adjusted after deployment without requiring firmware updates. For example, policy registers, not hard-coded constants, may govern the dwell interval and allowable counter drift, enabling replay rules to be tuned post-deployment without reflashing firmware.

In various embodiments, receiving modules may verify the AuthToken signature and unlock access for a brief, predefined window before automatically relocking. Each subsystem may store the secure element's public-key digest in a locked Hardware Abstraction Layer (HAL) registry and therefore may verify AuthTokens locally, even in offline operation mode. When connectivity resumes, the secure element may export the current Merkle root over TLS 1.3 to a CeFi token gateway or blockchain relay, without revealing plaintext ledger entries. No raw biometrics, feature vectors, or templates may ever cross module boundaries or be exposed outside the secure element. Templates themselves may be stored as AES-256-GCM-sealed blobs bound to a device-unique SRAM physically-unclonable-function (PUF) root key. A monotonic counter may prevent rollback, and any voltage glitch, clock fault, or PUF mismatch may trigger irreversible zeroization of both templates and the key ladder. Because implants and tattoos may need to run on harvested or micro-battery energy, the secure element may integrate fixed-function accelerators (such as FFT, Hamming, and ECC) so a complete capture-to-decision cycle consumes a minimal amount of energy, which in some embodiments may be less than a millijoule of energy, though the actual energy consumption may vary based on specific implementation requirements, hardware configurations, and operational parameters.

The biometric verification module 902 may be configured to update the encrypted biometric template based on changes in biometric characteristics of the user 908 over time. Biometric characteristics may naturally change due to factors such as aging, injury, environmental conditions, or normal physiological variations. The biometric verification module 902 may detect these changes during authentication attempts and may adapt the stored template accordingly to maintain accurate recognition performance. In some embodiments, template aging updates may be performed wholly on-device by averaging freshly captured features into the sealed blob, eliminating any requirement for cloud-based retraining. The biometric verification module 902 may implement template aging algorithms that gradually incorporate new biometric measurements into the existing template while preserving the template's discriminative properties. The template updating process may occur automatically during successful authentication events, allowing the system to learn and adapt to gradual changes in the user's biometric characteristics without requiring manual re-enrollment. The updated encrypted biometric template may be stored back into the hardware-isolated storage module 903 using the same security mechanisms that protect the original template, ensuring that template updates do not compromise the security of the stored biometric data.

In some embodiments, the biometric verification module 902 may generate results entirely within the secure enclave without exposing sensitive data. Upon successful matching, the secure enclave may issue a signed assertion that the user's identity has been verified. This assertion may contain no raw biometric data-only a cryptographic proof or a pass/fail indicator. The biometric verification module 902 may pass data to other modules through hardware-enforced isolation channels, such as physically verified buses or strongly segregated memory buffers. When the user 908 is using the self-contained biometric device 900 for transactions or unlocking additional features, the biometric verification module 902 may generate a time-stamped signature proving that "Biometric verified: [User ID or pseudonym]." Outside components may verify the signature's authenticity without learning the biometric data itself. Even when results are needed by a remote server, such as centralized or decentralized "mini-hubs," these external systems may receive only the signed outcome—never the user's fingerprint image or raw signals. This architecture may allow compliance with privacy regulations and user trust requirements.

In various embodiments, biometric templates may be stored in flash memory inside the secure element, wrapped in AES-256-GCM encryption and bound to a device-unique SRAM-PUF root key. A monotonic counter may thwart rollback attacks, while voltage glitches, clock faults, or PUF mismatches may trigger zeroization of both templates and the key ladder. Template "aging" updates—averaging fresh features into the stored model—may be performed entirely on-device, eliminating any need for cloud retraining. The biometric verification module 902 may implement liveness and spoof resistance mechanisms that meet ISO/IEC 30107-3 presentation-attack-detection requirements, providing robust protection against various spoofing attempts such as printed images, 3D masks, or synthetic fingerprints. These comprehensive security measures may ensure that the biometric verification process remains secure and reliable across different operational environments and usage scenarios.

The hardware-isolated storage module 903 may provide a secure environment for storing sensitive data such as cryptographic keys 904, credentials 905, and/or biometric templates 906. This module may be designed to maintain physical isolation from external networks 910 and other system components, potentially ensuring that sensitive information remains protected from unauthorized access. The hardware-isolated storage module 903 may incorporate various security mechanisms to prevent external access while enabling authorized internal operations using the stored data. These security mechanisms may include physical barriers, cryptographic protections, and specialized hardware components that may work together to create a trusted execution environment within the self-contained biometric device 900.

The hardware-isolated storage module 903 may provide a secure environment for storing sensitive data such as cryptographic keys 904, credentials 905, and/or biometric templates 906. This module may be designed to maintain physical isolation from external networks 910 and other system components, potentially ensuring that sensitive information remains protected from unauthorized access. The hardware-isolated storage module 903 may incorporate various security mechanisms to prevent external access while enabling authorized internal operations using the stored data. These security mechanisms may include physical barriers, cryptographic protections, and specialized hardware components that may work together to create a trusted execution environment within the self-contained biometric device 900.

The hardware-isolated storage module 903 may comprise a physically-unclonable-function (PUF)-bound key vault that generates unique cryptographic keys based on inherent physical characteristics of the device hardware. The PUF-bound key vault may utilize manufacturing variations in semiconductor devices to create device-specific keys that cannot be duplicated or extracted from the hardware. In some embodiments, the PUF-bound key vault may generate keys based on variations in transistor threshold voltages, memory cell characteristics, or other physical properties that are unique to each individual device. The PUF-bound key vault may combine the PUF-generated entropy with additional cryptographic processes to derive the cryptographic keys 904 used for transaction signing and credential protection.

In some cases, the PUF-bound key vault may utilize a static random-access memory (SRAM) PUF implementation, where the initial state of SRAM cells upon power-up provides a unique fingerprint for each device. The SRAM PUF may include 1,024 memory cells that generate a device-specific pattern with high reliability (99.93% stability) across temperature variations and aging effects. The PUF-bound key vault may employ error correction techniques, such as BCH (Bose-Chaudhuri-Hocquenghem) codes with helper data, to ensure consistent key derivation despite potential variations in PUF responses. For example, a BCH (63,45,3) error correction scheme may be implemented to correct up to 3 bit errors in a 63-bit PUF response segment. The PUF-bound key vault may also incorporate entropy mixing, where the raw PUF response is combined with additional entropy sources using cryptographic hash functions such as SHA-256 or SHA-384 to strengthen the derived keys against potential attacks. In some embodiments, the PUF-bound key vault may implement a key ladder structure, where a root key derived from the PUF response is used to generate multiple child keys for different cryptographic operations, enhancing security through key separation.

The hardware-isolated storage module 903 may be configured to perform cryptographic operations using the stored cryptographic keys 904 without exposing the stored cryptographic keys 904 outside of the module 903. The hardware-isolated storage module 903 may include dedicated cryptographic processing units that execute signing operations, encryption functions, and key derivation procedures entirely within the isolated environment. In some cases, the hardware-isolated storage module 903 may receive transaction data or authentication requests through secure interfaces, process these requests using the stored cryptographic keys 904, and return only the cryptographic results without ever transmitting the keys themselves. The hardware-isolated storage module 903 may implement secure communication protocols that allow other components of the self-contained biometric device 900 to request cryptographic services while maintaining the isolation of the underlying key material.

The hardware-isolated storage module 903 may comprise tamper-resistant hardware designed to erase stored data in response to detecting physical tampering. The tamper-resistant hardware may include sensors that monitor for physical intrusion attempts, voltage manipulation, temperature variations, or other conditions that may indicate unauthorized access attempts. In some embodiments, the tamper-resistant hardware may incorporate mesh layers, light sensors, or pressure-sensitive elements that detect when the device housing 901 has been opened or modified. Upon detecting tampering conditions, the hardware-isolated storage module 903 may automatically execute data erasure procedures that permanently delete the cryptographic keys 904, credentials 905, and biometric templates 906 to prevent unauthorized extraction of sensitive information.

The hardware-isolated storage module 903 may store multiple types of credentials 905, including biometric templates 906, digital identity certificates, and financial transaction authorizations. The biometric templates 906 may include encrypted representations of the user's physiological characteristics that are used for authentication purposes. Digital identity certificates may comprise cryptographically signed documents that attest to the user's identity attributes and may be formatted according to standards such as X.509 or other certificate formats. Financial transaction authorizations may include tokens, certificates, or other credentials that enable the self-contained biometric device 900 to execute digital asset transactions on behalf of the user 908. In some cases, the hardware-isolated storage module 903 may organize these different credential types in separate storage partitions while maintaining the same security protections for all stored data.

The stored cryptographic keys 904 and credentials 905 may be stored in encrypted form at rest in the hardware-isolated storage module 903. The hardware-isolated storage module 903 may implement multiple layers of encryption to protect stored data, including symmetric encryption for bulk data storage and asymmetric encryption for key protection. In some embodiments, the hardware-isolated storage module 903 may use different encryption keys for different types of stored data, with master keys derived from hardware-specific sources such as PUF responses or fused ROM values. The encryption keys used for data protection may themselves be stored in protected memory regions that are inaccessible to external interfaces, ensuring that even if the storage medium is physically accessed, the encrypted data remains protected.

In some embodiments, the credentials 905 stored in the hardware-isolated storage module 903 may comprise verifiable credentials issued and verified in accordance with the W3C Decentralized Identifier Core Specification and the W3C Verifiable Credentials Data Model. These verifiable credentials may include cryptographically signed attestations about the user's identity, qualifications, or other attributes that may be presented to third parties for verification purposes. The verifiable credentials may be structured as JSON-LD documents that may include claims about the user 908, cryptographic proofs of the issuer's authority, and metadata that may enable verification without requiring contact with the original issuing authority. In some cases, the hardware-isolated storage module 903 may store multiple verifiable credentials from different issuers, allowing the user 908 to selectively present appropriate credentials for different use cases while maintaining privacy through selective disclosure. Alternatively, the credentials 905 may be formatted using other data structures such as JWT (JSON Web Tokens), XML, or binary encodings that support cryptographic verification. In various embodiments, the hardware-isolated storage module 903 may implement different storage strategies for the credentials 905, including hierarchical organization by issuer, categorization by credential type, or indexing based on usage frequency to optimize retrieval performance.

The hardware-isolated storage module 903 may be implemented using various secure storage technologies that maintain isolation from external networks 910 and host operating systems. In some embodiments, the hardware-isolated storage module 903 may comprise battery-backed static RAM that retains stored keys and credentials even when main power is removed from the self-contained biometric device 900. The battery-backed storage may include tamper detection circuits that erase the memory contents if unauthorized access is attempted. In other embodiments, the hardware-isolated storage module 903 may utilize fused ROM technology where cryptographic keys 904 may be written into the self-contained biometric device 900 during manufacturing and may not be modified or extracted through software interfaces. The fused ROM implementation may provide a high level of key protection by making the cryptographic keys 904 physically part of the hardware. Alternative implementations of the hardware-isolated storage module 903 may include, for example, one-time programmable memory, secure flash storage with hardware encryption, or embedded secure elements with dedicated cryptographic processors. In some cases, the hardware-isolated storage module 903 may employ a combination of these technologies to create multiple security layers for protecting different types of sensitive data.

In some embodiments, the hardware-isolated storage module 903 may be implemented as a Secure Enclave processor that includes dedicated cryptographic hardware and isolated memory regions. The Secure Enclave may run its own operating system that is separate from any host system, helping to ensure that stored cryptographic keys 904 and credentials 905 remain protected even if the main device software experiences a compromise. The Secure Enclave may communicate with other components of the self-contained biometric device 900 through carefully controlled interfaces that never expose raw key material or sensitive credential data. The hardware-isolated storage module 903 may also incorporate hardware security modules (HSMs) or trusted platform modules (TPMs) that provide standardized secure storage and cryptographic processing capabilities while maintaining isolation from external networks 910 and unauthorized access attempts. In other embodiments, the hardware-isolated storage module 903 may utilize a physically separate microcontroller with embedded secure memory, a dedicated security chip with tamper-resistant features, or a programmable secure element with cryptographic acceleration capabilities. Alternative implementations may include, for example, a system-on-chip with an isolated security domain, a field-programmable gate array (FPGA) with encrypted bitstream configuration, or a custom application-specific integrated circuit (ASIC) designed specifically for secure key management and credential storage. In some cases, the hardware-isolated storage module 903 may employ multiple layers of isolation, combining both hardware and software security mechanisms to create defense-in-depth protection for the stored cryptographic keys 904 and credentials 905.

In some embodiments, the hardware-isolated storage module 903 may store identity credentials encoded in a format compatible with ICAO Doc 9303, enabling interoperability with ePassport verification systems. For example, the hardware-isolated storage module 903 may maintain identity credentials that conform to the International Civil Aviation Organization (ICAO) Document 9303 standard, which defines the specifications for machine-readable travel documents. These credentials may include digitally signed identity information such as biographic data, document security features, and cryptographic keys that enable verification against international passport and identity document systems. In various embodiments, the ICAO Doc 9303-compatible credentials may be stored in a protected partition within the hardware-isolated storage module 903, with access controlled by the biometric verification module 902. When authorized by the user 908 through biometric authentication, embodiments of the self-contained biometric device 900 may present these credentials to compatible border control systems, airport security checkpoints, or other verification points that support ePassport validation. Alternative embodiments may store credentials in other international identity formats, such as ISO/IEC 18013-5 mobile driving license standards or W3C Verifiable Credentials formats. The credentials may be transmitted through secure communication channels that protect the integrity and confidentiality of the identity information while enabling interoperability with existing global identity verification infrastructure. In some cases, the hardware-isolated storage module 903 may support multiple credential formats simultaneously, allowing the self-contained biometric device 900 to present appropriate credentials based on the verification system requirements.

The hardware-isolated storage module 903 may include a power management system that provides a unified power rail and clock source to enable consistent cryptographic and biometric operations across different housing types. This power management system ensures that regardless of whether the self-contained biometric device 900 is implemented as a subdermal implant, a dermally-applied biometric tattoo, an ergonomic external wearable, or a smart card, the cryptographic operations and biometric processing receive stable, regulated power and precise timing signals. The unified power rail may include voltage regulation circuits that convert various input power sources (such as battery power, harvested energy, or external power) into the specific voltage levels required by the secure processing components. The clock source may provide synchronized timing signals that maintain the integrity of cryptographic algorithms and secure communications protocols across all device form factors. This standardized power and timing architecture helps ensure that security operations remain consistent and reliable regardless of the physical implementation of the device, preventing timing-based attacks or power analysis vulnerabilities that might otherwise compromise the cryptographic keys 904 or credentials 905 stored within the hardware-isolated storage module 903.

The transaction processing module 907 may be configured to execute various types of digital asset transactions entirely within the self-contained biometric device 900. In some embodiments, the transaction processing module 907 may execute cryptocurrency transfers, which may involve transferring digital currencies such as Bitcoin, Ethereum, or other blockchain-based assets from one digital wallet to another. The transaction processing module 907 may also execute tokenized asset exchanges, which may involve trading or converting digital tokens that represent ownership of physical or digital assets, such as real estate tokens, commodity tokens, or utility tokens. As other examples, the transaction processing module 907 may execute fiat currency conversions, which may involve converting traditional government-issued currencies that have been digitized into central bank digital currencies or other digital representations of fiat money. The transaction processing module 907 may perform these various transaction types using the cryptographic keys 904 stored in the hardware-isolated storage module 903, with all cryptographic signing and transaction authorization occurring within the secure boundary of the self-contained biometric device 900.

The transaction processing module 907 may support any of a variety of digital currency formats, such as central bank digital currencies (CBDCs), regulated stablecoins, and other programmable digital tokens. The transaction processing module 907 may perform these operations using the cryptographic keys 904 stored in the hardware-isolated storage module 903, ensuring that all transaction signing and authorization occurs within the secure boundary of the self-contained biometric device 900.

The transaction processing module 907 may include an internal ledger for recording executed transactions in both online and offline operation modes. The internal ledger may maintain a chronological record of all transactions processed by the self-contained biometric device 900, including transaction details such as amounts, destinations, timestamps, and cryptographic signatures. In some embodiments, the internal ledger may be implemented as a tamper-evident data structure, such as a Merkle tree or blockchain-inspired architecture, that cryptographically links transaction records to prevent unauthorized modification. This structure may allow for efficient verification of ledger integrity without requiring access to the entire transaction history.

The transaction processing module 907 may update the internal ledger immediately upon completion of each transaction, ensuring that a complete audit trail is maintained regardless of network connectivity status. To optimize storage efficiency, the internal ledger may employ data compression techniques, such as delta encoding or run-length encoding, to minimize the space required for transaction records while preserving their integrity and auditability.

In some implementations, the internal ledger may support selective disclosure mechanisms, allowing the device to generate zero-knowledge proofs or redacted transaction logs that demonstrate compliance with regulatory requirements without revealing sensitive transaction details. This feature may enable privacy-preserving audits and reporting.

The internal ledger may be stored within the hardware-isolated storage module 903 to protect transaction records from external access or tampering. To enhance resilience against data loss, the transaction processing module 907 may implement a redundant storage strategy, maintaining multiple encrypted copies of the ledger across different memory regions within the hardware-isolated storage module 903. Additionally, the module may employ error correction codes to detect and recover from potential data corruption.

For long-term record keeping, the transaction processing module 907 may periodically generate cryptographic commitments or hash digests of the internal ledger, which can be securely transmitted and stored externally without compromising the confidentiality of individual transactions. These commitments may serve as anchors for future audits or dispute resolution processes.

In scenarios where storage capacity within the hardware-isolated storage module 903 becomes constrained, the transaction processing module 907 may implement an intelligent pruning mechanism. This mechanism may archive older transaction records using more aggressive compression or summarization techniques while maintaining detailed records of recent transactions, striking a balance between comprehensive record-keeping and efficient resource utilization.

The transaction processing module 907 may be configured to perform currency conversions (e.g., in real time) between different types of digital assets stored within the self-contained biometric device 900. The transaction processing module 907 may maintain exchange rate information for supported digital currencies and may automatically calculate conversion rates when processing transactions that involve multiple asset types. In some embodiments, the transaction processing module 907 may access stored exchange rate data from the hardware-isolated storage module 903 or may receive updated exchange rate information through secure communication channels when network connectivity is available. The currency conversion functionality may enable users to seamlessly transact in different digital currencies without requiring manual conversion steps or external exchange services.

The transaction processing module 907 may employ a secure execution environment isolated from other components of the self-contained biometric device 900 to process transactions. The secure execution environment may provide additional protection for transaction processing operations by creating a separate computational space that is isolated from other device functions. In some embodiments, the secure execution environment may be implemented using a hardware security module (HSM) with dedicated cryptographic processors and tamper-resistant memory that physically separates transaction processing from the main system. In other embodiments, the secure execution environment may utilize a Trusted Execution Environment (TEE) such as ARM TrustZone or Intel SGX that creates an isolated processing region within the main processor. The secure execution environment may also be implemented using a separate microcontroller with its own memory and processing resources, connected to the main system through a strictly controlled interface that limits data exchange to specific, authenticated commands. In some cases, the secure execution environment may employ memory isolation techniques such as address space layout randomization (ASLR), data execution prevention (DEP), or hardware-enforced memory boundaries to prevent unauthorized access to transaction processing memory regions. The transaction processing module 907 may utilize virtualization-based isolation where transaction processing occurs within a dedicated virtual machine that is cryptographically separated from the host operating system. In various embodiments, the secure execution environment may include dedicated processing resources, memory regions, and communication pathways that are not accessible to other system components. The transaction processing module 907 may utilize this isolated environment to perform sensitive operations such as private key access, transaction signing, and cryptographic computations without exposing these operations to potential security threats from other parts of the device.

The transaction processing module 907 may be configured to generate and store transaction receipts within the hardware-isolated storage module 903. Transaction receipts may take any of a variety of forms and may, for example, include information about completed transactions, such as transaction identifiers, amounts, timestamps, destination addresses, and/or cryptographic signatures. In some embodiments, the transaction receipts may be formatted according to standard receipt formats or may include additional metadata that enables verification of transaction authenticity. The transaction processing module 907 may store these receipts in encrypted form within the hardware-isolated storage module 903, ensuring that transaction records remain secure and tamper-evident. The stored receipts may be accessible to the user 908 for record-keeping purposes or may be presented to third parties for transaction verification when authorized.

The transaction processing module 907 may include an internal clock for timestamping transactions executed in offline mode. The internal clock may provide accurate time references for transaction records even when the self-contained biometric device 900 is not connected to external networks 910. In some cases, the internal clock may be implemented as a battery-backed real-time clock that maintains accurate timekeeping during power-off periods. The transaction processing module 907 may use timestamps from the internal clock to create chronologically ordered transaction records in the internal ledger. The timestamping functionality may be particularly valuable for offline transactions, as it enables the creation of verifiable transaction sequences that can be validated when network connectivity is restored.

The transaction processing module 907 may be configured to batch multiple transactions executed in offline mode for later synchronization when network connectivity becomes available. The batching functionality may enable the self-contained biometric device 900 to accumulate multiple offline transactions and transmit them as a group when a secure network connection is established. In some embodiments, the transaction processing module 907 may organize batched transactions in chronological order and may include additional metadata such as batch identifiers and integrity checksums. The batching process may optimize network usage and may reduce the overhead associated with individual transaction transmissions. The transaction processing module 907 may maintain the batched transactions in the hardware-isolated storage module 903 until successful synchronization is confirmed.

The transaction processing module 907 may be configured to cryptographically sign digital asset transactions using the stored cryptographic keys 904 without exposing the stored cryptographic keys 904 outside of the self-contained biometric device 900. The cryptographic signing process may involve generating digital signatures that authenticate the transaction and prove that it was authorized by the legitimate owner of the associated digital assets. In some cases, the transaction processing module 907 may use different cryptographic keys 904 for different types of transactions or digital assets, with each key being securely stored and managed within the hardware-isolated storage module 903. The signing process may occur entirely within the secure boundary of the self-contained biometric device 900, ensuring that private keys never leave the device and cannot be intercepted or compromised during transaction processing.

The transaction processing module 907 may be configured to store various types of payment tokens, including, for example, an EMV-compliant payment token provisioned by a remote issuer while preventing any export of that token or its associated private keys. In some embodiments, the transaction processing module 907 may enter an autonomous offline mode whenever network connectivity is absent for at least a predetermined interval, during which the biometric verification module 902 alone may authorize transactions and each transaction may be recorded as an entry in a tamper-evident, append-only data structure such as a Merkle-tree ledger, blockchain-based ledger, or other cryptographically secured ledger maintained inside the hardware-isolated storage module 903. Upon restoration of connectivity, the transaction processing module 907 may transmit only minimal verification data, such as a signed root hash of the ledger and a zero-knowledge proof attesting to the aggregate number and value of the offline transactions to a remote verification service, which may include a risk-scoring service, a financial institution's validation system, or a distributed consensus network, while withholding individual transaction records, biometric templates 906, and private keys. In various embodiments, the transaction processing module 907 may commit or roll back the offline ledger based on a reconciliation verdict, which may be a single-bit response, a multi-bit status code, or a cryptographically signed authorization message returned by the verification service, helping to ensure the payment token, private keys, and plaintext transaction records remain confined to the secure enclave. The transaction processing module 907 may implement alternative synchronization protocols depending on the specific requirements of different financial networks, regulatory frameworks, or deployment contexts.

The self-contained biometric device 900 may further include a machine learning-based inference engine that analyzes transaction data entirely within the self-contained biometric device 900. The machine learning-based inference engine may incorporate one or more trained machine learning models that process financial and transactional information without requiring external cloud services or network connectivity. In some embodiments, the machine learning-based inference engine may employ trained neural networks, decision trees, and/or statistical models to examine patterns in transaction history, spending behaviors, and financial activities to generate insights and recommendations for the user 908. The machine learning-based inference engine may utilize these trained machine learning models and algorithms that are stored and executed within the hardware-isolated storage module 903, ensuring that all analytical processing occurs within the secure boundary of the self-contained biometric device 900.

The machine learning-based inference engine may be configured to analyze biometric input 909 and interaction patterns over time to generate a drift metric reflecting deviations from baseline user behavior. The drift metric may serve as a quantitative measure that indicates how current user interactions compare to established behavioral patterns. In some cases, the machine learning-based inference engine may track various aspects of user behavior, such as biometric authentication timing, transaction frequency, device usage patterns, and interaction sequences. The machine learning-based inference engine may calculate the drift metric by comparing recent behavioral data against historical baselines stored within the hardware-isolated storage module 903. The drift metric may be utilized for credential integrity assurance, anomaly detection, or device-level risk assessment, providing multiple applications for behavioral analysis within the self-contained biometric device 900.

The machine learning-based inference engine may maintain a rolling buffer of anonymized drift and interaction metrics to improve local decision-making and auditability, particularly in infrastructure-limited environments. This rolling buffer may store historical patterns of user interactions without retaining personally identifiable information, enabling the machine learning-based inference engine to establish baseline behavioral norms while preserving privacy. In some embodiments, the rolling buffer may implement a circular data structure that automatically removes oldest entries when new data is added, maintaining a fixed-size window of recent interaction history. The anonymized metrics may include statistical representations of authentication timing patterns, transaction frequency distributions, or interaction sequence probabilities, all stored in a format that prevents reconstruction of individual user activities or biometric characteristics.

When paired with authorized field hubs or provisioning terminals, the self-contained biometric device 900 may optionally transmit a compressed and pseudonymized telemetry packet containing integrity signals-such as usage entropy indicators, biometric variance hashes, or authentication failure flags-without disclosing raw biometric templates 906 or personally identifiable information. These telemetry packets may provide system health and security status information while maintaining user privacy. In high-trust operational contexts, dual-authentication protocols may govern access to system-level telemetry through secure firmware pathways, enabling authorized personnel to verify device trustworthiness, behavioral anomalies, or field-based risk signals while preserving the user's core cryptographic sovereignty. The dual-authentication protocols may require both user consent through the biometric verification module 902 and cryptographic verification of the requesting entity's authorization credentials before allowing access to telemetry data.

The machine learning-based inference engine may be configured to generate personalized financial insights based on the analyzed transaction data. The personalized financial insights may include spending pattern analysis, budget recommendations, savings opportunities, or investment suggestions tailored to the user's specific financial behavior and preferences. In some embodiments, the machine learning-based inference engine may analyze transaction categories, amounts, frequencies, and timing to identify trends and patterns in the user's financial activities. The machine learning-based inference engine may generate recommendations for optimizing spending, identifying potential cost savings, or suggesting financial strategies that align with the user's observed behavior patterns. The personalized financial insights may be presented to the user 908 through the sensory feedback system 205 or may be stored within the hardware-isolated storage module 903 for later access.

The machine learning-based inference engine may be configured to detect anomalous transaction patterns and trigger security alerts. Anomalous transaction patterns may include unusual spending amounts, unexpected transaction frequencies, transactions at atypical times or locations, or other deviations from established user behavior. In some cases, the machine learning-based inference engine may compare current transaction characteristics against learned behavioral models to identify potential fraud, unauthorized access, or security threats. The machine learning-based inference engine may generate security alerts when anomalous patterns are detected, potentially notifying the user 908 through sensory feedback mechanisms or triggering additional security measures within the self-contained biometric device 900. The anomaly detection functionality may operate continuously in the background, providing real-time monitoring of transaction activities without requiring external security services.

The machine learning-based inference engine may operate in both online and offline modes, maintaining consistent analytical capabilities regardless of network connectivity status. In offline mode, the machine learning-based inference engine may continue to analyze transaction data, update behavioral models, and generate insights using only the data and processing resources available within the self-contained biometric device 900. In some embodiments, the machine learning-based inference engine may store analytical results and model updates locally during offline operation, synchronizing with external systems when network connectivity becomes available. The dual-mode operation may ensure that users receive continuous analytical support and security monitoring even in environments with limited or no network access.

The machine learning-based inference engine may be configured to adapt its analysis algorithms based on user behavior patterns observed in the transaction data. The adaptive functionality may enable the machine learning-based inference engine to improve its accuracy and relevance over time by learning from the user's specific financial behaviors and preferences. In some cases, the machine learning-based inference engine may modify its analytical models, adjust detection thresholds, or update recommendation algorithms based on observed user responses and behavioral changes. The machine learning-based inference engine may implement machine learning techniques such as reinforcement learning, neural network adaptation, and/or statistical model updating to continuously refine its analytical capabilities. The adaptive algorithms may operate entirely within the self-contained biometric device 900, ensuring that personalization and model improvements occur without exposing user data to external systems.

The self-contained biometric device 900 may further include a local communications interface that may be configurable for short-range data exchange without reliance on external computation. While the local communications interface is not shown in FIG. 9, the local communications interface may be incorporated into the self-contained biometric device 900 within the housing 901 and/or as an additional component connected to the existing modules. The local communications interface may be configured to facilitate secure communication between the self-contained biometric device 900 and nearby trusted hardware through various communication protocols. In some embodiments, the local communications interface may support near-field communication (NFC), Bluetooth Low Energy (BLE), QR code exchange, infrared signaling, and/or contact-based docking methods for establishing secure connections with external devices.

The local communications interface may enable the self-contained biometric device 900 to exchange data with mobile phones, tablets, smart kiosks, enrollment hubs in retail locations, other self-contained secure biometric devices for peer-to-peer authentication or mesh synchronization, peripheral modules such as biometric scanners or fallback tokens, smartcards, and secure onboarding stations such as NGO field tablets. In some cases, the local communications interface may maintain data within a hardened local perimeter without requiring cloud dependency or external compute layers, ensuring resilient performance in disconnected or infrastructure-compromised environments.

The local communications interface may be configured to transmit identity and authentication data through secure short-range communication channels. In some embodiments, the local communications interface may transmit DID Documents that contain decentralized identifier information for the user 908. The local communications interface may also transmit verifiable credentials from the hardware-isolated storage module 903, which may include cryptographically signed attestations about the user's identity, qualifications, or other attributes. The local communications interface may generate and transmit biometric challenge-response signatures created by the biometric verification module 902, providing cryptographic proof of successful biometric authentication without exposing raw biometric data. In some cases, the local communications interface may transmit zero-knowledge proofs for privacy-preserving credential verification, allowing third parties to verify user attributes without accessing sensitive personal information.

The local communications interface may be configured to support various financial and asset operations through secure local communication protocols. In some embodiments, the local communications interface may enable offline transaction signing by the transaction processing module 907, allowing the self-contained biometric device 900 to authorize and sign digital asset transactions without requiring network connectivity. The local communications interface may facilitate synchronization of transaction data with local ledgers maintained by nearby devices or systems, enabling distributed transaction record keeping. The local communications interface may support encrypted receipt exchange, allowing the self-contained biometric device 900 to securely share transaction receipts with merchants, other users, or authorized systems. In some cases, the local communications interface may implement proximity-based payment authorization protocols that enable secure financial transactions through close-range communication with point-of-sale terminals or other payment systems.

The local communications interface may be configured to generate and transmit compressed and pseudonymized telemetry packets containing integrity signals for system monitoring and verification purposes. In some embodiments, the local communications interface may generate telemetry packets that include usage entropy indicators, which may provide statistical measures of device usage patterns without revealing specific user activities. The local communications interface may include biometric variance hashes in the telemetry packets, which may indicate changes in biometric authentication patterns over time without exposing actual biometric templates 906. The local communications interface may also include authentication failure flags in the telemetry packets, providing information about unsuccessful authentication attempts for security monitoring purposes. The local communications interface may transmit these telemetry packets to authorized field hubs or provisioning terminals without disclosing raw biometric templates 906 or personally identifiable information, maintaining user privacy while enabling system oversight and maintenance.

The local communications interface may include specialized hardware components for extended-range communication and location tracking capabilities. In some embodiments, the local communications interface may include a long range, low-power transceiver that may be configured for peer-to-peer mesh networking with other compatible devices. The transceiver may enable the self-contained biometric device 900 to communicate with other devices over longer distances than traditional short-range protocols while maintaining low power consumption. The self-contained biometric device 900 may include a secure processor that may be configured to append additional metadata to cryptographically signed transaction records. The secure processor may add a timestamp indicating when each transaction was processed, along with latitude and longitude coordinates derived from an integrated low-power GNSS receiver. The location and timing information may be cryptographically bound to each transaction record, providing verifiable proof of when and where transactions occurred for audit and compliance purposes.

Figure 10:
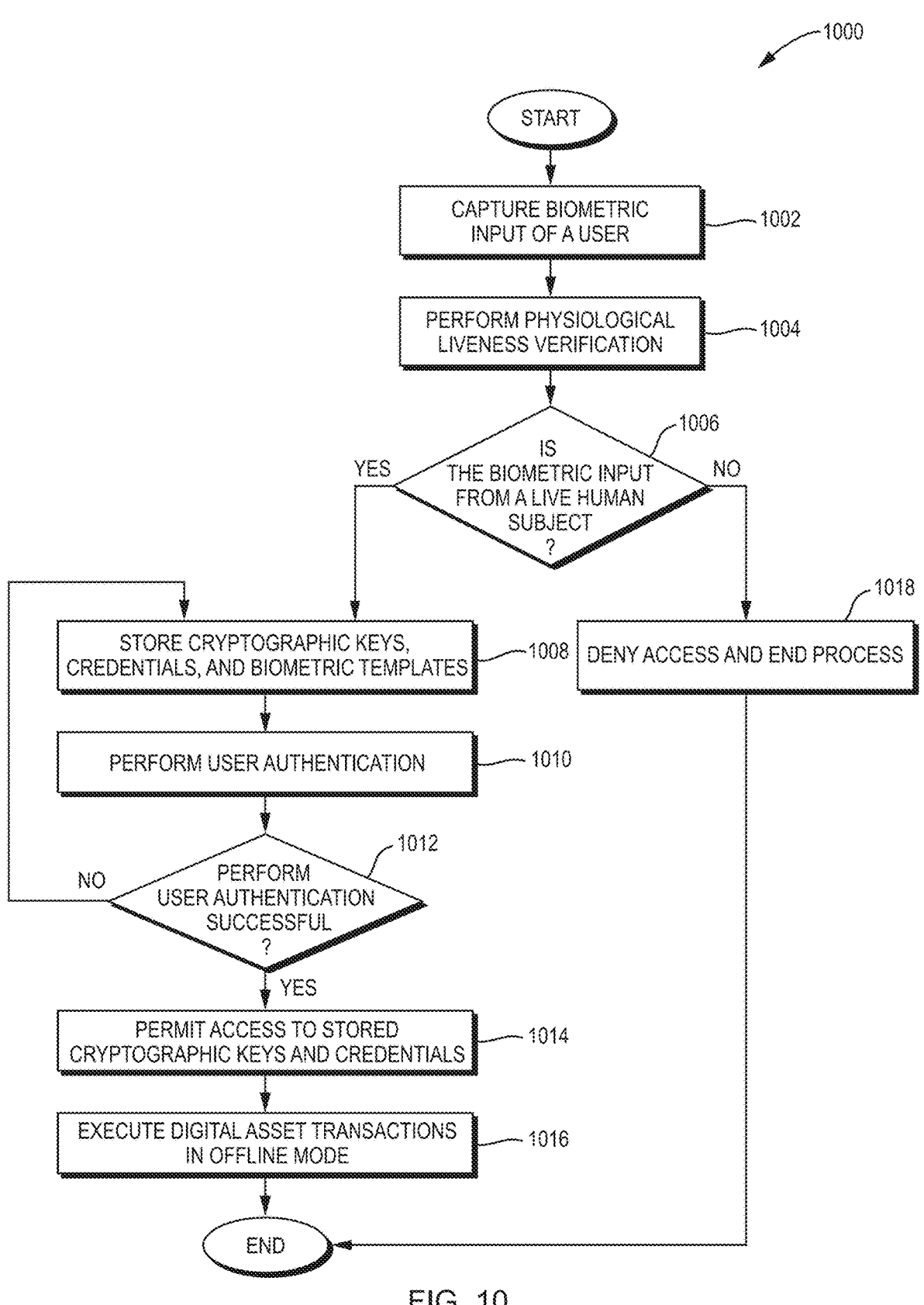
FIG. 10 illustrates a flowchart of a method for secure digital transactions performed by a self-contained biometric device according to one embodiment of the present invention.

Referring to FIG. 10, embodiments of the present invention may provide a method 1000 performed by a self-contained biometric device 900 for secure digital transactions. The method 1000 may begin with capturing biometric input 909 of a user 908 entirely within the self-contained biometric device 900 (step 1002). The biometric verification module 902 of the self-contained biometric device 900 may capture the biometric input 909, which may include physiological characteristics such as fingerprints, iris patterns, facial features, voiceprints, or vascular patterns that uniquely identify the user 908.

The method 1000 may include performing physiological liveness verification via vascular biometric logic (step 1004). The physiological liveness verification may include detection of at least one of blood flow characteristics, skin impedance variation, thermal-pulse synchronization patterns, micro-movement detection, perspiration analysis, spectral reflectance properties, pupil dilation responses, facial micro-expressions, subcutaneous vein mapping, or bioelectrical signal patterns to determine that the biometric input 909 originates from a live human subject (step 1006). In some embodiments, the liveness verification may utilize sensors that monitor physiological indicators such as pulse patterns, blood flow dynamics, electrical impedance changes in skin tissue, involuntary muscle movements, skin temperature gradients, or optical tissue properties. The vascular biometric logic may analyze these physiological signals to confirm that the biometric input 909 is being provided by a living person rather than a synthetic reproduction or spoofed sample. The liveness verification may employ multi-spectral imaging techniques that capture data across different light wavelengths to distinguish between living tissue and artificial materials. In some cases, the liveness verification may incorporate challenge-response mechanisms that measure involuntary physiological reactions to specific stimuli, such as changes in ambient light or subtle vibrations. The liveness verification may also analyze temporal consistency of physiological signals over the duration of the biometric capture process to detect anomalies that might indicate presentation attacks. In some embodiments, steps 1004 and 1006 may be omitted from the method 1000.

The method 1000 may include storing cryptographic keys 904, credentials 905, and biometric templates 906 in a hardware-isolated storage module 903 of the self-contained biometric device 900 (step 1008). The hardware-isolated storage module 903 may be physically isolated from external networks 910, providing a secure environment for sensitive data storage. The cryptographic keys 904 may include private keys used for transaction signing, the credentials 905 may include digital identity certificates or financial authorization tokens, and the biometric templates 906 may include encrypted representations of the user's physiological characteristics used for authentication purposes.

The method 1000 may include performing user authentication based on the biometric input 909 entirely within the self-contained biometric device 900 (step 1010). In some embodiments, the authentication may be based on both the biometric input 909 and the determination that the biometric input 909 originates from the live human subject from step 1006. In other embodiments where steps 1004 and 1006 are omitted, the authentication may be based only on comparing the biometric input 909 with the stored biometric templates 906 from step 1008. The biometric verification module 902 may compare the captured biometric input 909 against stored biometric templates 906 to verify the user's identity. The authentication process may occur entirely within the device's secure hardware environment without requiring external verification systems or network connectivity (step 1012).

The method 1000 may include permitting access to the stored cryptographic keys 904 and credentials 905 only upon successful user authentication by the biometric verification module 902 (step 1014). The self-contained biometric device 900 may implement authentication-gated access controls that prevent unauthorized access to sensitive stored information. The self-contained biometric device 900 may unlock access to the cryptographic keys 904 and credentials 905 only after the biometric verification module 902 has successfully confirmed the user's identity through the biometric matching process. In embodiments where step 1006 is omitted, the method 1000 may proceed directly from step 1012 to step 1014 without evaluating whether the biometric input originates from a live human subject.

The method 1000 may include executing digital asset transactions entirely within the self-contained biometric device 900 in an offline operation mode (step 1016). A transaction processing module 907 resident inside the hardware-isolated storage module 903 may be configured to process financial transactions without requiring continuous network connectivity. The transaction processing module 907 may access the stored cryptographic keys 904 to digitally sign transactions, manage digital currency transfers, perform currency conversions, and maintain internal transaction records. The offline operation capability may enable the self-contained biometric device 900 to function autonomously even in environments with limited or no network access, while maintaining the same security properties and transaction processing capabilities as when operating in online mode.

Any aspect of the self-contained biometric device 900 that is described elsewhere herein, but which is not explicitly described in connection with the method 1000 of FIG. 10, may fall within the scope of that method 1000. For example, any of the features, components, or operations described in connection with the self-contained biometric device 900 may be incorporated into or utilized by the method 1000, even if not explicitly mentioned in the description of FIG. 10. This may include, but is not limited to, the various housing types, biometric verification techniques, hardware-isolated storage implementations, transaction processing capabilities, machine learning-based inference engines, local communications interfaces, sensory feedback mechanisms, and other aspects of the self-contained biometric device 900 described throughout this disclosure.

In performing user authentication at step 1010, the biometric verification module 902 may compare the captured biometric input to an encrypted biometric template stored in the hardware-isolated storage module 903 through a matching engine. The matching engine may perform comparison operations entirely within the self-contained biometric device 900, using algorithms that analyze the captured biometric data against the stored template to determine whether a match exists. In some cases, the matching engine may utilize various comparison techniques depending on the type of biometric input 909, such as minutiae matching for fingerprints, pattern recognition for iris scans, or waveform analysis for voiceprints. The matching engine may generate a confidence score or similarity metric that indicates the degree of correspondence between the captured biometric input 909 and the stored encrypted biometric template.

When performing user authentication at step 1010, the biometric verification module 902 may capture multiple types of biometric inputs and perform multi-factor authentication using at least two different types of the biometric inputs. In some embodiments, the biometric verification module 902 may capture various physiological characteristics simultaneously or sequentially, such as combining fingerprint scanning with iris recognition, or pairing voiceprint analysis with facial recognition. The multi-factor authentication approach may enhance security by requiring successful verification across multiple biometric modalities before granting access to stored cryptographic keys 904 and credentials 905. The biometric verification module 902 may apply different weighting factors to each biometric modality based on their reliability and accuracy characteristics, combining the results through fusion algorithms that generate a composite authentication decision.

During user authentication at step 1010, the biometric verification module 902 may employ a zero-knowledge proof protocol to verify the user's identity without exposing the biometric input 909. In some cases, the biometric verification module 902 may generate cryptographic proofs that demonstrate successful biometric authentication without revealing the actual biometric data or templates to external systems. The zero-knowledge proof protocol may enable the self-contained biometric device 900 to provide verifiable attestations of user identity to third parties while maintaining complete privacy of the underlying biometric information. The zero-knowledge proofs may be structured to confirm specific attributes about the user's identity or authentication status without disclosing sensitive personal data, supporting privacy-preserving interactions with external verification systems or service providers.

User authentication may be performed in step 1010 by the biometric verification module 902 of the self-contained biometric device 900 using any one or more of the following techniques, instead of or in addition to any one or more of the techniques described above:

1. Behavioral biometrics: The biometric verification module 902 may analyze unique patterns in user 908 behavior, such as typing rhythm, gait analysis, or gesture recognition. These behavioral characteristics may be captured as biometric input 909 and compared to stored biometric templates 906 within the hardware-isolated storage module 903.

2. Vascular pattern recognition: The self-contained biometric device 900 may utilize near-infrared light to capture and analyze the unique vein patterns in a user's palm or finger for authentication purposes, storing these patterns as biometric templates 906 in the hardware-isolated storage module 903.

3. DNA matching: In some embodiments, the self-contained biometric device 900 may incorporate a miniaturized DNA analysis module within the biometric verification module 902 to perform rapid genetic matching for high-security applications.

4. Electrocardiogram (ECG) recognition: The biometric verification module 902 may capture and analyze the user's unique cardiac rhythm patterns as biometric input 909 for authentication against stored biometric templates 906.

5. Brainwave pattern analysis: In some embodiments, the self-contained biometric device 900 may include sensors within the biometric verification module 902 to capture and authenticate users based on their unique electroencephalogram (EEG) patterns.

6. Multimodal fusion with non-biometric factors: The authentication process performed by the biometric verification module 902 may combine biometric inputs 909 with other factors such as possession (e.g., a physical token) or knowledge (e.g., a password or PIN) for enhanced security, with all verification occurring entirely within the self-contained biometric device 900.

7. Continuous authentication: The self-contained biometric device 900 may implement ongoing biometric monitoring through the biometric verification module 902 to periodically re-verify the user's identity throughout a session, rather than relying on a single point-in-time authentication, maintaining secure access to the cryptographic keys 904 and credentials 905.

8. Adaptive biometric thresholds: The biometric verification module 902 may dynamically adjust matching thresholds based on contextual factors such as location, time of day, or recent user activity patterns, enhancing the security of the hardware-isolated storage module 903.

9. Liveness detection: The biometric verification module 902 may incorporate advanced anti-spoofing techniques, such as detecting blood flow, micro-movements, or other physiological indicators to ensure the biometric input 909 comes from a live human subject, as verified in step 1006 of method 1000.

10. Quantum-resistant biometric encryption: In some embodiments, the self-contained biometric device 900 may employ post-quantum cryptographic techniques to protect biometric templates 906 and authentication processes against potential future quantum computing attacks, maintaining the security of the hardware-isolated storage module 903 even against advanced threats.

The method 1000 may include performing physiological liveness verification at step 1004 through a liveness detection component of the biometric verification module 902. The liveness detection component may implement various techniques to distinguish between authentic biometric samples from living users and artificial reproductions or spoofed samples. In some embodiments, the liveness detection component may analyze physiological indicators such as blood flow patterns, pulse characteristics, skin temperature variations, or electrical impedance changes that occur naturally in living tissue. The liveness detection component may also evaluate behavioral characteristics such as natural movement patterns, response timing, or involuntary micro-movements that are difficult to replicate artificially. The physiological liveness verification process at step 1004 may operate in conjunction with the primary biometric matching process, providing an additional layer of security that may help prevent unauthorized access through synthetic or copied biometric samples. The results of this physiological liveness verification may then be evaluated at step 1006 to determine whether the biometric input originates from a live human subject.

When executing digital asset transactions at step 1016, the transaction processing module 907 may execute various types of digital asset transactions entirely within the self-contained biometric device. In some embodiments, the transaction processing module 907 may execute cryptocurrency transfers, which may involve transferring digital currencies such as Bitcoin, Ethereum, or other blockchain-based assets from one digital wallet to another. The transaction processing module 907 may execute tokenized asset exchanges, which may involve trading or converting digital tokens that represent ownership of physical or digital assets, such as real estate tokens, commodity tokens, or utility tokens. Additionally, the transaction processing module 907 may execute fiat currency conversions, which may involve converting traditional government-issued currencies that have been digitized into central bank digital currencies or other digital representations of fiat money. The transaction processing module 907 may perform these various transaction types using the cryptographic keys 904 stored in the hardware-isolated storage module 903, with all cryptographic signing and transaction authorization occurring within the secure boundary of the self-contained biometric device 900.

When executing digital asset transactions at step 1016, the transaction processing module 907 may record executed transactions in an internal ledger maintained by the transaction processing module 907 in both online and offline operation modes. The internal ledger may function as a chronological record-keeping system that maintains a complete history of all transactions processed by the self-contained biometric device 900. In some cases, the internal ledger may store transaction details such as transaction amounts, destination addresses, timestamps, transaction types, and cryptographic signatures for each completed transaction. The transaction processing module 907 may update the internal ledger immediately upon completion of each transaction, ensuring that a complete audit trail is maintained regardless of whether the self-contained biometric device 900 is connected to external networks 910 or operating in offline mode. The internal ledger may be stored within the hardware-isolated storage module 903 to protect transaction records from external access or unauthorized modification.

When executing digital asset transactions at step 1016, the transaction processing module 907 may perform real-time currency conversions between different types of digital assets stored within the self-contained biometric device. The transaction processing module 907 may maintain current exchange rate information for supported digital currencies and may automatically calculate conversion rates when processing transactions that involve multiple asset types. In some embodiments, the transaction processing module 907 may access stored exchange rate data from the hardware-isolated storage module 903, which may include recent exchange rates downloaded during previous network connections. The transaction processing module 907 may also receive updated exchange rate information through secure communication channels when network connectivity is available. The currency conversion functionality may enable users to seamlessly transact in different digital currencies without requiring manual conversion steps or reliance on external exchange services, with the conversion calculations performed entirely within the self-contained biometric device 900.

When executing digital asset transactions at step 1016, the transaction processing module 907 may timestamp transactions executed in offline mode using an internal clock of the transaction processing module 907. The internal clock may provide accurate time references for transaction records even when the self-contained biometric device 900 is not connected to external networks 910. In some cases, the internal clock may be implemented as a battery-backed real-time clock that maintains accurate timekeeping during power-off periods or when the device is in low-power sleep modes. The transaction processing module 907 may use timestamps from the internal clock to create chronologically ordered transaction records in the internal ledger, ensuring that the sequence and timing of transactions can be verified even when processed offline. The timestamping functionality may be particularly valuable for offline transactions, as the timestamps enable the creation of verifiable transaction sequences that can be validated when network connectivity is restored.

When executing digital asset transactions at step 1016, the transaction processing module 907 may batch multiple transactions executed in offline mode for later synchronization when network connectivity becomes available. The transaction processing module 907 may accumulate multiple offline transactions and organize them for efficient transmission as a group when a secure network connection is established. In some embodiments, the transaction processing module 907 may organize batched transactions in chronological order based on their timestamps and may include additional metadata such as batch identifiers, integrity checksums, and sequence numbers. The batching process may optimize network usage by reducing the overhead associated with individual transaction transmissions and may improve synchronization efficiency when reconnecting to external networks 910. The transaction processing module 907 may maintain the batched transactions in the hardware-isolated storage module 903 until successful synchronization is confirmed by external systems.

When executing digital asset transactions at step 1016, the transaction processing module 907 may cryptographically sign the digital asset transactions using the stored cryptographic keys 904 without exposing the stored cryptographic keys 904 outside of the self-contained biometric device 900. The transaction processing module 907 may access the cryptographic keys 904 from the hardware-isolated storage module 903 to generate digital signatures that authenticate each transaction and prove that the transaction was authorized by the legitimate owner of the associated digital assets. In some cases, the transaction processing module 907 may use different cryptographic keys 904 for different types of transactions or digital assets, with each key being securely stored and managed within the hardware-isolated storage module 903. The cryptographic signing process may occur entirely within the secure boundary of the self-contained biometric device 900, ensuring that private keys never leave the device and cannot be intercepted or compromised during transaction processing. The digital signatures may provide cryptographic proof of transaction authenticity and may enable external systems to verify that transactions were properly authorized without requiring access to the underlying private keys.

The method 1000 may include generating personalized financial insights based on analysis of transaction data from the executed digital asset transactions through a machine learning-based inference engine of the self-contained biometric device 900. The machine learning-based inference engine may operate as an embedded analytical component that processes financial and transactional information without requiring external cloud services or network connectivity. The machine learning-based inference engine may operate on transaction data that is generated by the transaction processing module 907 and securely stored within the hardware-isolated storage module 903. This arrangement may allow the inference engine to perform its analysis on up-to-date transaction information while maintaining the security and isolation of sensitive data. In some embodiments, the machine learning-based inference engine may examine patterns in transaction history, spending behaviors, and financial activities to generate insights and recommendations for the user 908. The personalized financial insights may include spending pattern analysis, budget recommendations, savings opportunities, or investment suggestions tailored to the user's specific financial behavior and preferences. The machine learning-based inference engine may analyze transaction categories, amounts, frequencies, and timing to identify trends and patterns in the user's financial activities. The machine learning-based inference engine may generate recommendations for optimizing spending, identifying potential cost savings, or suggesting financial strategies that align with the user's observed behavior patterns. The personalized financial insights may be presented to the user 908 through the sensory feedback system 205 or may be stored within the hardware-isolated storage module 903 for later access.

The method 1000 may include detecting anomalous transaction patterns in the executed digital asset transactions and triggering security alerts based on the detected anomalous transaction patterns through a machine learning-based inference engine of the self-contained biometric device 900. Anomalous transaction patterns may include unusual spending amounts, unexpected transaction frequencies, transactions at atypical times or locations, or other deviations from established user behavior. In some cases, the machine learning-based inference engine may compare current transaction characteristics against learned behavioral models to identify potential fraud, unauthorized access, or security threats. The machine learning-based inference engine may generate security alerts when anomalous patterns are detected, potentially notifying the user 908 through sensory feedback mechanisms or triggering additional security measures within the self-contained biometric device 900. The anomaly detection functionality may operate continuously in the background, providing real-time monitoring of transaction activities without requiring external security services.

The method 1000 may include adapting analysis algorithms based on user behavior patterns observed in the executed digital asset transactions through a machine learning-based inference engine of the self-contained biometric device 900. The adaptive functionality may enable the machine learning-based inference engine to improve accuracy and relevance over time by learning from the user's specific financial behaviors and preferences. In some cases, the transaction processing module 907 may write executed transaction data directly to a designated section of the hardware-isolated storage module 903, which the machine learning-based inference engine may then access for its analytical processes. This approach may ensure that the inference engine always works with the most current transaction data while preserving the integrity and security of the information within the self-contained biometric device 900. The machine learning-based inference engine may modify analytical models, adjust detection thresholds, or update recommendation algorithms based on observed user responses and behavioral changes. The machine learning-based inference engine may implement machine learning techniques such as reinforcement learning, neural network adaptation, or statistical model updating to continuously refine analytical capabilities. The adaptive algorithms may operate entirely within the self-contained biometric device 900, ensuring that personalization and model improvements occur without exposing user data to external systems.

The method 1000 may include analyzing transaction data from the executed digital asset transactions entirely within the self-contained biometric device 900 through a machine learning-based inference engine. The machine learning-based inference engine may utilize algorithms and models that are stored and executed within the hardware-isolated storage module 903, ensuring that all analytical processing occurs within the secure boundary of the self-contained biometric device 900. The machine learning-based inference engine may operate in both online and offline modes, maintaining consistent analytical capabilities regardless of network connectivity status. In offline mode, the machine learning-based inference engine may continue to analyze transaction data, update behavioral models, and generate insights using only the data and processing resources available within the self-contained biometric device 900. In some embodiments, the machine learning-based inference engine may store analytical results and model updates locally during offline operation, synchronizing with external systems when network connectivity becomes available.

The method 1000 may include analyzing biometric input 909 and interaction patterns over time to generate a drift metric reflecting deviations from baseline user behavior and utilizing the drift metric for at least one of credential integrity assurance, anomaly detection, or device-level risk assessment through the machine learning-based inference engine. The drift metric may serve as a quantitative measure that indicates how current user interactions compare to established behavioral patterns. In some cases, the machine learning-based inference engine may track various aspects of user behavior, such as biometric authentication timing, transaction frequency, device usage patterns, and interaction sequences. The machine learning-based inference engine may calculate the drift metric by comparing recent behavioral data against historical baselines stored within the hardware-isolated storage module 903. The drift metric may be utilized for multiple applications within the self-contained biometric device 900, providing behavioral analysis capabilities that support security and risk management functions without requiring external monitoring systems.

The method 1000 may include transmitting identity and authentication data via a local communications interface of the self-contained biometric device 900. The local communications interface may be configured to facilitate secure, short-range data exchange without requiring external computation resources or cloud-based processing. In some embodiments, the local communications interface may transmit various types of identity and authentication information to nearby trusted devices or systems. The transmitted data may include DID Documents, which contain decentralized identifier information that enables the self-contained biometric device 900 to present standardized identity credentials in a distributed manner. The local communications interface may also transmit verifiable credentials retrieved from the hardware-isolated storage module 903, which may include cryptographically signed attestations about the user's identity, qualifications, or other attributes that can be verified by third parties without requiring contact with the original issuing authority.

The local communications interface may generate and transmit biometric challenge-response signatures created by the biometric verification module 902. These signatures may provide cryptographic proof that successful biometric authentication has occurred without exposing the actual biometric data or templates to external systems. In some cases, the local communications interface may transmit zero-knowledge proofs for privacy-preserving credential verification, allowing third parties to verify specific user attributes or authentication status without accessing sensitive personal information. The zero-knowledge proofs may enable the self-contained biometric device 900 to demonstrate compliance with verification requirements while maintaining complete privacy of the underlying biometric and identity data.

The method 1000 may include generating compressed and pseudonymized telemetry packets containing integrity signals via the local communications interface, and transmitting these telemetry packets to authorized field hubs or provisioning terminals without disclosing raw biometric templates 906 or personally identifiable information. The telemetry packets may contain various types of integrity signals that provide information about the operational status and security posture of the self-contained biometric device 900. In some embodiments, the integrity signals may include usage entropy indicators, which provide statistical measures of device usage patterns without revealing specific user activities or transaction details. The telemetry packets may also include biometric variance hashes, which indicate changes in biometric authentication patterns over time without exposing actual biometric templates 906 or raw biometric data.

The local communications interface may include authentication failure flags in the telemetry packets, providing information about unsuccessful authentication attempts for security monitoring purposes. These flags may help authorized systems detect potential security threats or device tampering without compromising user privacy. The compressed and pseudonymized nature of the telemetry packets may help ensure that the transmitted information cannot be used to identify individual users or reconstruct sensitive data, while still providing valuable operational and security information to authorized monitoring systems. The local communications interface may transmit these telemetry packets only to explicitly authorized field hubs or provisioning terminals that have been configured to receive and process such information in accordance with applicable privacy and security policies.

The method 1000 may include supporting financial and asset operations via the local communications interface of the self-contained biometric device 900. The local communications interface may enable various types of financial transactions and asset management operations through secure local communication protocols. In some embodiments, the local communications interface may support offline transaction signing by the transaction processing module 907, allowing the self-contained biometric device 900 to authorize and digitally sign financial transactions without requiring continuous network connectivity. The offline transaction signing capability may enable users to conduct secure financial transactions even in environments with limited or no network access, with the signed transactions stored locally until network connectivity becomes available for synchronization.

The local communications interface may facilitate synchronization of transaction data with local ledgers maintained by nearby devices or systems. This synchronization capability may enable distributed transaction record keeping, where multiple devices can maintain consistent transaction histories through secure local communication. In some cases, the local communications interface may support encrypted receipt exchange, allowing the self-contained biometric device 900 to securely share transaction receipts with merchants, other users, or authorized systems through short-range communication protocols. The encrypted receipt exchange may provide immediate confirmation of transaction completion while maintaining the security and integrity of transaction records.

The local communications interface may implement proximity-based payment authorization protocols that enable secure financial transactions through close-range communication with point-of-sale terminals or other payment systems. These proximity-based protocols may allow users to complete payments by bringing the self-contained biometric device 900 near a compatible payment terminal, with the transaction authorization occurring through secure local communication channels. The proximity-based payment functionality may provide a convenient and secure alternative to traditional payment methods while maintaining the same level of security and user authentication provided by the biometric verification module 902.

The method 1000 may include enabling conditional access to the stored cryptographic keys 904 by a designated secondary agent via a programmable delegation layer. The programmable delegation layer may be configured within the self-contained biometric device 900 to allow authorized access to the cryptographic keys 904 under specific predefined conditions. The designated secondary agent may comprise various types of entities, including a human delegate who has been explicitly authorized by the user 908, an automated software process that operates according to predetermined parameters, or a robotic entity that can perform authorized operations on behalf of the user 908. The programmable delegation layer may maintain secure protocols that govern when and how the designated secondary agent may access the stored cryptographic keys 904, ensuring that such access occurs only under circumstances that have been explicitly defined and authorized by the user 908.

The conditional access enabled by the programmable delegation layer may be restricted by a user-defined time-lock policy. The user-defined time-lock policy may specify temporal parameters that control when the designated secondary agent may gain access to the stored cryptographic keys 904. In some embodiments, the time-lock policy may include specific time windows during which access is permitted, duration limits for how long access remains available, or scheduled intervals when access rights are automatically reviewed or renewed. The user-defined time-lock policy may be configured by the user 908 through secure interfaces provided by the self-contained biometric device 900, allowing the user 908 to establish temporal boundaries that align with their specific needs and security preferences. The programmable delegation layer may enforce these temporal restrictions automatically, preventing access outside of the defined time parameters even if other authorization conditions are met.

The conditional access may be triggered by detection of biometric inactivity exceeding a predefined duration. The self-contained biometric device 900 may monitor biometric activity patterns of the user 908 through the biometric verification module 902, tracking the frequency and timing of biometric authentication attempts. When the biometric verification module 902 detects that no biometric input 909 has been received from the user 908 for a period that exceeds the predefined duration, the programmable delegation layer may automatically initiate conditional access protocols for the designated secondary agent. This biometric inactivity trigger may serve as a safeguard mechanism that enables authorized access to the stored cryptographic keys 904 in situations where the user 908 may be unable to provide biometric authentication, such as during medical emergencies or other circumstances that prevent normal device interaction.

The conditional access may be constrained by programmable policies enforced by the self-contained biometric device's secure firmware. These programmable policies may include transaction scope limitations that define which types of transactions or operations the designated secondary agent may perform using the accessed cryptographic keys 904.

The programmable policies may also include temporal validity parameters that specify how long the conditional access remains active once it has been granted, ensuring that access rights do not persist indefinitely. Additionally, the programmable policies may include revocation conditions that automatically terminate the conditional access when specific criteria are met, such as when the user 908 resumes normal biometric activity or when predetermined security thresholds are exceeded. The secure firmware of the self-contained biometric device 900 may enforce these programmable policies at the hardware level, ensuring that the designated secondary agent cannot bypass or modify the established constraints even when granted conditional access to the stored cryptographic keys 904.

Embodiments of the present invention may implement a unified security architecture that may provide consistent protection across all form factors of the self-contained biometric device 900. The unified security architecture may center around the hardware-isolated storage module 903, which may function as a secure-element vault that may maintain identical security properties whether deployed within a subdermal implant housing, a dermally-applied biometric tattoo substrate, or an ergonomic external wearable housing. In some embodiments, the hardware-isolated storage module 903 may incorporate a physically unclonable function (PUF) that may generate device-specific cryptographic keys based on inherent manufacturing variations in the semiconductor substrate. The PUF may utilize variations in transistor threshold voltages, SRAM startup patterns, or ring oscillator frequencies to create unique device fingerprints that may not be cloned or extracted. The unified security architecture may ensure that the cryptographic keys 904, credentials 905, and biometric templates 906 may receive identical protection mechanisms regardless of the physical housing configuration, with the secure-element vault maintaining the same tamper-resistance, encryption protocols, and access controls across all deployment scenarios.

Embodiments of the present invention may implement a hardware abstraction system may provide a deterministic middleware layer that may decouple the secure firmware from physical hardware variations across different form factors. In some cases, the hardware abstraction system may expose a fixed Hardware Abstraction Layer (HAL) Application Programming Interface (API) that may present standardized memory-mapped registers and communication buses to the secure firmware.

For example, the HAL API may provide Serial Peripheral Interface (SPI) and Inter-Integrated Circuit (I2C) bus access through standardized memory-mapped interfaces, enabling the secure firmware to interact with external components through consistent interfaces regardless of the underlying hardware implementation. In some embodiments, these interfaces may utilize predetermined memory addresses, such as specific address ranges allocated for peripheral communication.

The hardware abstraction system may translate between the standardized API calls and the specific hardware interfaces present in each form factor, allowing the same secure firmware to operate identically across subdermal implants with inductive power coupling, dermal patches with flexible printed circuits, and wearable devices with conventional rigid PCBs. In various embodiments, the hardware abstraction system may include device drivers that may handle form factor-specific requirements such as power management protocols, sensor calibration procedures, and communication interface configurations while presenting a uniform software interface to the security-critical components.

Embodiments of the present invention may implement a form factor adaptation framework that may isolate housing-specific functionality from the core secure element environment. The form factor adaptation framework may confine all physical implementation details to external subsystems that may interface with the secure element through standardized protocols. In some embodiments, power management circuits may be implemented as separate modules that may convert various input power sources-such as inductive coupling for subdermal implants, photovoltaic cells for dermal patches, or rechargeable batteries for wearable devices-into the standardized voltage and current levels that may be used by the secure element. Sensor front-end circuits may be configured as modular interfaces that may condition biometric signals from different sensor types, such as capacitive fingerprint sensors, near-infrared vascular pattern detectors, or electrocardiogram electrodes, before presenting the processed signals to the biometric verification module 902 through standardized digital interfaces. Radio frequency matching networks may be implemented as form factor-specific components that may optimize antenna performance for each physical configuration while maintaining consistent communication protocols with the secure element. The form factor adaptation framework may enable the same secure element design to be deployed across multiple housing types without requiring modifications to the security-critical firmware or cryptographic processing components.

Embodiments of the present invention may implement an environmental calibration mechanism that may provide on-chip calibration routines that may adapt the secure element's operational parameters to the specific characteristics of each physical implementation. In some cases, the environmental calibration mechanism may execute during the first boot sequence to measure and store device-specific parameters in protected registers within the hardware-isolated storage module 903.

The environmental calibration mechanism may execute during the first boot sequence to measure and store device-specific parameters in protected registers within the hardware-isolated storage module 903. In some embodiments, the calibration routine may measure antenna quality factor (Q) values for different form factors, with subdermal implants typically exhibiting Q factors in various ranges, such as between approximately 15 and 25 due to tissue loading, dermal patches showing Q factors in ranges such as between approximately 20 and 35 depending on skin contact, and wearable devices achieving Q factors in ranges such as between approximately 30 and 50 in free air. These numerical values are provided as examples only and may vary based on specific implementation requirements, materials used, and environmental conditions. The specific Q factor values may be different in various embodiments while still maintaining the functional capabilities of the self-contained biometric device 900.

Clock trimming parameters may be calibrated to compensate for crystal oscillator variations, with the calibration mechanism measuring the actual oscillator frequency against an internal reference and storing correction coefficients that may maintain timing accuracy within +50 parts per million across temperature variations. Voltage threshold calibrations may account for power supply variations in different form factors, with the mechanism measuring actual supply voltages and adjusting internal voltage references to maintain consistent logic levels and analog-to-digital converter performance. The environmental calibration mechanism may XOR-mask these operational coefficients with device-specific keys derived from the PUF, ensuring that calibration data may not be extracted or modified by unauthorized parties while preserving deterministic security behavior across varied physical implementations.

Embodiments of the present invention may include a modular communication interface that may provide standardized short-range input/output protocols for integration with external systems. The modular communication interface may implement Near Field Communication (NFC) Level-4 Application Protocol Data Unit (APDU) commands that may conform to ISO/IEC 7816-4 standards, enabling compatibility with existing payment terminals and access control systems. In some embodiments, the modular communication interface may support Bluetooth Low Energy (BLE) Generic Attribute Profile (GATT) services that may provide standardized characteristics for biometric authentication, credential presentation, and transaction authorization. The communication protocols may utilize fixed packet formats that may include standardized headers, payload structures, and cryptographic signatures, allowing Original Equipment Manufacturers (OEMs) and Point-of-Sale (POS) terminal vendors to integrate the self-contained biometric device 900 without developing custom communication stacks. Secure handshake procedures may be implemented using established cryptographic protocols such as Elliptic Curve Diffie-Hellman (ECDH) key exchange combined with Advanced Encryption Standard (AES) symmetric encryption, ensuring that all communications may maintain confidentiality and integrity. The modular communication interface may support multiple concurrent communication sessions, allowing the self-contained biometric device 900 to interact with payment terminals, access control readers, and mobile devices simultaneously while maintaining isolation between different communication contexts.

Embodiments of the present invention may implement a credential management and standards compliance module that may implement comprehensive support for issuing and presenting Verifiable Credentials in accordance with the W3C Decentralized Identifier Core Specification and W3C Verifiable Credentials Data Model. In some cases, the credential management module may store credentials 905 as JSON-LD documents that may include cryptographically signed claims about the user 908, proof metadata that may enable verification without contacting the original issuer, and context information that may define the semantic meaning of credential attributes. The module may support atomic offline check-in and payment flows by maintaining locally cached verification keys and revocation lists that may enable credential validation without network connectivity. For example, during a point-of-sale transaction, the credential management module may present a payment credential that may include the user's payment authorization attributes, a cryptographic proof of the issuing bank's signature, and a timestamp indicating the credential's validity period. The verification process may occur entirely through the local communications interface without requiring external network access, with the receiving terminal validating the credential's cryptographic integrity using cached issuer keys. The credential management module may implement selective disclosure mechanisms that may allow the self-contained biometric device 900 to present only the specific attributes required for each transaction, such as revealing age verification without disclosing the user's exact birthdate or confirming payment authorization without exposing account details. In various embodiments, the module may support multiple credential formats simultaneously, including W3C Verifiable Credentials, ISO/IEC 18013-5 mobile driving licenses, and ICAO Doc 9303 travel documents, enabling interoperability across different verification systems and regulatory frameworks.

Standard Boilerplate

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention may include features which may be implemented with the use of one or more computers, computer processors, and/or other elements of a computer system. Such features may be challenging to implement mentally and/or manually. For example, embodiments of the present invention that perform biometric verification, secure transaction processing, and machine learning-based analysis within a self-contained device may utilize computational capabilities that process complex data. The biometric verification module 902 may capture and process physiological data such as fingerprints, iris patterns, or vascular signatures, which may involve pattern recognition and matching algorithms that may be executed by specialized computer hardware. The hardware-isolated storage module 903 may employ cryptographic techniques to securely store and manage sensitive data, including the use of physically unclonable functions (PUFs) and tamper-resistant hardware, which may be associated with the physical properties of computer chips. The transaction processing module 907 may perform real-time currency conversions and cryptographic signing operations that may involve mathematical calculations and secure random number generation. In some cases, the machine learning-based inference engine may analyze transaction data and biometric patterns to generate personalized insights and detect anomalies, utilizing statistical models and algorithms that may be implemented and executed using computer processors and memory systems.

Embodiments of the present invention may enhance the security and functionality of biometric authentication and digital transaction systems by addressing aspects of traditional approaches. Conventional methods may rely on centralized databases, continuous network connectivity, and external processing, which may introduce vulnerabilities to data breaches, network attacks, and service disruptions. Embodiments of the present invention may implement a self-contained architecture that performs operations-including biometric verification, transaction processing, and cryptographic key management-within a secure hardware environment, without dependence on external systems or persistent network connectivity.

For example, the biometric verification module 902 may capture and process physiological data such as fingerprints, iris patterns, or vascular signatures using specialized hardware and algorithms that operate within the self-contained biometric device 900. This approach may reduce the need to transmit biometric data over networks or store it in centralized databases, potentially reducing the risk of unauthorized access or data breaches. The hardware-isolated storage module 903 may employ cryptographic techniques, including physically unclonable functions (PUFs) and tamper-resistant hardware, to securely store and manage cryptographic keys 904 and credentials 905. By utilizing the physical properties of the device's hardware, this module may create a root of trust that may be associated with the physical device, potentially making it challenging for attackers to extract or duplicate sensitive information.

Furthermore, the transaction processing module 907 may enable financial operations in offline environments by implementing a self-contained ledger and cryptographic signing capabilities. This may allow the self-contained biometric device 900 to execute and record transactions autonomously, maintaining security regardless of network availability. The integration of a machine learning-based inference engine within the secure hardware environment may enable analysis of transaction patterns and user behavior without exposing sensitive data to external systems. This on-device analytics capability may enhance fraud detection and personalized financial insights while preserving user privacy.

Embodiments of the present invention may also address the technical aspects of maintaining security and functionality across diverse form factors, including subdermal implants, dermally-applied biometric tattoos, and external wearable devices. By implementing a secure architecture that adapts to different physical constraints while preserving core security properties, these embodiments may enable deployment in various scenarios while maintaining security and operational capabilities. This approach may expand the practical applications of secure biometric and financial technologies, enabling their use in environments and contexts where traditional systems might be impractical.

In conclusion, embodiments of the present invention may provide a technical solution to aspects of biometric authentication and digital transactions in diverse and potentially offline environments. By integrating hardware security measures, on-device biometric processing, self-contained transaction capabilities, and adaptive form factors, these embodiments may offer security, privacy, and functionality across various use cases.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

Unless expressly and specifically stated otherwise in this specification, the omission from this specification of any subject matter, terminology, embodiments, examples, features, elements, steps, or other content that was disclosed in any application to which this application claims priority (including, but not limited to, any provisional application) is not intended to disclaim, surrender, or narrow the scope of any claim term herein. Such omissions are made solely for purposes of brevity, clarity, organization, or drafting preference and shall not be construed as evidencing any intent by the applicant to limit, restrict, or abandon any aspect of the claimed invention or to exclude any interpretation that would otherwise be available based on the incorporated subject matter. The applicant specifically reserves the right to claim the full scope of any invention disclosed in any application incorporated herein by reference or otherwise whose priority or benefit is claimed, whether or not such invention is explicitly redescribed in this specification. Any construction of claim terms should consider the full scope of disclosure available in this specification together with all incorporated applications, and no negative inference should be drawn from any omission of previously disclosed subject matter unless such limitation is expressly and unambiguously set forth in this specification.

What is claimed is:

1. A self-contained biometric device for secure digital transactions, comprising:

a housing comprising a subdermal implant housing, wherein the subdermal implant housing comprises at least one of a biocompatible encapsulation layer; a wireless power receiving coil; or a hermetically sealed compartment for electronic components; and wherein the housing maintains consistent secure functionality, during an offline operation mode and an online operation mode, the housing comprising:

a biometric verification module that captures a biometric input of a user and performs user authentication based on the biometric input entirely within the self-contained biometric device;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode.

2. The device of claim 1, wherein the housing comprises the ergonomic external wearable housing.

3. The device of claim 2, wherein the ergonomic external wearable housing is configured as one of: a wristband, a ring, a pendant, a skin patch, or a head-mounted unit.

4. The device of claim 1, wherein the biometric verification module further comprises: a multimodal physiological liveness detection component configured to verify that the biometric input is provided by a live user.

5. The device of claim 1, wherein the biometric verification module employs a zero-knowledge proof protocol to verify an identity of the user without exposing the biometric input.

6. The device of claim 1, wherein the hardware-isolated storage module comprises a secure enclave that prevents direct external access to the stored cryptographic keys and credentials.

7. The device of claim 1, wherein the hardware-isolated storage module comprises a physically-unclonable-function (PUF)-bound key vault.

8. The device of claim 1, wherein the hardware-isolated storage module comprises tamper-resistant hardware designed to erase stored data in response to detecting physical tampering.

9. The device of claim 1, wherein the transaction processing module is configured to execute at least one of: cryptocurrency transfers, tokenized asset exchanges, or fiat currency conversions.

10. The device of claim 1, wherein the transaction processing module includes an internal ledger for recording executed transactions in both online and offline modes.

11. The device of claim 1, wherein the transaction processing module is configured to store, within the hardware-isolated storage module, an EMV-compliant payment token provisioned by a remote issuer while preventing any export of that token or its associated private keys; to enter an autonomous offline mode whenever network connectivity is absent for at least a predetermined interval, during which the biometric verification module alone authorizes transactions and each transaction is recorded as an entry in a tamper-evident, append-only Merkle-tree ledger maintained inside the hardware-isolated storage module; to transmit, upon restoration of connectivity, only a signed root hash of the ledger and a zero-knowledge proof attesting to the aggregate number and value of the offline transactions to a remote risk-scoring service—while withholding individual transaction records, biometric templates, and private keys; and to commit or roll back the offline ledger based on a single-bit reconciliation verdict returned by a risk-scoring service, ensuring the payment token, private keys, and plaintext transaction records remain permanently confined to the secure enclave.

12. The device of claim 1, further comprising:

a machine learning-based inference engine that analyzes transaction data entirely within the self-contained biometric device.

13. The device of claim 1, further comprising:

a local communications interface configurable for short-range data exchange without reliance on external computation, wherein the local communications interface is configured to facilitate secure communication between the self-contained biometric device and nearby trusted hardware through at least one of: near-field communication (NFC), Bluetooth Low Energy (BLE), QR code exchange, infrared signaling, or contact-based docking.

14. The device of claim 13, wherein the local communications interface further comprises a long-range, low-power transceiver configured for peer-to-peer mesh networking, and wherein the secure processor is further configured to append to each cryptographically signed transaction record a timestamp, latitude, and longitude derived from an integrated low-power GNSS receiver.

15. The device of claim 1, wherein the device lacks any persistent remote key escrow.

16. The device of claim 1, wherein the device lacks any remote biometric verification.

17. The device of claim 1, wherein the device lacks any remote risk-scoring dependency required to authorize a transaction.

18. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device, wherein the biometric verification module further comprises: a multimodal physiological liveness detection component configured to verify that the biometric input is provided by a live user;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode.

19. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device, wherein the biometric verification module employs a zero-knowledge proof protocol to verify an identity of the user without exposing the biometric input;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode.

20. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device;

a hardware-isolated storage module physically isolated from external networks for storing cryptographic keys, credentials, and biometric templates, wherein the hardware-isolated storage module comprises tamper-resistant hardware designed to erase stored data in response to detecting physical tampering;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode.

21. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode, wherein the transaction processing module is configured to store, within the hardware-isolated storage module, an EMV-compliant payment token provisioned by a remote issuer while preventing any export of that token or its associated private keys; to enter an autonomous offline mode whenever network connectivity is absent for at least a predetermined interval, during which the biometric verification module alone authorizes transactions and each transaction is recorded as an entry in a tamper-evident, append-only Merkle-tree ledger maintained inside the hardware-isolated storage module; to transmit, upon restoration of connectivity, only a signed root hash of the ledger and a zero-knowledge proof attesting to the aggregate number and value of the offline transactions to a remote risk-scoring service—while withholding individual transaction records, biometric templates, and private keys; and to commit or roll back the offline ledger based on a single-bit reconciliation verdict returned by a risk-scoring service, ensuring the payment token, private keys, and plaintext transaction records remain permanently confined to the secure enclave.

22. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode; and a machine learning-based inference engine that analyzes transaction data entirely within the self-contained biometric device.

23. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode; and a local communications interface configurable for short-range data exchange without reliance on external computation, wherein the local communications interface is configured to facilitate secure communication between the self-contained biometric device and nearby trusted hardware through at least one of: near-field communication (NFC), Bluetooth Low Energy (BLE), QR code exchange, infrared signaling, or contact-based docking, wherein the local communications interface further comprises a long-range, low-power transceiver configured for peer-to-peer mesh networking, and wherein the secure processor is further configured to append to each cryptographically signed transaction record a timestamp, latitude, and longitude derived from an integrated low-power GNSS receiver.

24. A self-contained biometric device for secure digital transactions, comprising:

a housing comprising one of: a subdermal implant housing, a dermally-applied biometric tattoo substrate, an ergonomic external wearable housing, or a smart card, and wherein the housing maintains consistent secure functionality, during an offline operation mode and an online operation mode, the housing comprising:

a biometric verification module that captures a biometric input of a user and performs user authentication based on the biometric input entirely within the self-contained biometric device;

a hardware-isolated storage module physically isolated from external networks for storing cryptographic keys, credentials, and biometric templates;

wherein the self-contained biometric device permits access to the cryptographic keys and credentials only upon successful user authentication by the biometric verification module;

a transaction processing module, resident inside the hardware-isolated storage module, configured to execute digital asset transactions entirely within the self-contained biometric device in the offline operation mode;

wherein the device lacks any persistent remote key escrow.

* * * * *